(12) United States Patent
Srinivasan et al.

(10) Patent No.: US 8,589,436 B2
(45) Date of Patent: *Nov. 19, 2013

(54) TECHNIQUES FOR PERFORMING REGULAR EXPRESSION-BASED PATTERN MATCHING IN DATA STREAMS

(75) Inventors: Anand Srinivasan, Bangalore (IN); Rakesh Komuravelli, Hyderbad (IN); Namit Jain, Santa Clara, CA (US); Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 12/548,222

(22) Filed: Aug. 26, 2009

(65) Prior Publication Data

US 2010/0057736 A1   Mar. 4, 2010

Related U.S. Application Data

(60) Provisional application No. 61/092,983, filed on Aug. 29, 2008.

(51) Int. Cl.
*G06F 17/30* (2006.01)

(52) U.S. Cl.
USPC .......................................... 707/780; 719/318

(58) Field of Classification Search
USPC ......... 707/713, 758, 759, 760, 761, 762, 763, 707/765, 769, 771, 772, 779, E17.014, 707/E17.017, E17.061, E17.062, E17.063, 707/E17.069, 999.003, 780; 719/318
See application file for complete search history.

(56) References Cited

U.S. PATENT DOCUMENTS

| 4,996,687 | A |   | 2/1991  | Hess et al.           |
|-----------|---|---|---------|-----------------------|
| 5,051,947 | A | * | 9/1991  | Messenger et al. ........... 1/1 |
| 5,495,600 | A |   | 2/1996  | Terry et al.          |
| 5,706,494 | A |   | 1/1998  | Cochrane et al.       |
| 5,802,262 | A |   | 9/1998  | Van De Vanter         |
| 5,802,523 | A |   | 9/1998  | Jasuja et al.         |
| 5,822,750 | A |   | 10/1998 | Jou et al.            |
| 5,826,077 | A |   | 10/1998 | Blakeley et al.       |
| 5,850,544 | A |   | 12/1998 | Parvathaneny et al.   |

(Continued)

FOREIGN PATENT DOCUMENTS

| EP | 1241589 A2      | 9/2002 |
|----|-----------------|--------|
| WO | WO 00/49533 A2  | 8/2000 |

(Continued)

OTHER PUBLICATIONS

Bose, et al., "A Query Algebra for Fragmented XML Stream Data", 9th International Conference on Data Base Programming Languages (DBPL), Sep. 6-8, 2003, Potsdam, Germany, at URL:http://lambda,uta.edu/dbpl03.pdf, 11 pages.

(Continued)

*Primary Examiner* — Jean M Corrielus
*Assistant Examiner* — Evan Aspinwall
(74) *Attorney, Agent, or Firm* — Kilpatrick Townsend & Stockton LLP

(57) ABSTRACT

Techniques for detecting patterns in one or more data streams. A pattern to be detected may be specified using a regular expression. Events received in a data stream are processed during runtime to detect occurrences of the specified pattern in the data stream.

16 Claims, 18 Drawing Sheets

(56) References Cited

U.S. PATENT DOCUMENTS

| | | | |
|---|---|---|---|
| 5,857,182 A | 1/1999 | DeMichiel et al. |
| 5,937,401 A | 8/1999 | Hillegas |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A * | 7/2000 | Floratos et al. ............... 707/737 |
| 6,108,666 A * | 8/2000 | Floratos et al. .................... 1/1 |
| 6,128,610 A | 10/2000 | Srinivasan et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,353,821 B1 | 3/2002 | Gray |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 * | 8/2004 | Fritchman ............... 1/1 |
| 6,826,566 B2 | 11/2004 | Lewak et al. |
| 6,836,778 B2 | 12/2004 | Manikutty et al. |
| 6,856,981 B2 | 2/2005 | Wyschogrod et al. |
| 6,985,904 B1 | 1/2006 | Kaluskar et al. |
| 7,020,696 B1 | 3/2006 | Perry et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,224,185 B2 * | 5/2007 | Campbell et al. ............... 326/46 |
| 7,225,188 B1 * | 5/2007 | Gai et al. ............... 1/1 |
| 7,236,972 B2 | 6/2007 | Lewak et al. |
| 7,305,391 B2 * | 12/2007 | Wyschogrod et al. ............... 1/1 |
| 7,308,561 B2 * | 12/2007 | Cornet et al. ............... 712/200 |
| 7,310,638 B1 | 12/2007 | Blair |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 * | 11/2008 | Sharangpani et al. ............... 1/1 |
| 7,483,976 B2 | 1/2009 | Ross |
| 7,516,121 B2 | 4/2009 | Liu et al. |
| 7,519,577 B2 | 4/2009 | Brundage et al. |
| 7,552,365 B1 | 6/2009 | March et al. |
| 7,567,953 B2 | 7/2009 | Kadayam et al. |
| 7,580,946 B2 | 8/2009 | Mansour et al. |
| 7,613,848 B2 | 11/2009 | Amini et al. |
| 7,620,851 B1 | 11/2009 | Leavy et al. |
| 7,630,982 B2 * | 12/2009 | Boyce ............... 1/1 |
| 7,634,501 B2 | 12/2009 | Yabloko |
| 7,636,703 B2 * | 12/2009 | Taylor ............... 706/62 |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,702,629 B2 * | 4/2010 | Cytron et al. .......... 707/999.006 |
| 7,702,639 B2 | 4/2010 | Stanley et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,823,066 B1 | 10/2010 | Kuramura |
| 7,827,146 B1 | 11/2010 | De Landstheer et al. |
| 7,827,190 B2 * | 11/2010 | Pandya ............... 707/758 |
| 7,844,829 B2 | 11/2010 | Meenakshisundaram |
| 7,870,124 B2 | 1/2011 | Liu et al. |
| 7,912,853 B2 | 3/2011 | Agrawal |
| 7,917,299 B2 * | 3/2011 | Buhler et al. ............... 702/19 |
| 7,930,322 B2 | 4/2011 | MacLennan |
| 7,953,728 B2 | 5/2011 | Hu et al. |
| 7,979,420 B2 | 7/2011 | Jain et al. |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,099,400 B2 | 1/2012 | Haub et al. |
| 8,134,184 B2 | 3/2012 | Becker et al. |
| 8,155,880 B2 | 4/2012 | Patel et al. |
| 2002/0023211 A1 | 2/2002 | Roth et al. |
| 2002/0032804 A1 | 3/2002 | Hunt |
| 2002/0049788 A1 | 4/2002 | Lipkin et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0037048 A1 | 2/2003 | Kabra et al. |
| 2003/0046673 A1 | 3/2003 | Copeland et al. |
| 2003/0065655 A1 | 4/2003 | Syeda-Mahmood |
| 2003/0065659 A1 | 4/2003 | Agarwal et al. |
| 2003/0135304 A1 | 7/2003 | Sroub et al. |
| 2003/0200198 A1 | 10/2003 | Chandrasekar et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0117359 A1 | 6/2004 | Snodgrass et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0220912 A1 | 11/2004 | Manikutty et al. |
| 2004/0220927 A1 | 11/2004 | Murthy et al. |
| 2004/0267760 A1 | 12/2004 | Brundage et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0204340 A1 | 9/2005 | Ruminer et al. |
| 2005/0229158 A1 | 10/2005 | Thusoo et al. |
| 2005/0273450 A1 | 12/2005 | McMillen et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0080646 A1 | 4/2006 | Aman |
| 2006/0085592 A1 | 4/2006 | Ganguly et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0155719 A1 | 7/2006 | Mihaeli et al. |
| 2006/0212441 A1 * | 9/2006 | Tang et al. ............... 707/5 |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | von Kaenel et al. |
| 2007/0118600 A1 | 5/2007 | Arora |
| 2007/0136239 A1 | 6/2007 | Lee et al. |
| 2007/0136254 A1 | 6/2007 | Choi et al. |
| 2007/0192301 A1 | 8/2007 | Posner |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010241 A1 | 1/2008 | McGoveran |
| 2008/0016095 A1 | 1/2008 | Bhatnagar et al. |
| 2008/0028095 A1 | 1/2008 | Lang et al. |

(56) References Cited

U.S. PATENT DOCUMENTS

| | | |
|---|---|---|
| 2008/0034427 A1 | 2/2008 | Cadambi et al. |
| 2008/0046401 A1 | 2/2008 | Lee et al. |
| 2008/0077570 A1 | 3/2008 | Tang et al. |
| 2008/0077587 A1* | 3/2008 | Wyschogrod et al. ............. 707/6 |
| 2008/0082484 A1* | 4/2008 | Averbuch et al. ................ 707/3 |
| 2008/0082514 A1 | 4/2008 | Khorlin et al. |
| 2008/0086321 A1 | 4/2008 | Walton |
| 2008/0114787 A1 | 5/2008 | Kashiyama et al. |
| 2008/0120283 A1 | 5/2008 | Liu et al. |
| 2008/0195577 A1 | 8/2008 | Fan et al. |
| 2008/0235298 A1 | 9/2008 | Lin et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0281782 A1 | 11/2008 | Agrawal |
| 2008/0301124 A1* | 12/2008 | Alves et al. ...................... 707/5 |
| 2008/0301125 A1* | 12/2008 | Alves et al. ...................... 707/5 |
| 2008/0301135 A1* | 12/2008 | Alves et al. ...................... 707/6 |
| 2008/0301256 A1 | 12/2008 | McWilliams et al. |
| 2009/0006320 A1 | 1/2009 | Ding et al. |
| 2009/0006346 A1 | 1/2009 | C N et al. |
| 2009/0007098 A1 | 1/2009 | Chevrette et al. |
| 2009/0019045 A1* | 1/2009 | Amir et al. ........................ 707/6 |
| 2009/0024622 A1 | 1/2009 | Chkodrov et al. |
| 2009/0043729 A1 | 2/2009 | Liu et al. |
| 2009/0070785 A1 | 3/2009 | Alvez et al. |
| 2009/0070786 A1* | 3/2009 | Alves et al. ................... 719/318 |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0144696 A1 | 6/2009 | Andersen |
| 2009/0187584 A1 | 7/2009 | Johnson et al. |
| 2009/0216747 A1 | 8/2009 | Li et al. |
| 2009/0216860 A1 | 8/2009 | Li et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0257314 A1 | 10/2009 | Davis et al. |
| 2009/0265324 A1 | 10/2009 | Mordvinov et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0327102 A1 | 12/2009 | Maniar et al. |
| 2010/0017379 A1 | 1/2010 | Naibo et al. |
| 2010/0017380 A1 | 1/2010 | Naibo et al. |
| 2010/0023498 A1 | 1/2010 | Dettinger et al. |
| 2010/0049710 A1* | 2/2010 | Young et al. ...................... 707/6 |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0161589 A1 | 6/2010 | Nica et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0318652 A1 | 12/2010 | Samba |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0055192 A1 | 3/2011 | Tang et al. |
| 2011/0093162 A1 | 4/2011 | Nielsen et al. |
| 2011/0161321 A1 | 6/2011 | de Castro Alves et al. |
| 2011/0161328 A1 | 6/2011 | Park et al. |
| 2011/0161352 A1 | 6/2011 | de Castro Alves et al. |
| 2011/0161356 A1 | 6/2011 | de Castro Alves et al. |
| 2011/0173231 A1 | 7/2011 | Drissi et al. |
| 2011/0173235 A1 | 7/2011 | Aman et al. |
| 2011/0196891 A1 | 8/2011 | de Castro Alves et al. |
| 2011/0270879 A1 | 11/2011 | Srinivasan et al. |
| 2011/0321057 A1 | 12/2011 | Mejdrich et al. |
| 2012/0041934 A1 | 2/2012 | Srinivasan et al. |
| 2012/0130963 A1 | 5/2012 | Luo et al. |

FOREIGN PATENT DOCUMENTS

| | | |
|---|---|---|
| WO | WO 01/59602 A2 | 8/2001 |
| WO | WO 01/65418 A2 | 9/2001 |
| WO | WO 03/030031 A2 | 4/2003 |

OTHER PUBLICATIONS

Carpenter, "User Defined Functions," Oct. 12, 2000, at URL:http://www.sqlteam.com/itemprint.asp?ItemID=979, 4 pages.

Fernandez, et al., "Build your own XQuery processor", slide show, at URL: http://www.galaxquery.org/slides/edbt-summer-school2004.pdf, 2004, 116 pages.

Gilani, "Design and implementation of stream operators, query instantiator and stream buffer manager," Dec., 2003, 137 pages.

Gosling, et al., "The Java Language Specification," Book, copyright 1996-2005, 3rd edition, 684 pages, Sun Microsystems USA. (due to size, reference will be uploaded in two parts).

Jin, et al. "ARGUS: Efficient Scalable Continuous Query Optimization for Large-Volume Data Streams" 10th International Database Engineering and Applications Symposium (IDEAS'06), 2006, 7 pages.

Kawaguchi, "Java Architecture for XML Binding_(JAXB) 2.0," Sun Microsystems, Inc., Apr. 19, 2006, 384 pages.

"Oracle Complex Event Processing CQL Language Reference," 11g Release 1 (11.1.1) E12048-01, Apr. 2010, 540 pages.

Martin et al "Finding application errors and security flaws using PQL: a program query language," Proceedings of the 20th annual ACM SIGPLAN conference on Object-oriented programming, systems, languages, and applications 40:1-19 (Oct. 2005).

Office Action for U.S. Appl. No. 12/534,384 (Feb. 28, 2012).

Office Action for U.S. Appl. No. 12/506,905 (Mar. 26, 2012).

Office Action for U.S. Appl. No. 12/548,209 (Apr. 16, 2012).

Notice of Allowance for U.S. Appl. No. 13/184,528 (Mar. 1, 2012).

Hao et al. "Achieving high performance web applications by service and database replications at edge servers," proceedings of IPCCC 2009, IEEE 28th International Performance Computing and Communications Conference, pp. 153-160 (Dec. 2009).

International Search Report dated for PCT/US2011/052019 (Nov. 17, 2011).

Office Action for U.S. Appl. No. 12/396,008 (Nov. 16, 2011).

Office Action for U.S. Appl. No. 12/506,891 (Dec. 14, 2011).

Office Action for U.S. Appl. No. 12/534,398 (Nov. 11, 2011).

Office Action for U.S. Appl. No. 11/601,415 (Dec. 9, 2011).

"StreamBase New and Noteworthy," StreamBase, dated Jan. 12, 2010, 878 pages.

Non-Final Office Action for U.S. Appl. No. 12/548,187, mailed on Sep. 27, 2011, 19 pages.

Final Office Action for U.S. Appl. No. 12/395,871, mailed on Oct. 19, 2011, 33 pages.

Non-Final Office Action for U.S. Appl. No. 12/548,281, mailed on Oct. 3, 2011, 37 pages.

Non-Final Office Action for U.S. Appl. No. 12/548,290, mailed on Oct. 3, 2011, 34 pages.

Notice of Allowance for U.S. Appl. No. No. 11/874,896, mailed on Jun. 23, 2011, 30 pages.

Final Office Action for U.S. Appl. No. 11/874,197, mailed on Aug. 12, 2011, 26 pages.

Notice of Allowance for U.S. Appl. No. 11/927,681, mailed on Jul. 1, 2011, 8 pages.

(56) References Cited

OTHER PUBLICATIONS

Final Office Action for U.S. Appl. No. 11/927,683, mailed on Sep. 1, 2011, 18 pages.
Office Action for U.S. Appl. No. 12/548,187 (Jun. 20, 2012).
Notice of Allowance for U.S. Appl. No. 12/395,871 (May 4, 2012).
Office Action for U.S. Appl. No. 12/534,398 (Jun. 5, 2012).
Office Action for U.S. Appl. No. 12/548,281 (Jun. 20, 2012).
Office Action for U.S. Appl. No. 12/913,636 (Jun. 7, 2012).
Notice of Allowance for U.S. Appl. No. 12/874,197 (Jun. 22, 2012).
Final Office Action for U.S. Appl. No. 12/548,290 dated Jul. 30, 2012.
Office Action for U.S. Appl. No. 13/193,377 dated Aug. 23, 2012.
Office Action for U.S. Appl. No. 11/977,437 dated Aug. 3, 2012.
Final Office Action for U.S. Appl. No. 11/601,415 dated Jul. 2, 2012.
Notice of Allowance for U.S. Appl. No. 12/506,891 dated Jul. 25, 2012.
Final Office Action for U.S. Appl. No. 12/506,905 dated Aug. 9, 2012.
Esper Reference Documentation, Copyright 2009, ver. 3.1.0, 293 pages.
International Search Report dated Jul. 16, 2012 for PCT/US2012/034970.
International Search Report dated Sep. 12, 2012 for PCT/US2012/036353.
Office Action for U.S. Appl. No. 13/396,464 dated Sep. 7, 2012.
Office Action for U.S. Appl. No. 13/244,272 dated Oct. 14, 2012.
Notice of Allowance for U.S. Appl. No. 12/548,209 dated Oct. 24, 2012.
Nah et al. "A Cluster-Based THO-Structured Scalable Approach for Location Information Systems," The Ninth IEEE International Workshop on Object-Oriented Real-Time Dependable Systems (WORDS' 03), pp. 225-233 (Jan. 1, 2003).
Hulton et al. "Mining Time-Changing Data Streams," Proceedings of the Seventh ACM SIGKDD, pp. 10 (Aug. 2001).
Stump et al. (ed.) Proceedings of IJCAR '06 Workshop "PLPV '06: Programming Languages meets Program Verification," pp. 1-113 (Aug. 21, 2006).
Vijayalakshmi et al. "Processing location dependent continuous queries in distributed mobile databases using mobile agents," IET-UK International Conference on Information and Communication Technology in Electrical Sciences (ICTES 2007), pp. 1023-1030 (Dec. 22, 2007).
Wang et al. "Distributed Continuous Range Query Processing on Moving Objects," Proceedings of the 17th international Conference on Database and Expert Systems Applications (DEXA'06), Berlin, DE, pp. 655-665 (Jan. 1, 2006).
Wu et al."Dynamic Data Management for Location Based Services in Mobile Environments," IEEE Proceedings of the Seventh International Database Engineering and Applications Symposium 2003 Piscataway. NJ. USA., pp. 172-181 (Jul. 16, 2003).
Sansoterra "Empower SOL with Java User-Defined Functions," IT Jungle.com (Oct. 9, 2003).
Ullman et al., "Introduction to JDBC," Stanford University (2005).
Non-Final Office Action for U.S. Appl. No. 12/957,194 dated Dec. 7, 2012.
Non-Final Office Action for U.S. Appl. No. 13/089,556 dated Nov. 6, 2012.
Notice of Allowance for U.S. Appl. No. 12/534,398 dated Nov. 27, 2012.
Notice of Allowance for U.S. Appl. No. 12/506,905 dated Dec. 14, 2012.
Non-Final Office Action for U.S. Appl. No. 12/957,201 dated Dec. 19, 2012.
Final Office Action for U.S. Appl. No. 12/396,464 dated Jan. 16, 2013, 16 pages.
Final Office Action for U.S. Appl. No. 12/913,636 dated Jan. 8, 2013, 20 pages.
Non-Final Office Action for U.S. Appl. No. 12/949,081 dated Jan. 9, 2013, 12 pages.
Final Office Action for U.S. Appl. No. 12/193,377 dated Jan. 17, 2013, 24 pages.
Final Office Action for U.S. Appl. No. 12/534,384 dated Feb. 12, 2013, 13 pages.
Final Office Action for U.S. Appl. No. 13/107,742 dated Feb. 14, 2013, 15 pages.
Non-Final Office Action for U.S. Appl. No. 13/102,665 dated Feb. 1, 2013, 11 pages.
U.S. Appl. No. 12/534,384, Notice of Allowance mailed on May 7, 2013, 12 pages.
U.S. Appl. No. 12/548,187, Non-Final Office Action mailed on Apr. 9, 2013, 17 Pages.
U.S. Appl. No. 12/548,281, Non-Final Office Action mailed on Apr. 12, 2013, 16 pages.
U.S. Appl. No. 12/548,290, Non-Final Office Action mailed on Apr. 15, 2013, 17 pages.
U.S. Appl. No. 12/957,201, Final Office Action mailed on Apr. 25, 2013, 11 pages.
U.S. Appl. No. 13/089,556, Non-Final Office Action mailed on Apr. 10, 2013, 10 pages.
Notice of Allowance for U.S. Appl. No. 11/977,437 dated Mar. 4, 2013. 9 pages.
Final Office Action for U.S. Appl. No. 13/244,272 dated Mar. 28, 2013, 29 pages.
Notice of Allowance for U.S. Appl. No. 12/957,194 dated Mar. 20, 2013. 9 pages.
Kawaguchi et al. "Java Architecture for XML Binding (JAXB) 2.2," Sun Microsystems, Inc., Dec. 10, 1999, 384 pages.
Knuth, et al., "Fast Pattern Matching in Strings," Siam J. Comput., vol. 6, No. 2, Jun. 1977, pp. 323-350.
Lakshmanan, et al., "On efficient matching of streaming XML documents and queries," 2002, 18 pages.
Lindholm, et al., "Java Virtual Machine Specification, 2nd Edition", Prentice Hall, Apr. 1999, 484 pages. (due to size, reference will be uploaded in two parts).
Liu, et al., "Efficient XSLT Processing in Relational Database System," Proceeding of the 32nd. International Conference on Very Large Data Bases (VLDB), Sep. 2006, 1106-1116, 11 pages.
Luckham, "What's the Difference Between ESP and CEP?" Complex Event Processing, downloaded Apr. 29, 2011, at URL: http://complexevents.com/?p=103, 5 pages.
Madden, et al., "Continuously Adaptive Continuous Queries (CACQ) over Streams," SIGMOD 2002, Jun. 4-6, 2002, 12 pages.
"Managing Server Startup and Shutdown," BEA WebLogic Server, Mar. 30, 2007, ver. 10.0, 134 pages.
"Matching Behavior," .NET Framework Developer's Guide, Copyright 2008 Microsoft Corporation, downloaded Jul. 1, 2008 from URL: http://msdn.microsoft.com/en-us/library/0yzc2yb0(printer).aspx, pp. 1-2.
Motwani, et al., "Models and Issues in Data Streams," Proceedings of the 21st ACM SIGMOD-SIGACT-SIDART symposium on Principles f database systems, 2002, 30 pages.
Motwani, et al., "Query Processing Resource Management, and Approximation in a Data Stream Management System," Proceedings of CIDR 2003, Jan. 2003, 12 pages.
Munagala, et al., "Optimization of Continuous Queries with Shared Expensive Filters," Proceedings of the 26th ACM SIGMOD-SIGACT-SIGART symposium on Principles of database systems, believed to be prior to Oct. 17, 2007, p. 14.
"New Project Proposal for Row Pattern Recognition—Amendment to SQL with Application to Streaming Data Queries," H2-2008-027, H2 Teleconference Meeting, Jan. 9, 2008, pp. 1-6.
Novick, "Creating a User Defined Aggregate with SQL Server 2005," at URL: http://novicksoftware.com/Articles/sql-2005-product-user-defined-aggregate.html, 2005, 6 pages.
Oracle Database, SQL Language Reference, 11g Release 1 (11.1), B28286-02, Sep. 2007, 1496 pages, Oracle.
Oracle Application Server 10g, Release 2 and 3, New Features Overview, An Oracle White Paper, Oct. 2005, 48 pages, Oracle.
Oracle Application Server, Administrator's Guide, 10g Release 3 (10.1.3.2.0), B32196-01, Jan. 2007, 376 pages, Oracle.
Oracle Application Server, Enterprise Deployment Guide, 10g Release 3 (10.1.3.2.0), B32125-02, Apr. 2007, 120 pages, Oracle.

(56) References Cited

OTHER PUBLICATIONS

Oracle Application Server, High Availability Guide, 10g Release 3 (10.1.3.2.0), B32201-01, Jan. 2007, 314 pages, Oracle.
"Oracle CEP Getting Started," Release 11gR1 (11.1.1) E14476-01, May 2009, 172 pages.
Oracle Database Data Cartridge Developer's Guide, B28425-03, 11g Release 1 (11.1), Oracle, Mar. 2008, 372 pages, Oracle.
Oracle Database, SQL Reference, 10g Release 1 (10.1), Part No. B10759-01, Dec. 2003, pp. 7-1 to 7-17; 7-287 to 7-290; 14-61 to 14-74. (due to size, reference will be uploaded in three parts).
"OSGI Service Platform Core Specification, the OSGI Alliance," Apr. 2007, ver. 4.1, release 4, 288 pages, OSGI Alliance.
Peng, et al., "Xpath Queries on Streaming Data," 2003, pp. 1-12, ACM Press.
Peterson, "Petri Net Theory and the Modeling of Systems", Prentice Hall, 1981, 301 pages.
PostgresSQL: Documentation: Manuals: PostgresSQL 8.2: Create Aggregate, believed to be prior to Apr. 21, 2007, 4 pages.
PostgresSQL: Documentation: Manuals: PostgresSQL 8.2: User-Defined Aggregates, believed to be prior to Apr. 21, 2007, 4 pages.
"Release Notes," BEA WebLogic Event Server, Jul. 2007, ver. 2.0, 8 pages.
Sadri, et al., "Expressing and Optimizing Sequence Queries in Database Systems," ACM Transactions on Database Systems, Jun. 2004, vol. 29, No. 2, pp. 282-318, ACM Press, Copyright 2004.
Sadtler, et al., "WebSphere Application Server Installation Problem Determination," Copyright 2007, pp. 1-48, IBM Corp.
Sharaf, et al., Efficient Scheduling of Heterogeneous Continuous Queries, VLDB '06, Sep. 12-15, 2006, pp. 511-522.
Spring Dynamic Modules for OSGi Service Platforms product documentation, SpringSource, Jan. 2008, 71 pages.
"Stanford Stream Data Manager," at URL: http://infolab.stanford.edu/stream/, last modified Jan. 5, 2006, pp. 1-9.
Stolze, "User-defined Aggregate Functions in DB2 Universal Database," at URL: http://www.128.ibm.com/developerworks/db2/library/tacharticle/0309stolze/0309stolze.html, Sep. 11, 2003, 11 pages.
Stream Query Repository: Online Auctions (CQL Queries), at URL: http:/www-db.stanford.edu/strem/sqr/cql/onauc.html, Dec. 2, 2002, 4 pages.
Stream Query Repository: Online Auctions, at URL: http://www-db.stanford.edu/stream/sqr/onauc.html#queryspecsend, Dec. 2, 2002, 2 pages.
"Stream: The Stanford Stream Data Manager," IEEE Data Engineering Bulletin, Mar. 2003, pp. 1-8.
Streambase 5.1 product documentation, Streambase Systems, copyright 2004-2010, 878 pages.
Terry, et al., "Continuous queries over append-only database," Proceedings of 1992 ACM SIGMOD, pp. 321-330.
"Understanding Domain Configuration," BEA WebLogic Server, Mar. 30, 2007, ver. 10.0, 38 pages.
Vajjhala, et al, "The Java™ Architecture for XML Binding (JAXB) 2.0," Sun Microsystem, Inc., Final Release Apr. 19, 2006, 384 pages.
W3C, "XML Path Language (Xpath)," W3C Recommendation, Nov. 16, 1999, ver. 1.0, at URL: http:/www.w3.org/TR/xpath, 37 pages.
"WebLogic Event Server Administration and Configuration Guide," BEA WebLogic Event Server, Jul. 2007, ver. 2.0, 108 pages.
"WebLogic Event Server Reference," BEA WebLogic Event Server, Jul. 2007, ver. 2.0, 52 pages.
"Weblogic Server Performance and Tuning," BEA WebLogic Server, Mar. 30, 2007, ver. 10.0, 180 pages.
"WebSphere Application Server V6.1 Problem Determination: IBM Redpaper Collection," WebSphere Software, IBM/Redbooks, Dec. 2007, 634 pages.
White, et al., "WebLogic Event Server. A Lightweight, Modular Application Server for Event Processing," 2nd International Conference on Distributed Event-Based Systems, Jul. 2-4, 2008, Rome, Italy, 8 pages, ACM Press, Copyright 2004.
Widom, et al., "CQL: A Language for Continuous Queries over Streams and Relations," believed to be prior to Oct. 17, 2007, 62 pages.
Widom, et al., "The Stanford Data Stream Management System," PowerPoint Presentation, believed to be prior to Oct. 17, 2007, 110 pages.
Zemke,"XML Query,"Mar. 14, 2004, 29 pages.
De Castro Alves; et al, "Extensible Indexing Framework Using Data Cartridges," U.S. Appl. No. 12/913,636, filed Oct. 27, 2010.
Park, et al., "Spatial Data Cartridge for Event Processing Systems," U.S. Appl. No. 12/949,081, filed Nov. 18, 2010.
De Castro Alves; et al, "Extensibility Platform Using Data Cartridges," U.S. Appl. No. 12/957,194, filed Nov. 30, 2010.
De Castro Alves; et al, "Class Loading Using Java Data Cartridges," U.S. Appl. No. 13/089,556, filed Apr. 19, 2011.
De Castro Alves; et al, "Extensible Language Framework Using Data Cartridges," U.S. Appl. No. 12/957,201, filed Nov. 30, 2010.
Non-Final Office Action for U.S. Appl. No. 12/396,008, mailed on Jun. 8, 2011, 10 pages.
Non-Final Office Action for U.S. Appl. No. 12/395,871, mailed on May 27, 2011, 7 pages.
Non-Final Office Action for U.S. Appl. No. 11/874,202, mailed on Dec. 3, 2009, 20 pages.
Final Office Action for U.S. Appl. No. 11/874,202, mailed on Jun. 8, 2010, 200 pages.
Notice of Allowance for U.S. Appl. No. 11/874,202, mailed on Dec. 22, 2010, 29 pages.
Notice of Allowance for U.S. Appl. No. 11/874,202, mailed on Mar. 31, 2011, 12 pages.
Notice of Allowance for U.S. Appl. No. 11/874,850, mailed on Nov. 24, 2009, 17 pages.
Supplemental Notice of Allowance for U.S. Appl. No. 11/874,850, mailed on Dec. 11, 2009, 5 pages.
Supplemental Notice of Allowance for U.S. Appl. No. 11/874,850, mailed on Jan. 27, 2010, 11 pages.
Non-Final Office Action for U.S. Appl. No. 11/874,896, mailed on Dec. 8, 2009, 19 pages.
Final Office Action for U.S. Appl. No. 11/874,896, mailed on Jul. 23, 2010, 28 pages.
Non-Final Office Action for U.S. Appl. No. 11/874, 896, mailed on Nov. 22, 2010, 25 pages.
Non-Final Office Action for U.S. Appl. No. 11/977,439, mailed on Apr. 13, 2010, 7 pages.
Notice of Allowance for U.S. Appl. No. 11/977,439, mailed on Aug. 18, 2010, 11 pages.
Supplemental Notice of Allowance for U.S. Appl. No. 11/977,439, mailed on Sep. 28, 2010, 6 pages.
Notice of Allowance for U.S. Appl. No. 11/977,439, mailed on Nov. 24, 2010, 8 pages.
Notice of Allowance for U.S. Appl. No. 11/977,439, mailed on Mar. 16, 2011, 10 pages.
Non-Final Office Action for U.S. Appl. No. 11/977,437, mailed on Oct. 13, 2009, 9 pages.
Final Office Action for U.S. Appl. No. 11/977,437, mailed on Apr. 8, 2010, 18 pages.
Notice of Allowance for U.S. Appl. No. 11/977,440, mailed on Oct. 7, 2009, 6 pages.
Office Action for U.S. Appl. No. 11/874,197, mailed on Nov. 10, 2009, 14 pages.
Final Office Action for U.S. Appl. No. 11/874,197, mailed on Jun. 29, 2010, 17 pages.
Non-Final Office Action for U.S. Appl. No. 11/874,197, mailed on Dec. 22, 2010, 22 pages.
Non-Final Office Action for U.S. Appl. No. 11/873,407, mailed on Nov. 13, 2009, 7 pages.
Final Office Action for U.S. Appl. No. 11/873,407, mailed on Apr. 26, 2010, 11 pages.
Notice of Allowance for U.S. Appl. No. 11/873,407, mailed on Nov. 10, 2010, 14 pages.
Notice of Allowance for U.S. Appl. No. 11/873,407, mailed on Mar. 7, 2011, 8 pages.
Non-Final Office Action for U.S. Appl. No. 11/601,415, mailed on Sep. 17, 2008, 10 pages.

(56) References Cited

OTHER PUBLICATIONS

Final Office Action for U.S. Appl. No. 11/601,415, mailed on May 27, 2009, 26 pages.
Advisory Action for U.S. Appl. No. 11/601,415, mailed on Aug. 18, 2009, 3 pages.
Non-Final Office Action for U.S. Appl. No. 11/601,415, mailed on Nov. 30, 2009, 32 pages.
Final Office Action for U.S. Appl. No. 11/601,415, mailed on Jun. 30, 2010, 45 pages.
Non-Final Office Action for U.S. Appl. No. 11/927,681, mailed on Mar. 24, 2011, 17 pages.
Non-Final Office Action for U.S. Appl. No. 11/927,683, mailed on Mar. 24, 2011, 13 pages.
Non-Final Office Action for U.S. Appl. No. 10/948,523, mailed on Jan. 22, 2007, 31 pages.
Final Office Action for U.S. Appl. No. 10/948,523, mailed on Jul. 6, 2007, 37 pages.
Non-Final Office Action for U.S. Appl. No. 10/948, 523, mailed Dec. 11, 2007, 47 pages.
Notice of Allowance for U.S. Appl. No. 10/948,523, mailed on Jul. 8, 2008, 30 pages.
Supplemental Notice of Allowance for U.S. Appl. No. 10/948,523, mailed on Jul. 17, 2008, 4 pages.
Notice of Allowance for U.S. Appl. No. 10/948,523, mailed on Dec. 1, 2010, 17 pages.
U.S. Appl. No. 12/548,187, Final Office Action mailed on Jun. 10, 2013, 18 pages.
U.S. Appl. No. 13/102,665, Final Office Action mailed on Jul. 9, 2013, 17 pages.
U.S. Appl. No. 13/107,742, Final Office Action mailed on Jul. 3, 2013, 19 pages.
Notice of Allowance for U.S. Appl. No. 11/977,437 dated Jul. 10, 2013, 10 pages.
SQL Tutorial-In, Tizag.com, http://web.archive.org/web/20090216215219/http://www.tizag.com/sgiTutorial/sqlin.php, Feb. 16, 2009, pp. 1-3.
Abadi, et al., "Aurora: A Data Stream Management System," International Conference on Management of Data, Proceedings of the 2003 ACM SIGMOD International Conference on Management of Data, ACM Press, 2003, 4 pages.
Aho, et al., "Efficient String Matching: An Aid to Bibliographic Search," Communications of the ACM, Jun. 1975, vol. 18, No. 6, pp. 333-340, Copyright 1975, Association for Computing Machinery, Inc.
Arasu, "CQL: A language for Continuous Queries over Streams and Relations," Lecture Notes in Computer Science, 2004, vol. 2921/2004, pp. 1-19.
Arasu, et al., "The CQL Continuous Query Language: Semantic Foundations and Query Execution," Stanford University, The VLDB Journal—The International Journal on Very Large Data Bases, Jun. 2006, vol. 15, issue 2, pp. 1-32, Springer-Verlag New York, Inc.
Arasu, et al., "An Abstract Semantics and Concrete Language for Continuous Queries over Streams and Relations," 9th International Workshop on Database programming languages, Sep. 2003, 11 pages.
Arasu, et al., "STREAM: The Stanford Data Stream Management System," Department of Computer Science, Stanford University, 2004, p. 21.
Avnur, et al., "Eddies: Continuously Adaptive Query Processing," In Proceedings of the 2000 ACM SIGMOD International Conference on Data, Dallas TX, May 2000, 12 pages.
Avnur, et al., "Eddies: Continuously Adaptive Query Processing," slide show, believed to be prior to Oct. 17, 2007, 4 pages.
Babu, et al., "Continuous Queries over Data Streams," SIGMOD Record, Sep. 2001, vol. 30, No. 3, pp. 109-120.
Bai, et al., "A Data Stream Language and System Designed for Power and Extensibility," Conference on Information and Knowledge Management, Proceedings of the 15th ACM International Conference on Information and Knowledge Management, Arlington, Virginia, Nov. 5-11, 2006, 10 pages, Copyright 2006, ACM Press.
Bose, et al., "A Query Algebra for Fragmented XML Stream Data", 9th International Conference on Data Base Programming Languages (DBPL), Sep. 6-8, 2003, Potsdam, Germany, at URL: http://lambda,uta.edu/dbp103.pdf, 11 pages.
Buza, "Extension of CQL over Dynamic Databases," Journal of Universal Computer Science, 2006, vol. 12, No. 9, pp. 1165-1176.
Carpenter, "User Defined Functions," Oct. 12, 2000, at URL: http://www.sqlteam.com/itemprint.asp?ItemID=979, 4 pages.
Chan, et al., "Efficient Filtering of XML documents with Xpath expressions," VLDB Journal, 2002, pp. 354-379.
Chandrasekaran, et al., "TelegraphCQ: Continuous Dataflow Processing for an Uncertain World," Proceedings of CIDR 2003, 12 pages.
Chen, et al., "NiagaraCQ: A Scalable Continuous Query System for Internet Databases," Proceedings of the 2000 SIGMOD International Conference on Management of Data, May 2000, pp. 379-390.
Colyer, et al., "Spring Dynamic Modules Reference Guide," Copyright 2006-2008, ver. 1.0.3, 73 pages.
Colyer, et al., "Spring Dynamic Modules Reference Guide," Copyright 2006-2008, ver. 1.1.3, 96 pages.
"Complex Event Processing in the Real World," an Oracle White Paper, Sep. 2007, 13 pages.
Conway, "An Introduction to Data Stream Query Processing," Truviso, Inc., May 24, 2007, at URL: http://neilconway.org/talks/stream_intro.pdf, 71 pages.
"Coral8 Complex Event Processing Technology Overview," Coral8, Inc., Make it Continuous, pp. 1-8, Copyright 2007, Coral8, Inc.
"Creating WebLogic Domains Using the Configuration Wizard," Bea Products, Dec. 2007, ver. 10.0, 78 pages.
"Creating Weblogic Event Server Applications," BEA WebLogic Event Server, Jul. 2007, ver. 2.0, 90 pages.
Demers, et al., "Towards Expressive Publish/Subscribe Systems," Proceedings of the 10th International Conference on Extending Database Technology (EDBT 2006), Munich, Germany, Mar. 2006, pp. 1-18.
DeMichiel, et al., "JSR 220: Enterprise JavaBeans™, EJB 3.0 Simplified API," EJB 3.0 Expert Group, Sun Microsystems, May 2, 2006, ver. 3.0, 59 pages.
"Dependency Injection," Wikipedia, Dec. 30, 2008, printed on Apr. 29, 2011, at URL: http:en.wikipedia.org/w/index.php?title=Dependency_injection&oldid=260831402, pp. 1-7.
"Deploying Applications to WebLogic Server," BEA WebLogic Server, Mar. 30, 2007, ver. 10.0, 164 pages.
Deshpande, et al., "Adaptive Query Processing," slide show believed to be prior to Oct. 17, 2007, 27 pages.
"Developing Applications with Weblogic Server," BEA WebLogic Server, Mar. 30, 2007, ver. 10.0, 254 pages.
Diao, "Query Processing for Large-Scale XML Message Brokering," 2005, University of California Berkeley, 226 pages.
Diao, et al. "Query Processing for High-Volume XML Message Brokering", Proceedings of the 29th VLDB Conference, Berlin, Germany, 2003, 12 pages.
Dindar, et al., "Event Processing Support for Cross-Reality Environments," Pervasive Computing, IEEE CS, Jul.-Sep. 2009, pp. 2-9, Copyright 2009, IEEE.
"EPL Reference," BEA WebLogic Event Server, Jul. 2007, ver. 2.0, 82 pages.
Esper Reference Documentation, Copyright 2007, ver. 1.12.0, 158 pages.
Esper Reference Documentation, Copyright 2008, ver. 2.0.0, 202 pages.
"Fast Track Deployment and Administrator Guide for BEA WebLogic Server," BEA WebLogic Server 10.0 Documentation, printed on May 10, 2010, at URL: http://download.oracle.com/docs/cd/E13222_01/wls/docs100/quickstart/quick_start.html, 1 page.
Fernandez, et al., "Build your own XQuery processor", slide show, at URL: http://www.galaxquery.org/slides/edbt-summer-school2004.pdf, 2004, 116 pages.
Fernandez, et al., Implementing XQuery 1.0: The Galax Experience:, Proceedings of the 29th VLDB Conference, Berlin, Germany, 2003, 4 pages.

(56) References Cited

OTHER PUBLICATIONS

Florescu, et al., "The BEA/XQRL Streaming XQuery Processor," Proceedings of the 29th VLDB Conference, 2003, Berlin, Germany, 12 pages.

"Getting Started with WebLogic Event Server," BEA WebLogic Event Server, Jul. 2007, ver. 2.0, 66 pages.

Gilani, "Design and implementation of stream operators, query instantiator and stream buffer manager," Dec. 2003, 137 pages.

Golab, "Sliding Window Query Processing Over Data Streams," University of Waterloo, Waterloo, Ont. Canada, Aug. 2006, 182 pages.

Golab, et al., "Issues in Data Stream Management," ACM SIGMOD Record, vol. 32, issue 2, Jun. 2003, ACM Press, pp. 5-14.

Gosling, et al., "The Java Language Specification," Book, copyright 1996-2005, 3rd edition, 684 pp., Sun Microsystems USA. (due to size, reference will be uploaded in two parts).

Hopcroft, "Introduction to Automata Theory, Languages, and Computation," Second Edition, Addison-Wesley, Copyright 2001, 524 pages. (due to size, reference will be uploaded in two parts).

"Installing Weblogic Real Time," BEA WebLogic Real Time, Jul. 2007, ver. 2.0, 64 pages.

"Introduction to BEA WebLogic Server and BEA WebLogic Express," BEA WebLogic Server, Mar. 2007, ver. 10.0, 34 pages.

"Introduction to WebLogic Real Time," Bea WebLogic Real Time, Jul. 2007, ver. 2.0, 20 pages.

"Jboss Enterprise Application Platform 4.3 Getting Started Guide CP03, for Use with Jboss Enterprise Application Platform 4.3 Cumulative Patch 3," Jboss a division of Red Hat, Red Hat Documentation Group, Publication date Sep. 2007, Copyright 2008, 68 pages, Red Hat, Inc.

Jin, et al. "ARGUS: Efficient ficient Scalable Continuous Query Optimization for Large-Volume Data Streams" 10th International Database Engineering and Applications Symposium (IDEAS'06), 2006, 7 pages.

Kawaguchi, "Java Architecture for XML Binding _ (JAXB) 2.0," Sun Microsystems, Inc., Apr. 19, 2006, 384 pages.

Oracle Application Server, Administrators Guide, 10g Release 3 (10.1.3.2.0), B32196-01, Jan. 2007, 376 pages, Oracle.

Oracle Database Data Cartridge Developers Guide, B28425-03, 11g Release 1 (11.1), Oracle, Mar. 2008, 372 pages, Oracle.

Oracle Database, SQL Reference, 10g Release 1 (10.1), Part No. B10759-01, Dec. 2003, pp. 7-1 to 7-17; 7-287 to 7-290; 14-61 to 14-74. (due to size, reference will be uploaded in three parts).

Stream Query Repository: Online Auctions (CQL Queries), at URL: http://www-db.stanford.edu/strem/sqr/cql/onauc.html, Dec. 2, 2002, 4 pages.

W3C, "XML Path Language (Xpath)," W3C Recommendation, Nov. 16, 1999, ver. 1.0, at URL: http://www.w3.org/TR/xpath, 37 pages.

White, et al., "WebLogic Event Server: A Lightweight, Modular Application Server for Event Processing," 2nd International Conference on Distributed Event-Based Systems, Jul. 2-4, 2008, Rome, Italy, 8 pages, ACM Press, Copyright 2004.

Zemke," XML Query," Mar. 14, 2004, 29 pages.

Non-Final Office Action for U.S. Appl. No. 11/874,896, mailed on Nov. 22, 2010, 25 pages.

Notice of Allowance for U.S. Appl. No. 11873,407, mailed on Mar. 7, 2011, 8 pages.

Non-Final Office Action for U.S. Appl. No. 10/948,523, mailed Dec. 11, 2007, 47 pages.

\* cited by examiner

```
SELECT
        T.price
FROM Ticker MATCH_RECOGNIZE (
   )              PARTITION BY Symbol
  202             MEASURES D.price as price
         203 ⁀ PATTERN (A B C A B D) ⁀ 204
                 DEFINE A as (A.price >=30 AND A.price <= 40), ⎫
                        B as (B.price < PREV(B.price)),         ⎬ 206
                        C as (C.price <= PREV(C.price)),        ⎪
                        D as (D.price > PREV(D.price))          ⎭

```
SELECT                                                              ← 500
        T.price
FROM Ticker MATCH_RECOGNIZE (
        PARTITION BY Symbol
        MEASURES C.price as price
        PATTERN (A B* C)  ∼ 502
        DEFINE A as (A.price = 10 OR A.price = 20 OR  ⎫
                     A.price = 30 OR A.price = 40),   ⎪
               B as (B.price = 10 OR B.price = 20 OR  ⎬ 504
                     B.price = 50 OR B.price = 70),   ⎪
               C as (C.price = 10 OR C.price = 30 OR  ⎪
                     C.price = 50 OR C.price = 60)    ⎭
) as T
```

*FIG. 5* create query tkpattern_q10 as
SELECT T.Ac1, T.sumB, T.Cc1
FROM tkpattern_S5 MATCH_RECOGNIZE (
      MEASURES A.c1 as Ac1,
             sum(B.c1) as sumB,
             C.c1 as Cc1
802 — PATTERN(A B* C)
      DEFINE A as A.c1 = 10,
            B as B.c1 > A.c1 ,
            C as C.c1 * 10 > avg(B.c1)  } 804
) as T A match would be:
10 11 12 13 2
A   B   B   B   C

FIG. 8

BASIC REGULAR EXPRESSION

CONCATENATION OPERATOR (.)

TECHNIQUES FOR PERFORMING REGULAR EXPRESSION-BASED PATTERN MATCHING IN DATA STREAMS

CROSS-REFERENCES TO RELATED APPLICATIONS

This application claims the benefit and priority under 35 U.S.C. 119 (e) of U.S. Provisional Application Ser. No. 61/092,983, filed Aug. 29, 2008, entitled FRAMEWORK FOR SUPPORTING REGULAR EXPRESSION-BASED PATTERN MATCHING IN DATA STREAMS, the contents of which are herein incorporated by reference in their entirety for all purposes.

The present application incorporates by reference for all purposes the entire contents of the following related applications filed concurrently with the present application:

(1) U.S. application Ser. No. 12/548,187, filed Aug. 26, 2009 ; and (2) U.S. application Ser. No. 12/548,209, filed Aug. 26, 2009.

BACKGROUND OF THE INVENTION

The present application relates to processing of data streams and more particularly to techniques for detecting patterns in data or event streams.

Databases have traditionally been used in applications that require storage of data and querying capability on the stored data. Existing databases are thus best equipped to run queries over finite stored data sets. However, the traditional database model is not well suited for a growing number of modern applications in which data is received as a stream of data events instead of a bounded data set. A data stream, also referred to as an event stream, is characterized by a real-time, potentially continuous, sequence of events. A data or event stream thus represents unbounded sets of data. Examples of sources that generate data streams include sensors and probes (e.g., RFID sensors, temperature sensors, etc.) configured to send a sequence of sensor readings, financial tickers, network monitoring and traffic management applications sending network status updates, click stream analysis tools, and others.

Pattern matching is commonly used for analyzing data. For example, data stored in a database may be analyzed to determine if the data matches a pattern. It is desirable to efficiently perform pattern matching on data received in the form of data or event streams.

BRIEF SUMMARY OF THE INVENTION

Embodiments of the present invention provide techniques for detecting patterns in one or more data streams. A pattern to be detected may be specified using a regular expression. Events received in a data stream are processed during runtime to detect occurrences of the specified pattern in the data stream.

According to an embodiment of the present invention, techniques are provided for detecting a pattern in a data stream comprising events. Predicate information may be received specifying a predicate associated with each symbol in a set of one or more symbols. A regular expression may be received specifying a pattern, the regular expression comprising one or more symbols from the set of symbols. An automaton may be constructed for the pattern. Upon receiving an event in the data stream, processing may be performed comprising determining, based upon the received event, one or more states of the automaton and associated bindings, wherein at least one state in the one or more states has multiple associated bindings, and determining if the pattern is matched due to the received event based upon the one or more states and associated bindings.

According to an embodiment of the present invention, the processing may further comprise, upon receiving an event in the data stream, determining one or more symbols from the set of symbols that are matched due to the received event, wherein a symbol is matched if the predicate associated with the symbol is satisfied due to the received event and determining the one or more states based upon the one or more symbols and set of states and associated bindings stored prior to receiving the input event.

In one embodiment, the predicate information may specify a predicate that is associated with a first symbol in the set of symbols and is dependent upon a second symbol included in the set of symbols. The regular expression may comprise at least one of an alternation operator, a grouping operator, or an aggregation operator. The regular expression may comprise at least one of an alternation operator, a grouping operator, or an aggregation operator. In one embodiment, at least one symbol in the regular expression has an associated lazy quantifier.

BRIEF DESCRIPTION OF THE DRAWINGS

FIG. 2 depicts an example of a query comprising a regular expression specifying a pattern to be matched according to an embodiment of the present invention;

FIG. 5 depicts an example of a query 500 identifying a Class A pattern according to an embodiment of the present invention;

FIG. 8 is an example of a query specifying a Class B pattern but not a Class A pattern according to an embodiment of the present invention;

DETAILED DESCRIPTION OF THE INVENTION

In the following description, for the purposes of explanation, specific details are set forth in order to provide a thorough understanding of embodiments of the invention. However, it will be apparent that the invention may be practiced without these specific details.

Embodiments of the present invention provide techniques for detecting patterns in data or event streams. A pattern to be detected may be specified using a regular expression. Events received in data streams are processed during runtime to detect occurrences of the pattern specified by the regular expression in the data stream.

Figure 1:
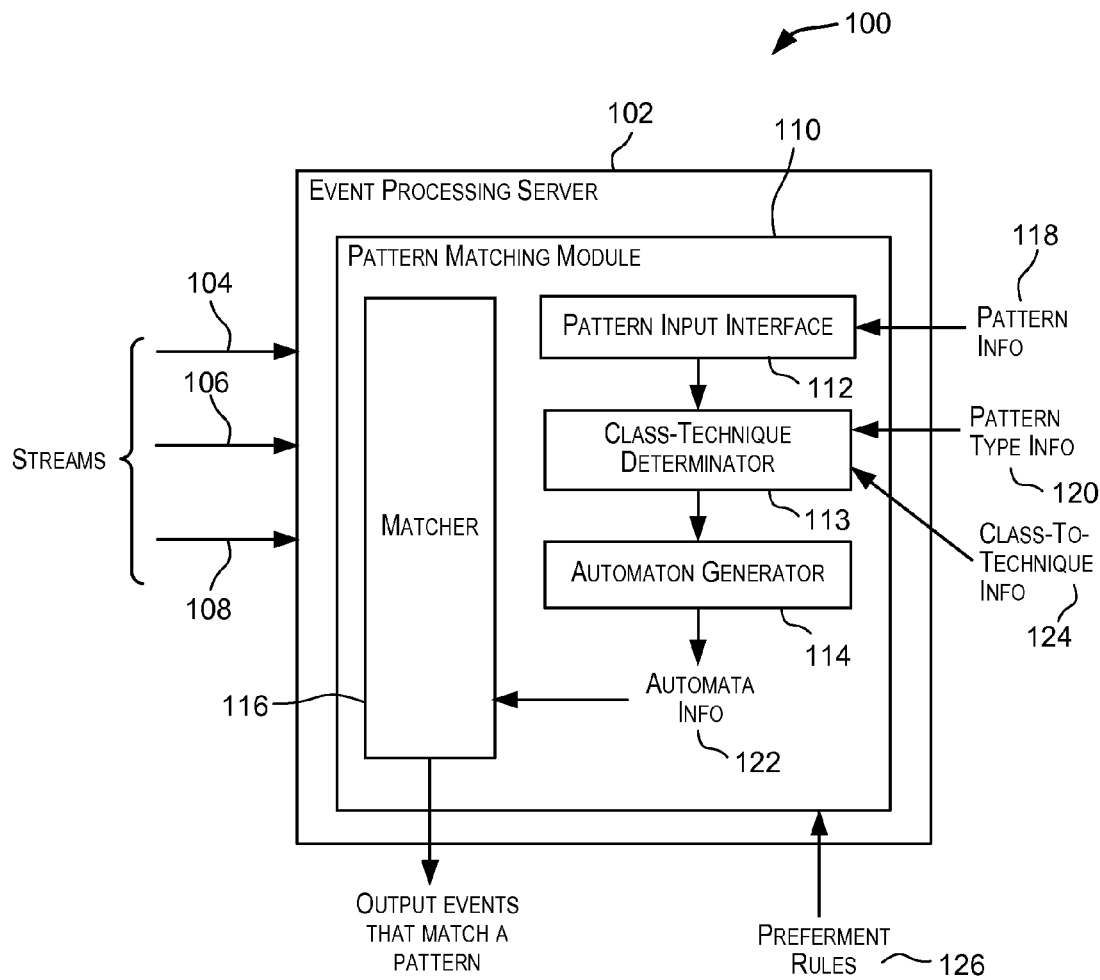
FIG. 1 is a simplified block diagram of a system that incorporates an embodiment of the present invention.

FIG. 1 is a simplified block diagram of a system 100 that may incorporate an embodiment of the present invention. As depicted in FIG. 1, system 100 comprises an events processing server 102 that is configured to process one or more incoming data or event streams 104, 106, and 108. Streams 104, 106, and 108 may be received from different sources including a database, a file, a messaging service, various applications, devices such as various types of sensors (e.g., RFID sensors, temperature sensors, etc.), tickers, and the like. Server 102 may receive the streams via a push-based mechanism or a pull-based mechanism or other mechanisms.

A data or event stream is a real-time sequence of events. Multiple events may be received in a stream. The data stream can thus be considered as a stream of unbounded sets of data. In one embodiment, a data stream is a sequence of <tuple, timestamp> pairs. The tuple refers to the data portion of a stream. A tuple may be considered as similar to a row in a table. The tuples in a stream have a schema. A stream can include multiple tuples. Timestamps define an order over the tuples in a data stream. The timestamps in a data stream may reflect an application's notion of time. For example, the timestamp may be set by an application on the system receiving an event stream. The receiving system may timestamp an event on receipt as configured by the application, for example, if specified in the CREATE STREAM DDL that is used to define a structure of the events stream and the mechanism used to use application time or system time as the timestamp. In other embodiments, the timestamp associated with a tuple may correspond to the time of the application sending the data events. The timestamp is part of the schema of a stream. There could be one or multiple tuples with the same timestamp in a stream. The tuples in a stream can be viewed as a series of events and accordingly the data stream is also referred to as an event stream. An event stream can thus be considered to comprise a series of events, each with an associated timestamp. For example, an event stream may comprise a series of temperature readings from a sensor such as 10°, 15°, 20°, etc. and associated time stamps. For purposes of this application, the terms "tuple" and "event" are being used interchangeably.

System 100 comprises an event processing server 102 that is configured to process event streams. Event processing server 102 may receive one or more event streams. As shown in FIG. 1, event processing server 102 receives streams 104, 106, and 108. Each event stream comprises one or more events. The events in a stream are received by server 102 in a sequence at specific time points. Server 102 is configured to perform various types of processing on the incoming streams. According to an embodiment of the present invention, server 102 is configured to detect patterns in the incoming event streams based upon the events in the event streams received by server 102. In one embodiment, server 102 performs the pattern matching without doing any backtracking processing on the events of the stream being analyzed as the events are received by server 102. Pattern matching may be performed using a type of continuous query that is applied to the incoming streams. Server 102 may also perform other types of processing on the input streams such as running other continuous queries on the incoming event streams, and other operations. An example of an event processing server is the Oracle Complex Event Processor from Oracle™ Corporation.

In the embodiment depicted in FIG. 1, server 102 comprises a pattern matching module 110 that is configured to perform processing related to pattern matching for one or more event streams. As depicted in FIG. 1, pattern matching module 110 comprises a pattern input interface 112, a class-technique determinator 113, an automaton generator 114, and a matcher 116. Pattern input interface 112 provides an interface for receiving information specifying patterns to be matched in the event streams. Pattern input interface 112 may provide a graphical user interface that allows information to be entered specifying one or more patterns to be matched, a command line interface for specifying the patterns to be matched, or some other interface. A pattern to be matched may be specified by a user of server 102. Information identifying a pattern to be matched may also be received from other sources, for example, from other components or modules of event processing server 102, or other systems or applications.

In one embodiment, patterns to be matched are specified using regular expressions. A regular expression is a string of symbols (also referred to as correlation names or correlation variables) representing the pattern to be matched. The regular expression is built using one or more symbols and may use one or more operators. Examples of operators include but are not limited to a concatenation operator (e.g., an "AND" operator between symbols in a regular expression may be used to indicate an AND relationship between the symbols), alternation operator (e.g., a vertical bar '|' may separate symbols in a regular expression indicating an OR condition for the symbols), one or more quantifiers, grouping operator (e.g., indicated by parentheses), and the like. Examples of quantifiers include an asterisk '*' implying zero or more occurrences of the symbol with which the quantifier is associated, a plus sign '+' implying one or more occurrences of the symbol with which the quantifier is associated, a question mark '?' implying zero or one occurrences of the symbol with which the quantifier is associated, reluctant quantifiers, and the like. Examples of operators and quantifiers that may be used, including associated syntax for the regular expressions, are provided and described in Fred Zemke et al., "Pattern Matching in Sequence of Rows (12)," ISO/IEC JTCi/SC32 WG3:URC-nnn, ANSI NCITS H2-2006-nnn, Jul. 31, 2007, the entire contents of which are herein incorporated by reference for all purposes.

In the past, regular expressions have been mainly used to find patterns in strings. In embodiments of the present invention, the power of regular expressions is used to match patterns in event streams received by event processing server 102. Regular expressions provide a simple, concise, and flexible way for specifying patterns to be matched. In the embodiment depicted in FIG. 1, event processing server 102 may receive pattern information 118 specifying a regular expression to be matched in one or more event streams. In one embodiment, the pattern may be specified using pattern input interface 112 of pattern matching module 110.

Pattern information 118 may be provided using different languages. In one embodiment, a programming language such as SQL, which is commonly used to query databases, may be used. Extensions may be provided to SQL to express the pattern to be matched for event streams. For example, pattern information 118 may specify a SQL query comprising a regular expression specifying a pattern to be matched in one or more event streams received by event processing server 102.

Oracle supports a CQL (Continuous Query Language) language in Complex Events Processing (CEP) products. CQL is very similar to SQL with extensions for stream processing. Pattern matching constructs proposed to extend SQL to specify pattern matching via regular expressions (e.g., the constructs described in Fred Zemke et al., "Pattern Matching in Sequence of Rows (12)," ISO/IEC JTCi/SC32 WG3:URC-nnn, ANSI NCITS H2-2006-nnn, Jul. 31, 2007, the entire contents of which are herein incorporated by reference for all purposes) have been adopted in CQL to extend CQL for the purpose of specifying pattern matching requirements over event streams.

Typically, pattern matching for a query pattern occurs only over a single input stream. Pattern matching may also be performed over multiple event streams, for example, using CQL. In one embodiment, this may be done by first performing a UNION of all the relevant input streams over which pattern matching is to be done with the result defining a view corresponding to an intermediate stream, and the pattern to be matched can be specified over this single intermediate stream. The pattern will then be matched to all the streams included in the view.

FIG. 2 depicts an example of a query 200 that may be provided specifying a pattern to be matched over an event stream according to an embodiment of the present invention. Query 200 comprises a FROM clause 202 that specifies an event stream "Ticker" over which pattern matching is to be performed. "Ticker" may represent a single event stream or a UNION of multiple streams.

Query 200 comprises a PATTERN component 203 that specifies a regular expression 204 identifying the pattern to be recognized in the event stream "Ticker". The regular expression (A B C A B D) in query 200 comprises several symbols or correlation names. The pattern specified in FIG. 2 is an example of a simple nonrecurring pattern. It is nonrecurring since each symbol in the pattern specifies only a single occurrence of that symbol and does not include recurrences of the symbol. The alphabet set for a pattern comprises distinct symbols in the pattern. For the above example, the alphabet set is {A, B, C, D}. Each symbol in the alphabet corresponds to a variable name corresponding to a Boolean condition that is specified in the DEFINE component 206 of the query.

The DEFINE component 206 of query 200 specifies Boolean conditions (or predicates) that define the symbols declared in the regular pattern. For the example depicted in FIG. 2, the symbols declared in pattern 204 include A, B, C, and D. The predicates or Boolean conditions associated with the symbols are defined by the DEFINE component as follows:

| Symbol | Predicate |
|---|---|
| A | 30 <= A.price <= 40 |
| B | B.price < PREV(B.price) |
| C | C.price <= PREV(C.price) |
| D | D.price > PREV(D.price) |

It should be understood that all symbols defined in regular expression do not require an associated predicate. A symbol with no associated predicate is by default assumed to be always matched or true. Such a symbol may be used to match any event in an event stream.

The predicates depicted above are all related to the price attribute of an event. An event may have one or more attributes. The predicates may be based upon these attributes. A particular symbol is deemed to be matched by an input event received in an event stream if the predicate associated with the symbol is matched or satisfied due to the input event. For example, symbol A in FIG. 2 is matched by a received event if the price attribute of the received event is greater than or equal to 30 and less than or equal to 40. Whether or not a predicate associated with a symbol is matched may depend on the present event and/or previously received events. For example, symbol B in FIG. 2 is matched by a received event if the price attribute of the received event is less than the price attribute of the event received just immediately preceding the presently received event. For the "Symbol" partition, when a PARTITION BY is specified (as in this example), PREV is the previous input received for that partition. A received input event in an event stream may cause zero or more symbols of the regular expression to be matched.

For the symbols and associated predicates depicted in FIG. 2:
(1) the symbol A is matched by an event received in the Ticker event stream if the value of the price attribute of the event is greater than or equal 30 and less than or equal to 40;
(2) the symbol B is matched by an event received in the Ticker event stream if the value of the price attribute of the received event is less than the price of the event received just immediately preceding the presently received event;
(3) the symbol C is matched by an event received in the Ticker event stream if the value of the price attribute of the received event is less than or equal to the price of the event received just immediately preceding the presently received event; and
(4) the symbol D is matched by an event received in the Ticker event stream if the value of the price attribute of the received event is greater than the price of the event received just immediately preceding the presently received event. As discussed earlier, for the "Symbol" partition, when a PARTITION BY is specified (as in this example), PREV is the previous input received for that partition.

As evident from the above, matching of symbols in a regular expression to events received in an event stream is quite different from conventional pattern matching in strings using regular expressions. In event stream pattern matching, a symbol in a regular expression is considered matched by a received event only if the predicate associated with the symbol is satisfied by the event. This is unlike character string matching using regular expressions wherein a symbol is matched if that symbol itself is present in the string to be matched. Further, in event stream pattern matching, multiple predicates can be satisfied at the same time and as a result multiple symbols may be matched by a received input event. This is not the case in regular string matching. Several other differences exist between pattern matching in strings and pattern matching in event streams.

For the pattern specified in FIG. 2, the pattern corresponding to (ABCABD) is matched in the event stream when symbol A is matched, followed by a match of B, followed by a match of C, followed by a match of A, followed by a match of B, and followed by a match of D. An example of runtime pattern matching processing performed for the pattern depicted in FIG. 2 is described below.

As indicated above, a pattern may be specified using a query, such as a CQL query depicted in FIG. 2. In one embodiment, the syntax for such a query follows the query standards specified in Fred Zemke et al., "Pattern Matching in Sequence of Rows (12)," ISO/IEC JTCi/SC32 WG3:URC-nnn, ANSI NCITS H2-2006-nnn, Jul. 31, 2007, the entire contents of which are herein incorporated by reference for all purposes. Some of the components of the query include:

FROM <data_stream_name>—specifies the event stream over which pattern matching is to be performed.

MATCH_RECOGNIZE—Clause that contains all the sub-clauses or components relevant to the pattern specification.

PARTITION BY—Used to specify how the event stream is to be partitioned. If this clause is not used, then all the events constitute one partition.

AFTER MATCH SKIP TO—This clause determines the resumption point of pattern matching after a match has been found in the event stream.

PATTERN—Used to specify a regular expression built using one or more symbols and may contains operators.

DEFINE—This component is used to specify the predicates that define the symbols declared in the pattern.

As described above, SQL extensions are provided for specifying a query for performing pattern matching over event streams. The query may comprise a regular expression identifying the pattern to be matched and predicates defining or associated with symbols in the regular expression. The extensions enhance the ability to use SQL for performing pattern matching on event streams.

Referring back to FIG. 1, pattern information 118 is provided to class-technique determinator module 113 for further processing. Class-technique determinator module 113 is configured to identify a type or class of pattern based upon information 118 and to further determine a pattern matching technique to be used for performing pattern matching for the identified pattern type or class. Pattern matching module 110 is capable of performing for different types of patterns. In one embodiment, the type of class for a pattern is determined based upon the regular expression specified in information 118 and/or based upon the predicates associated with the symbols in the regular expression. Class-technique determinator module 113 is configured to analyze the regular expression and predicates specified in information 118 and determine a pattern class or type based upon the analysis.

In one embodiment, class-technique determinator uses pattern type information 120 identifying to determine the pattern class or type for the information provided in 118. Pattern type information 120 may identify different pattern types or classes and characteristics associated with the different pattern classes. Pattern matching module 110 may use pattern type information 120 to automatically identify a particular type or class of pattern for the pattern specified in pattern information 118 from among multiple pattern classes that module 110 is capable of processing. In another embodiment, pattern type information 120 is not needed, and pattern matching module 110 may be configured to automatically determine a type of pattern by analyzing the information provided in pattern information 118.

In one embodiment, pattern matching module 110 is configured to apply different pattern matching techniques for different types or classes of patterns. After a pattern type has been determined for the pattern specified in pattern information 118, module 113 is configured to determine a particular pattern matching technique, from among multiple available techniques, that is suited for performing pattern matching for the determined pattern. In this manner, a customized pattern matching technique or a technique that is best suited for performing pattern matching for the determined pattern type is determined. This helps to improve the efficiency of the pattern matching process for specific types of patterns.

In one embodiment, class-to-technique information 124 may be provided to pattern matching module 110 identifying one or more pattern classes and one or more pattern matching techniques to be used for detecting pattern matches for each pattern class. After a class of pattern specified in pattern information 118 has been determined, pattern matching module 110 may use class-to-technique information 124 to determine a specific pattern matching technique to be used for finding matches in the event stream. For example, if the pattern is determined to be a Class A pattern, then a pattern matching technique appropriate for a Class A pattern may be used for performing the pattern matching. Whereas, if the pattern is determined to be a Class B pattern, then a pattern matching technique appropriate for a Class B pattern may be used for performing the pattern matching.

In one embodiment, the pattern matching process comprises constructing a finite state automaton (FSA) for a given pattern and then using the constructed FSA to guide the pattern matching process during runtime as events are received. Automaton generator 114 is configured to parse the input regular expression received via interface 112 and build an automaton for the pattern to be matched. One or more automata constructed by generator 114 may be stored as automata information 122. The automaton generated for a pattern is then used in runtime by matcher 116 to guide detection of the pattern in event streams 104, 106, and 108.

As previously indicated, the pattern matching process may be customized for certain classes of patterns. In one embodiment, automaton generator 114 may receive information from class-technique module 113 identifying the class of the pattern and the technique to be used for performing the pattern matching for the identified class of pattern. Automaton generator 114 may then generate an automaton using the selected pattern matching technique.

Matcher 116 is configured to process the events received in the events streams during runtime to detect occurrences of the specified pattern in the incoming event streams. Matcher 116 uses the automaton generated by automaton generator 114 to guide the pattern matching process. For each event stream, the automaton is used as a guide to indicate how much of the specified pattern is matched by the events received in the event stream at any point in time. In one embodiment, bindings are maintained by matcher 116 after each event in an event stream is processed to capture the state of partial or full matches of the pattern at any point in time. A binding is like an assignment of contiguous events (and in the case of PARTITIONS, contiguous within the PARTITION) to one or more correlation names that corresponds to a partial (or possibly full) match that satisfies all the DEFINE predicates associated with the pattern. A binding indicates that degree to which a pattern is matched as a result of the last received event. Bindings stored after receiving an event may indicate partial matches that have the potential of becoming longer matches or full matches. If a particular pattern matching technique has been selected, matcher 116 may perform the processing according to the selected technique.

Matcher 116 may be configured to take one or more actions when a particular pattern is matched or detected in an event stream. For example, when a pattern is matched, matcher 116 may send a signal indicating that the pattern has been matched. The signal may be forwarded to one or more components of events processing server 102 or some other system for further processing. In one embodiment, the action may include outputting the events that resulted in the pattern being matched.

System 100 depicted in FIG. 1 is an example of a system which may incorporate an embodiment of the present invention. Various other embodiments and variations are possible. Similarly, the various modules depicted in FIG. 1 are shown as examples and are not intended to limit the scope of the present invention. In alternative embodiments, more or less modules may be present. The various modules depicted in FIG. 1 may be implemented in software (e.g., code, program, instructions) executed by a processor, hardware, or combinations thereof. For example, in some embodiments, a separate class-technique determinator module 113 may not be provided. In such embodiments, the processing performed by module 113 may instead be performed by automaton generator 114 and matcher 116. In one such embodiment, automaton generator 114 may be configured to automatically determine a pattern class or type for the pattern specified in pattern information 118 and build an automaton. Matcher 116 may be configured to determine a pattern matching technique to be used for the determined pattern and then apply the determined technique during runtime processing of events received in an event stream.

Figure 3:
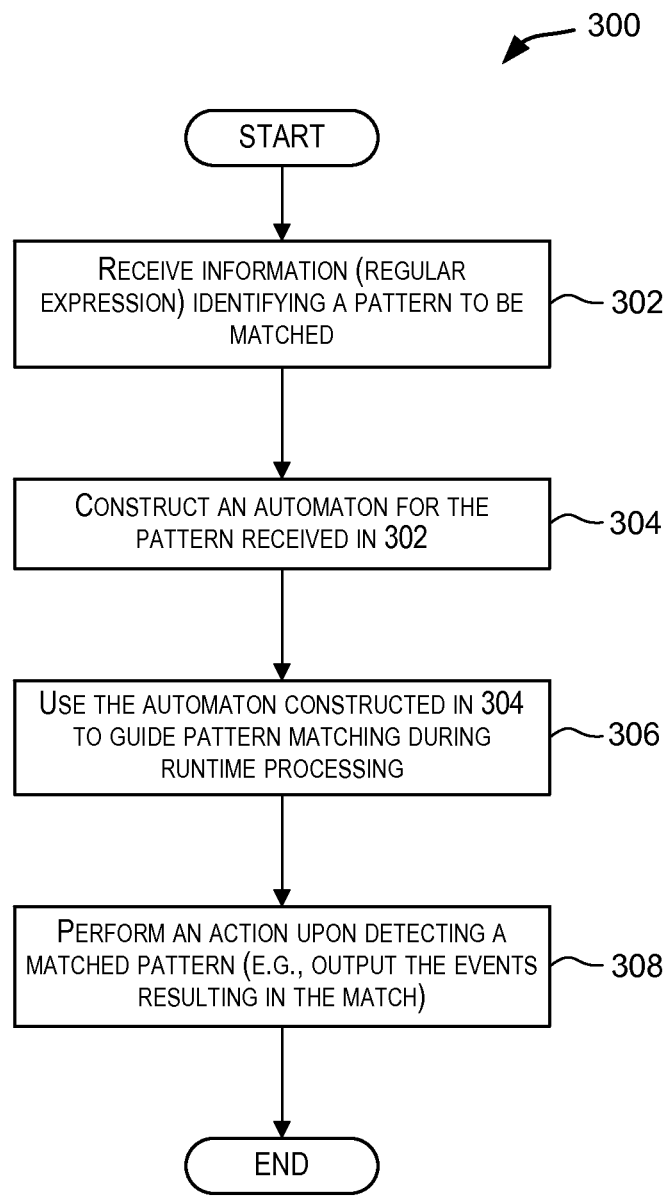
FIG. 3 is a simplified flowchart depicting a method of performing pattern matching on an event stream according to an embodiment of the present invention.

FIG. 3 is a simplified flowchart 300 depicting a method of performing pattern matching on an event stream according to an embodiment of the present invention. In one embodiment, the method depicted in FIG. 3 is performed by pattern matching module 110 depicted in FIG. 1. The processing depicted in FIG. 3 may be performed by software (e.g., code, program, instructions) executed by a processor, in hardware, or combinations thereof. The software may be stored in a computer-readable storage medium. The method depicted in FIG. 3 may be applied to multiple event streams.

As depicted in FIG. 3, processing is initiated upon receiving information identifying a pattern to be matched (step 302). In one embodiment, the information received in 302 comprises a regular expression specifying the pattern to be matched. For example, a query may be received in 302 specifying a regular expression identifying a pattern to be matched. The information received in 302 may also identify the event streams that are to be analyzed to determine if events received in the event streams match the specified pattern. The information received in 302 may also specify predicates associated with the symbols in the regular expression.

An automaton is then constructed for the pattern received in 302 (step 304). The automaton generated in 304 may be a finite state automaton (FSA).

The automaton constructed in 304 is then used during runtime to guide the pattern matching process to detect presence of the specified pattern in the specified event streams (step 306). As part of the processing, the event streams to be analyzed are passed through a state machine corresponding to the automaton generated in 304. As part of the processing in 306, bindings are maintained after each event received in an event stream has been analyzed to store the state of pattern matches, including partial matches that have the potential to turn into full matches, after processing the received event. As previously described, a binding is used to encapsulate a full or partial pattern match and maintains references to the received events of the stream that comprise the full or partial matched pattern.

One or more actions may be performed upon detecting a pattern match in an input event stream being analyzed (step 308). The actions performed may include sending a signal indicating a match, outputting the events in the event stream that resulted in the pattern match, and other actions.

Steps 302 and 304 typically represent design time or compile time activities that are performed before the pattern matching analysis may be performed. Steps 306 and 308 represent runtime activities that are performed in real time as events in an event stream are received and processed.

Figure 4:
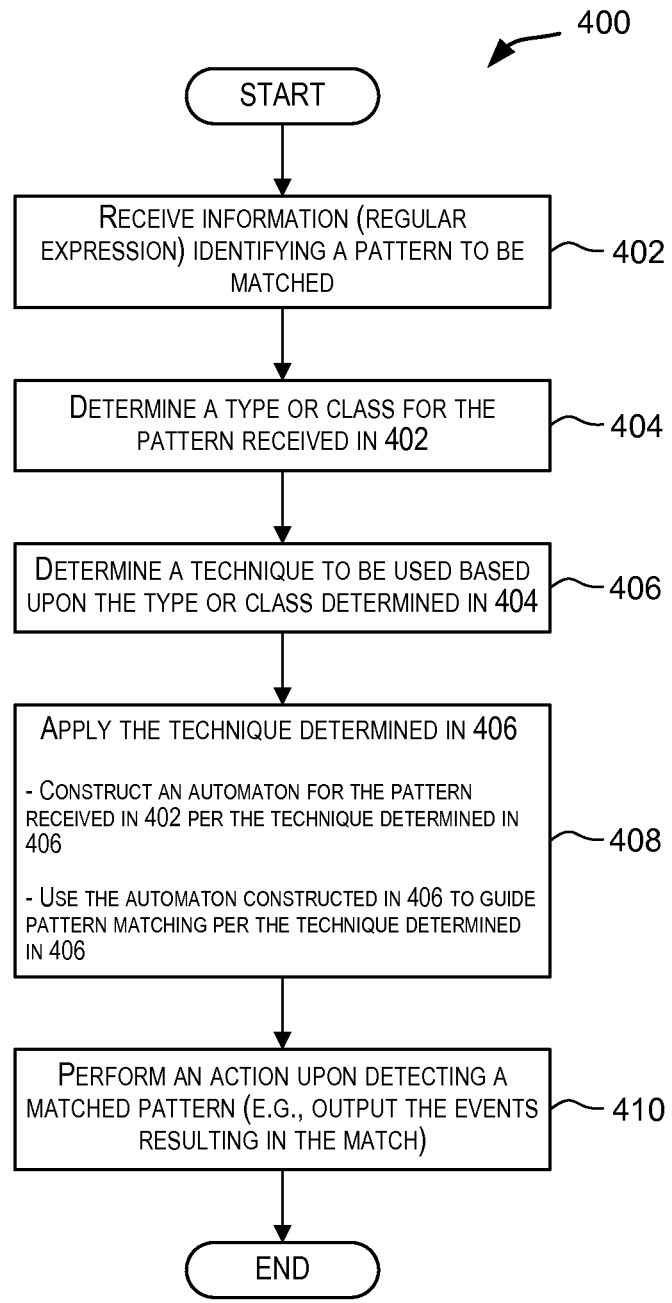
FIG. 4 is a simplified flowchart depicting a method of performing pattern matching on an event stream based upon the type of the pattern according to an embodiment of the present invention.

As indicated above, in one embodiment of the present invention, the type or class of the pattern to be matched is determined and then used to customize the pattern matching processing. FIG. 4 is a simplified flowchart 400 depicting a method of performing pattern matching on an event stream based upon the type of the pattern according to an embodiment of the present invention. In one embodiment, the method depicted in FIG. 4 is performed by pattern matching module 110 depicted in FIG. 1. The processing depicted in FIG. 4 may be performed by software (e.g., code, program, instructions) executed by a processor, in hardware, or combinations thereof. The software may be stored in a computer-readable storage medium.

As depicted in FIG. 4, processing is initiated upon receiving information identifying a pattern to be matched (step 402). The information received in 402 may comprise a regular expression identifying the pattern to be detected in an event stream and information identifying predicates associated with the one or more symbols in the regular expression.

Processing is then performed to determine a type or class of pattern for the pattern received in 402 (step 404). In one embodiment, the class of pattern may be determined based upon the regular expression received in 402 and/or the predicates defined for the symbols in the regular expression. For example, the type or class of pattern may be determined based upon the contents of the PATTERN and DEFINE clauses. Accordingly, in one embodiment, as part of the processing performed in 404, the information received in 402 is parsed to determine the contents of the PATTERN and DEFINE clauses. A type or class is then determined based upon analysis of the extracted contents.

In one embodiment, preconfigured information identifying different types of patterns and their associated characteristics may be used to facilitate the pattern type identification in 404. For example, as depicted in FIG. 1, pattern type information 120 depicted may be used to facilitate determination of the class or type. In one embodiment, pattern type information 120 may identify different types or classes of patterns and information specifying characteristics of each type and class.

A technique to be used for performing the pattern matching processing is then determined based upon the pattern class or type determined in 404 (step 406). In one embodiment, preconfigured information identifying different types of patterns and techniques to be used for each class may be used to facilitate identification of the technique in 406. For example, as depicted in FIG. 1, class-to-technique information 124 may be used to facilitate determination of a technique to be used based upon the class or type determined in 404.

Pattern matching processing is then performed by applying the technique determined in 406 (step 408). The processing performed in 408 may include constructing an an automaton for the pattern received in 402. The automaton generation may be performed according to the technique determined in 406. Accordingly, the automaton generated in 408 may be customized for the particular class or type determined in 404.

Further, as part of the processing performed in 408, the automaton that is constructed may then be used during runtime to guide the pattern matching process to detect presence of the specified pattern in a specified event stream. The pattern detection may be performed per the technique determined in 406. In this manner, a pattern matching technique that is customized for or well suited for the type or class determined in 404 is used in 408.

As part of the processing performed in 408, the events received in an event stream are processed and passed through a state machine corresponding to the automaton generated in 408. As part of the processing in 408, bindings are maintained after each received event to represent the state of pattern matches including partial matches that have the potential to turn into full matches.

One or more actions may be performed upon detecting a full pattern match in the input event stream (step 410). The actions performed may include sending a signal indicating a match, outputting event instances that resulted in the full pattern match, and other actions.

Steps 402, 404, and 406 represent design time or compile time activities that are performed before the runtime pattern matching may be performed. Steps 408 and 410 represent runtime activities that are performed in real time as events in an event stream are received and processed.

As described above, an automaton such as a finite state automaton (FSA) is generated for a pattern to be matched prior to runtime processing. For example, an automaton is generated for the pattern corresponding to the regular expression (A B C A B D) depicted in FIG. 2. In one embodiment, the automaton generated for the example in FIG. 2 has seven states including a start state Q0 and one state for each symbol position in the pattern with state Qi corresponding to pattern symbol position Pi. Since there are six symbol positions in the pattern (A B C A B D), the seven states for this pattern are Q0 (initial state), Q1 (state representing partial match of the $1^{st}$ symbol "A"), Q2 (state representing partial match of the $1^{st}$ and $2^{nd}$ symbols "AB"), Q3 (state representing partial match of the $1^{st}$, $2^{nd}$, and $3^{rd}$ symbols "ABC"), Q4 (state representing partial match of the $1^{st}$, $2^{nd}$, $3^{rd}$, and $4^{th}$ symbols "ABCA"), Q5 (state representing partial match of the $1^{st}$, $2^{nd}$, $3^{rd}$, $4^{th}$, and $5^{th}$ symbols "ABCAB"), and Q6 (final state representing full match of pattern "ABCABD"). The alphabet for the pattern is {A, B, C, D}. An extra symbol may be added to represent an event that does not match any of the specified symbols in the pattern. In this example, this extra symbol may be represented by letter R. Hence, the alphabet for the above pattern depicted in FIG. 2 is the set {A, B, C, D, R}.

Table A (shown below) depicts a state transition function table created for the FSA generated for the pattern identified in FIG. 2 according to an embodiment of the present invention.

TABLE A

| State | Alphabet(s) | Next State |
|-------|-------------|------------|
| Q0 | A | Q1 |
| Q0 | B, C, D, R | Q0 |
| Q1 | B | Q2 |
| Q1 | A, C, D, R | Q0 |
| Q2 | C | Q3 |
| Q2 | A, B, D, R | Q0 |
| Q3 | A | Q4 |
| Q3 | B, C, D, R | Q0 |
| Q4 | B | Q5 |
| Q4 | A, C, D, R | Q0 |
| Q5 | D | Q6 |
| Q5 | A, B, C, R | Q0 |

In Table A, the first column shows an initial state. The third column of the table identifies a state to which a transition is made from the initial state upon receiving an event that matches the symbols identified in the second column of the table. For example, as shown by the first two rows of Table A, the FSA starts in state Q0. If an event received in the event stream causes the first symbol A in the pattern to be matched, then the FSA transitions from state Q0 to state Q1. However, if any other symbol (e.g., B, C, D, or R) is matched by the received event, then the FSA continues to be in state Q0. Likewise, when in state Q1, if the next event causes symbol B to be matched, then the FSA transitions to state Q2 and if the event matches a A, C, D, or R, then the state reverts to state Q0. In this manner, Table A specifies the automaton for the pattern identified by regular expression (A B C A B D).

The general idea for the FSA is to have one state per prefix of the pattern to be matched. There is a forward transition from a state Qi only corresponding to the matching of the symbol that when concatenated with the prefix associated with state Qi produces the prefix associated with the state Qi+1. For all other symbols the transition is to state Q0. For example consider state Q5. The prefix corresponding to this state is ABCAB. If the next event in the event stream matches the symbol D, the FSA machine will transition to state Q6 since the prefix associated with state is ABCABD which is the concatenation of ABCAB (the prefix associated with state Q5) and the matched symbol D. On the other hand, if the next event in the event stream matches the symbol C, the FSA state machine will transition to state Q0.

The FSA generated for the pattern identified by (A B C A B D) is then used at runtime to guide the detection of the specified pattern in an event stream. For purposes of illustrating how the FSA of Table A may be applied to an event stream, it is assumed that the event stream comprises events as shown below in Table B and are received in the sequence depicted in Table B. The event stream may be for example a ticker event stream comprising the price of a stock.

TABLE B

| | Seq # | | | | | | | |
|---|---|---|---|---|---|---|---|---|
| | 0 | 1 | 2 | 3 | 4 | 5 | 6 | 7 |
| Price | 36 | 35 | 35 | 34 | 32 | 32 | 31 | 45 |
| Matching | A | A | <u>A</u> | A | A | <u>A</u> | A | <u>D</u> |
| Symbols | | B | C | B | B | C | B | |
| | | C | | C | <u>C</u> | | C | |

As shown in Table B, events are received in sequence (as determined by the time stamp associated with each event) and have price attributes: 36, 35, 35, 34, 32, 32, 31, 45. The third row in Table B depicts, for each sequence time point, the symbols of the pattern that are matched by the price attribute of the event received at that time point. For example, at sequence #0, an event is received having a price attribute of 36 that results in symbol A being matched since 30<=36<=40, satisfying the predicate associated with symbol A. Price 35 received at sequence #1 causes the following matches: A (since 30<=35<=40), B (since 35<36 (the previous price)), and C (since 35<=36 (the previous price)). Likewise, price 35 received at seq #2 results in the following matches: A (since 30<=35<=40) and C (since 35<=35). Price 34 received at seq #3 results in the following matches: A (since 30<=34<=40), B (since 34<35) and C (since 34<=35). Price 32 received at seq #4 results in the following matches: A (since 30<=32<=40), B (since 32 <34), and C (since 32<=35). Price 32 received at seq #5 results in the following matches: A (since 30<=32<=40) and C (since 32<=32). Price 31 received at seq #6 results in the following matches: A (since 30<=31<=40), B (since 31<32), and C (since 31<=32). Price 45 received at se in the following matches: only D (since 45>31).

Table C shows the state of the FSA (of Table A) after receipt of each event in the event stream according to the sequence indicated in Table B.

TABLE C

| Seq # | Price | Matched Symbol | State of FSA | Stored Bindings |
|---|---|---|---|---|
|  |  |  | {Q0} |  |
| 0 | 36 | A | {Q0, Q1} | Q0: (*, *, *, *, *, *) |
|  |  |  |  | Q1: (0, *, *, *, *, *) |
| 1 | 35 | A | {Q0, Q1, Q2} | Q0: (*, *, *, *, *, *) |
|  |  | B |  | Q1: (1, *, *, *, *, *) |
|  |  | C |  | Q2: (0, 1, *, *, *, *) |
| 2 | 35 | A | {Q0, Q1, Q3} | Q0: (*, *, *, *, *, *) |
|  |  | C |  | Q1: (2, *, *, *, *, *) |
|  |  |  |  | Q3: (0, 1, 2, *, *, *) |
| 3 | 34 | A | {Q0, Q1, Q2, Q4} | Q0: (*, *, *, *, *, *) |
|  |  | B |  | Q1: (3, *, *, *, *, *) |
|  |  | C |  | Q2: (2, 3, *, *, *, *) |
|  |  |  |  | Q4: (0, 1, 2, 3, *, *) |
| 4 | 32 | A | {Q0, Q1, Q2, Q3, Q5} | Q0: (*, *, *, *, *, *) |
|  |  | B |  | Q1: (4, *, *, *, *, *) |
|  |  | C |  | Q2: (3, 4, *, *, *, *) |
|  |  |  |  | Q3: (2, 3, 4, *, *, *) |
|  |  |  |  | Q5: (0, 1, 2, 3, 4, *) |
| 5 | 32 | A | {Q0, Q1, Q3, Q4} | Q0: (*, *, *, *, *, *) |
|  |  | C |  | Q1: (5, *, *, *, *, *) |
|  |  |  |  | Q3: (3, 4, 5, *, *, *) |
|  |  |  |  | Q4: (2, 3, 4, 5, *, *) |
| 6 | 31 | A | {Q0, Q1, Q2, Q3, Q5} | Q0: (*, *, *, *, *, *) |
|  |  | B |  | Q1: (6, *, *, *, *, *) |
|  |  | C |  | Q2: (5, 6, *, *, *, *) |
|  |  |  |  | Q4: (3, 4, 5, 6, *, *) |
|  |  |  |  | Q5: (2, 3, 4, 5, 6, *) |
| 7 | 45 | D | {Q0, Q6} | Q0: (*, *, *, *, *, *) |
|  |  |  |  | Q6: (2, 3, 4, 5, 6, 7) |

The first column of Table C "Seq #" identifies the sequence number indicating the sequence time point at which an event is received. The second column "Price" indicates, for each sequence, the value of the price attribute of the event received in the event stream in that sequence point. The third column "Matched Symbol" identifies, for each event, the symbol or correlation name(s) that is matched by the event received at the sequence. Zero or more symbols may be matched by an event. The fourth column "State of FSA" identifies, for each sequence, the different states in which the FSA may be in after processing the event received in that sequence. The fifth column "Stored Bindings", for each sequence time point, indicates the bindings that are stored for a sequence time point after processing an event received at that sequence time point. Each binding identifies a partial or full match of the pattern to be matched. In Table C, each binding identifies a state representing a partial or full match after processing an event. Each binding also identifies the events that cause the binding to be in that state. For example, a binding Q2: (2,3,*,*,*,*) represents a partial match (of the first two symbols) of the pattern being matched and corresponds to the FSA being in state Q2 due to prices associated with events received in seq #2 and seq #3. As another example, a binding Q3: (3,4,5,*,*,*) indicates that the binding corresponds to the FSA being in state Q3 due to a partial match due to prices associated with events received in sequences #3, #4, and #5. A Q0: (*,*,*,***,*) indicates a binding corresponding to the Q0 state, which is the starting state, and represents no match of the pattern being matched.

Bindings stored after processing an event encapsulate partial or full matches. A binding indicates that degree to which a pattern is matched as a result of the last received event. Bindings stored after receiving an event may indicate partial matches that have the potential of becoming longer matches or full matches. They contain the mapping information between a symbol and the event from the stream. At any point in time, for the pattern identified by regular expression depicted in FIG. 2, one instance of a binding is maintained per state that the machine is in. For example, after seq #3, four bindings are maintained, one binding for each of states Q0, Q1, Q2, and Q4. This follows from the construction of the FSA. Each state of the FSA corresponds to a unique prefix of the pattern. For the simple pattern (A B C A B D), the length of the prefix associated with each state is fixed. The number of elements in the binding associated with a state that are not '*', i.e., they are valid event associations, is equal to the length of the pattern prefix associated with the state. The set of valid event associations in a binding are always contiguous events of the event stream and are the last k events of the event stream, where k is the length of the pattern prefix associated with the state. Accordingly, exactly one instance of a binding is maintained per state that the FSA machine is in after receiving each event. As will be discussed below in further detail, for certain type of patterns, like the pattern depicted in FIG. 2, the number of bindings at any point in time is bound from above by the number of possible states of the FSA, which is one plus the number of symbols in the regular expression specifying the pattern. Accordingly, for the regular expression (A B C A B D), the maximum number of bindings that are maintained at any time is 6+1=7. A binding can be thought of as a vector of length m, with position i of the vector corresponding to the symbol Pi of the pattern. Its sequence number in the event stream indicates the event that is bound to this position.

The processing depicted in Table C may be described as follows:

(1) The FSA starts in state Q0.

(2) At seq #0, an event is received with price 36. This results in a match with symbol A and causes the FSA to be in two possible states Q0 and Q1. The binding corresponding to state Q0 is Q0: (*,*,*,*,*,*) indicating that the binding represents no partial pattern match. The binding corresponding to this state is Q1: (0,*,*,*,*,*) indicating that the binding represents a partial pattern match ("A") due to the event received in seq #0.

(3) At seq #1, an event is received with price 35. This results in a match with symbols A, B, and C and causes the FSA to be in three possible states Q0, Q1, and Q2. The binding corresponding to state Q0 is Q0: (*,*,*,*,*,*) indicating that the binding represents no partial pattern match. The binding corresponding to state Q1 is Q1: (1,*,*,*,*,*) indicating that the binding represents a partial pattern match ("A") due to the event received in seq #1. The binding corresponding to state Q2 is Q2: (0,1,*,*,*,*) indicating that the binding represents a partial pattern match ("AB") due to the events received in seq #0 and seq #1.

(4) At seq #2, an event is received with price 35. This results in a match with symbols A and C and causes the FSA to be in three possible states Q0, Q1, and Q3. The binding corresponding to state Q0 is Q0: (*,*,*,*,*,*) indicating that the binding represents no pattern match. The binding corresponding to state Q1 is Q1: (2,*,*,*,*,*) indicating that the binding represents a partial pattern match ("A") due to the event received in seq #2. The binding corresponding to state Q3 is Q3: (0,1,2,*,*,*) indicating that the binding represents a partial pattern match ("ABC") due to the events received in seq #0, seq #1, and seq #2.

(5) At seq #3, an event is received with price 34. This results in a match with symbols A, B, and C and causes the FSA to be in four possible states Q0, Q1, Q2, and Q4. The binding corresponding to state Q0 is Q0: (*,*,*,*,*,*) indicating that the binding represents no pattern match. The binding corresponding to state Q1 is Q1: (3,*,*,*,*,*) indicating that the binding represents a partial pattern match ("A") due to the event received in seq #3. The binding corresponding to state Q2 is Q2: (2,3,*,*,*,*) indicating that the binding represents a partial pattern match ("AB") due to the events received in seq #2 and seq #3. The binding corresponding to state Q4 is Q4: (0,1,2,3,*,*) indicating that the binding represents a partial pattern match ("ABCA") due to the events received in seq #0, seq #1, seq #2, and seq #3.

(6) At seq #4, an event is received with price 32. This results in a match with symbols A, B, and C and causes the FSA to be in five possible states Q0, Q1, Q2, Q3, and Q5. The binding corresponding to state Q0 is Q0: (*,*,*,*,*,*) indicating that the binding represents no pattern match. The binding corresponding to state Q1 is Q1: (4,*,*,*,*,*) indicating that the binding represents a partial pattern match ("A") due to the event received in seq #4. The binding corresponding to state Q2 is Q2: (3,4,*,*,*,*) indicating that the binding represents a partial pattern match ("AB") due to the events received in seq #3 and seq #4. The binding corresponding to state Q3 is Q3: (2,3,4,*,*,*) indicating that the binding represents a partial pattern match ("ABC") due to the events received in seq #2, seq #3, and seq #4. The binding corresponding to state Q5 is Q5: (0,1,2,3,4,*) indicating that the binding represents a partial pattern match ("ABCAB") due to the events received in seq #0, seq #1, seq #2, seq #3, and seq #4. It should be noted here that binding Q5 is just one match from a complete pattern match.

(7) At seq #5, an event is received with price 32. This results in a match with symbols A and C and causes the FSA to be in four possible states Q0, Q1, Q3, and Q4. The binding corresponding to state Q0 is Q0: (*,*,*,*,*,*) indicating that the binding represents no pattern match. The binding corresponding to state Q1 is Q1: (5,*,*,*,*,*) indicating that the binding represents a partial pattern match ("A") due to the event received in seq #5. The binding corresponding to state Q3 is Q3: (3,4,5,*,*,*) indicating that the binding represents a partial pattern match ("ABC") due to the events received in seq #3, seq #4, and seq #5. The binding corresponding to state Q4 is Q4: (2,3,4,5,*,*) indicating that the binding represents a partial pattern match (ABCA") due to the events received in seq #2, seq #3, seq #4, and seq #5.

(8) At seq #6, an event is received with price 31. This results in a match with symbols A, B, and C and causes the FSA to be in five possible states Q0, Q1, Q2, Q4, and Q5. The binding corresponding to state Q0 is Q0: (*,*,*,*,*,*) indicating that the binding represents no pattern match. The binding corresponding to state Q1 is Q1: (6,*,*,*,*,*) indicating that the binding represents a partial pattern match ("A") due to the event received in seq #6. The binding corresponding to state Q2 is Q2: (5,6,*,*,*,*) indicating that the binding represents a partial pattern match ("AB") due to the events received in seq #5 and seq #6. The binding corresponding to state Q4 is Q4: (3,4,5,6,*,*) indicating that the binding represents a partial pattern match ("ABCA") due to the events received in seq #3, seq #4, seq #5, and seq #6. The binding corresponding to state Q5 is Q5: (2,3,4,5,6,*) indicating that the binding represents a partial pattern match ("ABCAB") due to the events received in seq #2, seq #3, seq #4, seq #5, and seq #6.

At seq #7, an event is received with price 45. This results in a match with symbol D and causes the FSA to be in two possible states Q0 and Q6. The binding corresponding to state Q0 is Q0: (*,*,*,*,*,*) indicating that the binding represents no partial pattern match. The binding corresponding to state Q6 is Q6: (2,3,4,5,6,7) indicating that the binding represents a full pattern match ("ABCABD") due to the event received in seq #2, seq #3, seq #4, seq #5, seq #6 and seq #7.

State Q6, that is reached after the event in seq #7, represents that final state of the FSA representing a full pattern match. In the above example, the full pattern is matched due to events received in sequences 2, 3, 4, 5, 6, and 7. The events received at these sequence are italicized in Table B and in Table C and their corresponding states that resulted in a full match have been underlined. One or more actions may be initiated after the pattern match. The actions may include outputting the events that resulted in the final state. For the pattern indicated in FIG. 2, after the final state is reached, the state of the FSA machine is set back to {Q0}, the initial state. This is done since the length of the matching bindings at the final state is always fixed.

After a match is found, the resumption point of the pattern matching is determined based upon the AFTER MATCH SKIP TO clause (shown in FIG. 2) in the query. With reference to a match contained in another full match, the AFTER MATCH SKIP TO clause determines if overlapping matches are to be reported. By default, the AFTER MATCH SKIP TO clause is set to TO PAST LAST ROW, which indicates that once a match is obtained, overlapping partial matches are discarded and pattern matching is resumed anew. For details on the AFTER MATCH SKIP TO clause, please refer to Fred Zemke et al., "Pattern Matching in Sequence of Rows (12)," ISO/IEC JTCi/SC32 WG3:URC-nnn, ANSI NCITS H2-2006-nnn, Jul. 31, 2007.

An interesting thing to note in the above example is the transitions that occur after processing the event at seq #5. After the event received at seq #4, the FSA is one event away from a full pattern match. However, the event received at seq #5 does not complete a full pattern match. However, binding Q3: (2,3,4,*,*,*) representing a partial match ("ABC") after seq #4 is progressed to a Q4: (2,3,4,5,*,*) binding after seq #5 representing a partial match ("ABCA").

As described above, pattern matching after receiving an event is performed based upon the received event and events received prior to the received event. The bindings that are stored after processing of an event enable the pattern matching to be performed without backtracking or re-scanning of the received events. In one embodiment, an event is processed upon its receipt by server 102. After an event is received and processed, the extent to which the pattern specified by the regular expression is matched based upon the most recently received event and one or more events received prior to the most recently received event is determined. The bindings stored after receipt and processing of an event encapsulate the extent of the matches. The bindings stored after the receipt of the last received event are then used to determine pattern matches after receipt of the next event. As a result of the use of bindings, the one or more events that have been received prior to the most recently received event do not have to be processed again for the pattern matching processing. In this manner, for purposes of pattern matching, an event is processed only once upon receipt of the event by server 102. After an event has been received and processed, the event does not have to be processed again as more events are received by server 102. The bindings after a sequence store the match information that is used for evaluating the DEFINE predicates and evaluating the MEASURES clause on obtaining a full match. In this manner, backtracking of events is not performed for the pattern matching according to an embodiment of the present invention.

As another example, consider the sequence of events depicted in Table D and the matched symbols:

TABLE D

| | Seq No. | | | | | | | | |
|---|---|---|---|---|---|---|---|---|---|
| | 0 | 1 | 2 | 3 | 4 | 5 | 6 | 7 | 8 |
| Price | 36 | 25 | 25 | _34_ | _25_ | _25_ | _31_ | _25_ | _45_ |
| Matching Symbols | A | B C | C | A D | B C | C | A D | B C | D |

Table E shows the state of the FSA (of Table A) after receipt of each event in an event stream according to the sequence indicated in Table D.

TABLE E

| Seq # | Price | Matched Symbol | State of FSA | Stored Bindings |
|---|---|---|---|---|
| | | | {Q0} | Q0: (*, *, *, *, *, *) |
| 0 | 36 | A | {Q0, Q1} | Q0: (*, *, *, *, *, *) |
| | | | | Q1: (0, *, *, *, *, *) |
| 1 | 25 | B C | {Q0, Q2} | Q0: (*, *, *, *, *, *) |
| | | | | Q2: (0, 1, *, *, *, *) |
| 2 | 25 | C | {Q0, Q3} | Q0: (*, *, *, *, *, *) |
| | | | | Q3: (0, 1, 2, *, *, *) |
| 3 | _34_ | _A_ D | {Q0, Q1, Q4} | Q0: (*, *, *, *, *, *) |
| | | | | Q1: (3, *, *, *, *, *) |
| | | | | Q4: (0, 1, 2, 3, *, *) |
| 4 | _25_ | _B_ C | {Q0, Q2, Q5} | Q0: (*, *, *, *, *, *) |
| | | | | Q2: (3, 4, *, *, *, *) |
| | | | | Q5: (0, 1, 2, 3, 4, *) |
| 5 | _25_ | _C_ | {Q0, Q3} | Q0: (*, *, *, *, *, *) |
| | | | | Q3: (3, 4, 5, *, *, *) |
| 6 | _31_ | _A_ D | {Q0, Q1, Q4} | Q0: (*, *, *, *, *, *) |
| | | | | Q1: (6, *, *, *, *, *) |
| | | | | Q4: (3, 4, 5, 6, *, *) |
| 7 | _25_ | _B_ C | {Q0, Q2, Q5} | Q0: (*, *, *, *, *, *) |
| | | | | Q2: (6, 7, *, *, *, *) |
| | | | | Q5: (3, 4, 5, 6, 7, *) |
| 8 | _45_ | _D_ | {Q0, Q6} | Q0: (*, *, *, *, *, *) |
| | | | | Q6: (3, 4, 5, 6, 7, 8) |

As depicted in Table E, the final state Q6 is reached due to events received at sequence numbers 3, 4, 5, 6, 7, and 8. The events resulting in a full match are italicized in the second column and the corresponding symbols that result in the match are underlined in the third column.

Class A Patterns

As indicated above, the technique used for performing pattern matching may be different for different types or classes of patterns. This section describes a pattern matching technique used for a specific simplified pattern referred to as a Class A pattern. The customized processing described in this section may be applied for detecting Class A patterns in one or more event streams.

In one embodiment, a Class A pattern is defined as follows:
Let the pattern to be matched be $P=(P_1, P_2, \ldots, P_m)$, where $m>=1$.
A Class A pattern is one where each $P_i$ is only one of the following:
  $C_i$—a symbol without any quantifier
  $C_i*$—a symbol followed by a greedy * quantifier, indicating zero or more occurrences of $C_i$
  $C_i+$—a symbol followed by a greedy + quantifier, indicating one or more occurrences of $C_i$
  $C_i?$—a symbol followed by a greedy ? quantifier, indicating zero or one occurrences of $C_i$ Further, for a Class A pattern, the predicate defined for a symbol cannot be dependent on any other symbols. In other words, the predicate for a symbol has to be independent of other symbols. Accordingly, a predicate defined for a symbol in a Class A pattern does not include other symbols. For example, the predicate for a symbol A cannot have the following predicate (A.price<B.price) in which the predicate for A is dependent on symbol B. Also, aggregation operators (e.g., sum) over the same symbol are not permitted in the DEFINE clause for a Class A pattern. Further, for Class A patterns, only the regular expression concatenation operator is allowed to link the symbols in the regular expression, as shown above. Other, regular expression operators such as ALTERNATION (or |) and GROUPING are not permitted.

As described above, in order for a pattern specified in a query to be classified as a Class A pattern, the pattern and the predicates associated with symbols in the pattern have to satisfy certain restrictions described above. Accordingly, as part of determining a pattern type for a pattern specified in a query, pattern matching module 110 is configured to extract the regular expressions and predicates from the query and determine if the various characteristics (limitations) of a Class A pattern are satisfied. The pattern is classified as a Class A pattern only if the restrictions are satisfied. This processing may be performed, for example, in step 404 depicted in FIG. 4.

Without loss of generality, it can be assumed that each $C_i$ is distinct (although this is not a requirement for Class A patterns). It can be shown that the other cases, where the $C_i$'s are not distinct, can be reduced to an instance of the case where the $C_i$'s are distinct. This can be done by, for each repetition, replacing the repeated symbol with a new symbol defined using the same predicate.

The example query 500 depicted in FIG. 5 depicts an example of a Class A pattern and will be used to illustrate detection of Class A patterns in an event stream according to an embodiment of the present invention. Query 500 comprises a regular expression 502 (AB*C) specifying the pattern to be detected. The pattern specified by regular expression 502 is an example of a recurring pattern due to the B* portion since it specifies zero or more recurrences of B. The predicates for the symbols A, B, and C are defined by DEFINE clause 504. As can be seen in FIG. 5, the predicate for each symbol is defined such that it is not dependent on any other symbol. In other words, a predicate for a symbol does not include other symbols. For example, the predicate for A does not include B, or C.

Pattern matching module 110 is configured to analyze query 500 as specifying a pattern that is a Class A pattern. Upon recognizing a pattern as a Class A pattern, pattern matching module 110 is configured to determine and apply a technique that is specified for Class A pattern processing. In one embodiment, according to the selected technique, a finite state automaton (FSA) is created for the pattern. The following definitions are introduced to formally describe the structure of the automaton.

Let $\Sigma$ (alphabet)=$\{C_i - 1 \le i \le m\}$
Let $e_i$ denote the $i^{th}$ event of the input event stream
Let $C(i) \subseteq \Sigma$ be defined as $C(i)=\{C_i | e_i$ satisfies the predicate defining correlation name $C_i\}$
FOLLOW(i), for $0 \le i \le m$, is defined as follows
  FOLLOW(m)=$\{\$\}$ where \$ is a special symbol
  For $0 \le i \le m-1$, $$\text{FOLLOW}(i) = \text{FOLLOW}(i+1) \cup C_{i+1} \text{ if } (P_{i+1} = C^*_{i+1} \text{ or } P_{i+1} = C_{i+1}?)$$

$$= C_{i+1} \text{ otherwise}$$

The automaton corresponding to the pattern M(P)=(Q, $\Sigma$, $\delta$, Q0, F) is defined as follows:

$Q=Q0 \cup \{Qi | 1 \le i \le m\}$.

Intuitively, there is one initial state and then one state per pattern symbol (or per correlation name since it is assumed without loss of generality that the symbols are distinct).

$\Sigma$ is the alphabet given by $\Sigma=\{C_i | 1 \leq i \leq m\}$ $\delta$ is the state transition function (defined in detail below)

Q0 is the initial state

F is the set of final states; $F=\{Qi | Qi \in Q$ and $FOLLOW(i)$ contains $\$\}$ The state transition function for a state Qi, for $0 \leq i \leq m$, is defined as follows:

$$\delta(Qi, C_j) = Qj \text{ where } j > i \text{ and } C_j \in FOLLOW(i) - \{\$\}$$

$$= Qi \text{ if } P_i = C_i^* \text{ or } P_i = C_i +$$

$$= Q0 \text{ otherwise}$$

Applying the above construction technique to the example depicted in FIG. 5 yields the following automaton:

FOLLOW(3)=$

FOLLOW(2)={C}

FOLLOW(1)={C, B}

FOLLOW(0)={A}

Table F depicts the state transition for the automaton constructed for the pattern specified in FIG. 5.

TABLE F

| State | Alphabet | Next State |
|---|---|---|
| Q0 | A | Q1 |
| Q1 | B | Q2 |
| Q1 | C | Q3 |
| Q2 | C | Q3 |
| Q2 | B | Q2 |

All other transitions lead to the next state of Q0.

The following observation follows directly from the construction above:

(1) If state $Qi \in F$, then for all $j>i$, $Qj \in F$ (2) If $\delta(Qi, C_j)!=Q0$ for $j>i$, then $\delta_{(Q+1}, C_j)$ also $!=Q0$ The FSA constructed for the Class A pattern is then used during pattern matching to guide detection of the specified Class A pattern in event streams during runtime processing. Table G depicts an example of an input event stream for illustrating the processing that occurs at runtime for detecting a Class A pattern. As with previous examples, Table G indicates the sequence in which events are received in the event stream. For each event, the table shows the position of the event in the event stream, the price attribute of the event, and, for each sequence point, the symbols that are matched by the input event received at that sequence point. A symbol is considered matched by an event if the predicate associated with the symbol is satisfied by the event. As explained below, the underlined items in Table G constitute an instance of a full pattern match for pattern (AB*C).

TABLE G

| | Seq No. | | | | |
|---|---|---|---|---|---|
| | 1 | 2 | 3 | 4 | 5 |
| Price | 40 | 20 | 10 | 10 | 40 |
| Matching Symbols | <u>A</u> | A | A | A | A |
| | | <u>B</u> | <u>B</u> | B | |
| | | | C | <u>C</u> | |

During runtime, the FSA machine of Table F is used to detect the specified pattern in any one of several events based upon the prices associated with the input events. For a Class A pattern, multiple event matches may arise due to the non-determinism (since one event may match multiple correlation names) in the input events. For example, in the above example, upon receiving event $e_5$, the FSA machine is (logically) looking for a pattern match in one of 18 event matches such as {AAAAA, AAABA, AAACA, ABAAA . . . }.

At every point in time (i.e., at any sequence number), after processing an input event $e_i$, the state of the automaton machine may be defined as follows:

$$S(i)=\{q | q \in Q\} \text{ with } S(0)=\{Q0\}$$

Now S(i+1) is given as follows:

$$S(i+1) = \cup_{q \in S(i)} \{\delta(q, a) \text{ where } a \in C(i+1)\} \text{ UNION } Q0$$

Accordingly, for each state in S(i), the next state is found for each symbol that the input event can be bound to. S(i+1) represents the union of all these states. Maintaining S(i) is the way to simulate simultaneous detection of the pattern in any one of several matches. This may be implemented by maintaining S(i) at any point in the manner described above with the addition that Q0 is always in S(i).

Table H shown below illustrates application of the automaton depicted in Table F to the events received according to Table G.

TABLE H

| Seq # $e_i$ | Event (price) | Matching Symbol | State of FSA |
|---|---|---|---|
| | | | {Q0} |
| 1 | 40 | A | {Q0, Q1} |
| 2 | 20 | A | {Q0, Q1, Q2} |
| | | B | |
| 3 | 10 | A | {Q0, Q1, Q2, <u>Q3</u>} |
| | | B | |
| | | C | |
| 4 | 10 | A | {Q0, Q1, Q2, <u>Q3</u>} |
| | | B | |
| | | C | |
| 5 | 40 | A | {Q0, Q1} |

As depicted in Table H, the event received at seq #1 (price=40) results in symbol A being matched and causes the FSA to be in states Q0 and Q1 ("A"). The event received at seq #2 (price=20) results in symbols A and B being matched and causes the FSA to be in states Q0, Q1 ("A"), and Q2 ("AB*"). The event received at seq #3 (price=10) results in symbols A, B, and C being matched and causes the FSA to be in states Q0, Q1 ("A"), Q2 ("AB*"), and Q3 ("AB*C"). Since Q3 is the final state (underlined in Table H), it indicates a full pattern match for pattern AB*C. Even though a full pattern match has been found, in one embodiment, the full pattern match is not output and pattern matching continues to find the longest pattern match. The event received at seq #4 (price=10) results in symbols A, B, B and C being matched and causes the FSA to be in states Q0, Q1, Q2, and Q3. Since Q3 is the final state, it again indicates a match for pattern AB*C. The event received at seq #5 (price=40) results in symbol A being matched and causes the FSA to be in states Q0, and Q1. At this point, there is no longer match possible and the matched pattern at seq #4 is output. In this manner, pattern matching on the input events is performed.

For a Class A pattern, preferment rules are used to determine which matches to store. For example, all matches may be stored or only the longest match may be stored. Rules that control such behavior are referred to as preferment rules. In one embodiment, preferment may be given to matches based upon the following priorities:
(1) A match that begins at an earlier event is preferred over a match that begins at a later event.
(2) Of two matches matching a greedy quantifier, the longer match is preferred.
(3) Of two matches matching a reluctant quantifier, the shorter match is preferred.

Matches are then chosen and maintained per the preferment rules. For information on preferment rules, please also refer to Fred Zemke et al., "Pattern Matching in Sequence of Rows (12)," ISO/IEC JTCi/SC32 WG3:URC-nnn, ANSI NCITS H2-2006-nnn, Jul. 31, 2007. For example, in the example of Table H, if seq #5 were to evaluate to a C, then the longest match would be A B B B C (since seq #4 also evaluates to a B) and not the current A B B C. Further, if seq #5 were a C, then as per the default SKIP clause (which is SKIP PAST LAST ROW), the overlapping match A B B C would not be reported.

Bindings are maintained to facilitate the pattern matching without performing backtracking on the input events. A binding indicates that degree to which a pattern is matched as a result of the last received event. Bindings stored after receiving an event may indicate partial matches that have the potential of becoming longer matches or full matches. For simple non-recurring patterns, as specified in FIG. 2 and described above, for a state Qi, the length of the binding (the number of non-star elements in the binding, i.e., the number of elements that have an associated event from the stream mapped) is "i" and since this is always the last "i" events of the event stream, the binding is unique for a state and thus there is one binding per state. However, for recurring patterns, such as the pattern specified in FIG. 5, there could be multiple bindings applicable for a given state at any point in time. For example in Table H, after processing $e_3$ (i.e., event received at seq #3) for state Q2 (state representing matching of the first two symbols of the pattern), both (1) (A=2, B=3) (i.e., A matched by the event at seq #2 and B matched by the event at seq #3) and (2) (A=1, B=2, B=3) are valid bindings. However, since the predicate defining a symbol is defined independent of other symbols (a feature of Class A patterns), it follows that the set of symbols that an event can be bound to is independent of the current bindings. This is a feature of Class A patterns (and as will be described below differentiates it from Class B patterns).

As is evident from the above, a full match state for a Class A pattern may have multiple bindings associated with it. Preferment rules may be preconfigured for the pattern matching system for selecting a particular binding from the multiple bindings. For example, as depicted in FIG. 1, preferment rules 126 may be configured that are used by pattern matching module 110 to select which binding, from among many, to select. In one embodiment, these preferment rules may be configured to follow the preferment rules defined by a specification being supported by the pattern matching system. For example, the preferment rules for an embodiment of the present invention may be configured to follow and support the preferment rules defined by the "Pattern Matching in Sequences of Rows (12)" specification. Preferment rules may be preconfigured for the pattern matching system specifying rules for selecting a partial binding for a state for further processing from among multiple partial bindings associated with that state.

Since an FSA is a right-invariant equivalence relation over $\Sigma^*$ (that is if $xR_M y$ then $xzR_M yz$ for strings x,y and any string z), and the preferment rules used for the processing are prefix based, only one of these bindings needs to be maintained (for the SKIP PAST LAST ROW case). From the above, it follows that the number of active bindings stored at any point in time for a Class A pattern is bound by the number of states and is one plus the length of the specified pattern, i.e., one plus the number of symbol positions in the specified Class A pattern. For example, for the pattern AB*C, the maximum number of bindings maintained at any point is 3+1=4 bindings. Thus, in the default SKIP case (SKIP PAST LAST ROW) where the requirement is NOT to report overlapping matches, after processing every input event, there need be at most only one binding per state of the automaton.

For example, consider the previous example depicted in Table H where after the event received at seq #3 (referred as e3), there are two possible bindings that are associated with state Q2: (1) (A=2, B=3) and (2) (A=1, B=2, B=3). Now suppose "x" is the sequence of events corresponding to the first binding (i.e., x=(A=2, B=3)) and "y" is the sequence of events corresponding to the second binding (i.e., y=(A=1, B=2,B=3)), then for every following sequence of events "z", both "xz" and "yz" will be in the same state of the automaton. This indicates right equivalence. The reason for this is due to the nature of a Class A pattern where predicates are independent of other symbols and hence the set of correlation names or symbols that an event can be bound to is independent of binding context.

Further, it can be shown that, whenever, "xz" is in final state, "yz" would be the match preferred over the match "xz" if and only if "y" is preferred over "x" per the preferment rules. Hence, it suffices to maintain the second binding (corresponding to "y") and discard the first binding (corresponding to "x") after processing input event e3, for state Q2.

For simple non-recurring patterns as specified in FIG. 2 and described above, when a state S(i) contains a final state (a state that is a member of F), the binding associated with the state is immediately output and S(i) is reset to {Q0}. This could be done since the length of matching bindings was always fixed, which meant that one could not get two matching bindings where one was properly contained in the other. In the case of simple recurring patterns as depicted in FIG. 5, it is possible to get two matches where one is properly contained in the other. For instance, in the example above, after processing $e_3$, S(i) contains the final state Q3. For example, if the associated binding is (A=1, B=2, C=3), it cannot be concluded at this point that this is part of the output since the binding (A=1, B=2, B=3) could develop into a longer match that would take precedence over (A=1, B=2, C=3) by the preferment rules. This is exactly what happens after processing $e_4$.

Based on the above, in one embodiment, bindings may be classified into 3 categories:
(1) Matched and reported bindings: These are bindings that constitute a full pattern match and are output;
(2) Matched but unsure bindings: These are bindings that constitute a full pattern match but there are other partial matches that could develop into matches and contain this binding. Hence, these bindings are not output at this point in time;
(3) Partial matches: These are bindings that are partial matches that have the potential to become full matches.

Further, the following may be defined for bindings:
Let "b" be a binding.
Interval of a binding INT(b)=(i,j) where i is the least sequence number of an event that is part of this binding and j is the highest sequence number of an event in the binding. For example, for the binding b=(A=1, B=2, C=3), INT(b)=(1, 3)
Left(b)=i where INT(b)=(i,j)

Right(b)=j where INT(b)=(i,j)
Length(b)=j−i+1 where INT(b)=(i,j)
For a set TB of bindings, min(TB)={min left(b)|b ∈ TB}, max(TB)={max right(b)|b ∈ TB}.

Based upon the above, it can be shown that in the case of Class A recurrent patterns as specified in FIG. 5, there can be at most one binding that is in the matched but unsure category at any point in time. Further, we can show that left(d)=min (TB) (where 'd' is the unique binding in the matched but unsure category). This essentially follows from the above based on the structure of the automaton constructed.

Figure 6:
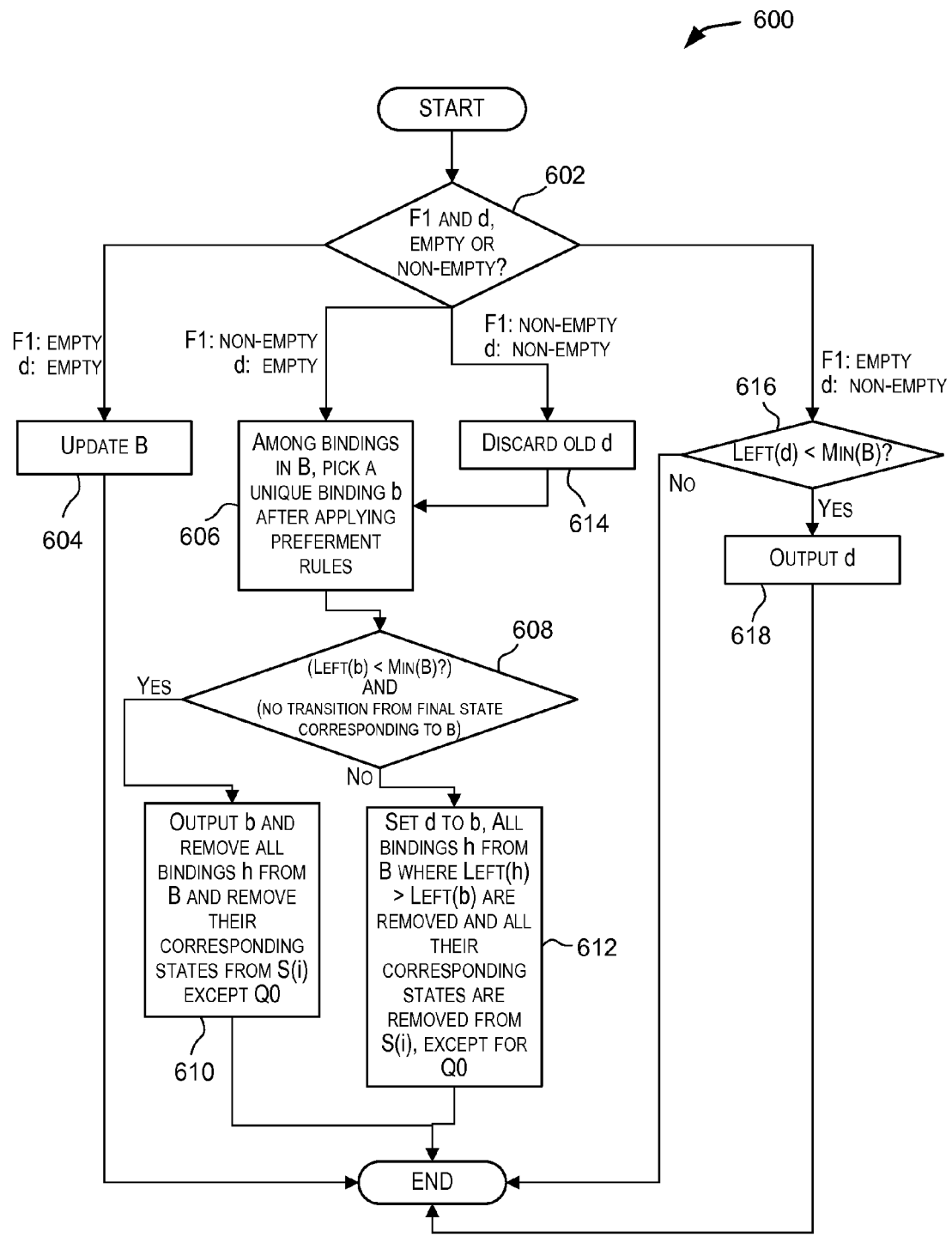
FIG. 6 depicts a simplified flowchart depicting a method of maintaining bindings for Class A patterns according to an embodiment of the present invention.

Accordingly, maintaining bindings during runtime processing essentially involves maintaining the vector (d, B) where d is the binding (if any) in the matched but unsure category and B is the set of partial match bindings. On processing $e_i$, let F1 denote the set of final states in S(i) and let B1 denote the set of bindings associated with the states in F1. FIG. 6 depicts a simplified flowchart 600 depicting a method of maintaining bindings for Class A patterns according to an embodiment of the present invention. The method may be performed by software (program, code, instructions executed by a processor), in hardware, or combinations thereof. In one embodiment, the processing is performed by matcher 116 depicted in FIG. 1.

As depicted in FIG. 6, a determination is to check if F1 and d are empty or non-empty (step 602). Here, "d" refers to the value of the symbol after processing event $e_{(i−1)}$ and "F1" refers to the set after processing event $e_i$. B corresponds to the set of partial match bindings after processing event $e_i$. Processing is then performed based upon the determinations in 602. There can be one of four situations:

(1) If F1 and d are both determined to be empty, then the set of stored bindings B is updated (step 604). Accordingly, on processing $e_i$, there will be a change to the set of stored bindings and B is updated. Nothing else is done in 604.

(2) If F1 is determined to be non-empty and d is determined to be empty, then among the bindings in B1, a unique binding b is picked after applying preferment rules (step 606). A determination is then made if left(b) is less than min(B) and if there is no transition from the final state corresponding to b (step 608). If the condition is 608 is met, then b is output and all bindings h from B and their corresponding states from S(i) are removed except for Q0 (step 610). If the condition in 608 is not satisfied then it implies that left(b)= min(B) since it is not possible that left(b)>min(B). In this case, d is set to b and all bindings h from B where left(h)> left(b) are removed and also all their corresponding states from S(i) are removed, except for Q0 (step 612).

(3) If F1 is non-empty and d is non-empty, then the old d is discarded (step 614). Processing then proceeds with step 606.

(4) If F1 is empty, d is non-empty, then if left(d)<min(B) (step 616), d is output (step 618) and then set to null (step 620). Else (i.e., left(d)==min(B), since left(d) cannot be greater than min(B)), then nothing is done.

Table I shown below depicts the processing after receipt of each event according the automaton depicted in Table F.

TABLE I

| Si | $E_i$ | C | State S(i) | Update Bindings | Apply Preferment | Partial Bindings | Matched but unsure | Output |
|---|---|---|---|---|---|---|---|---|
|  |  |  | {Q0} | Q0: ( ) |  |  |  |  |
| 1 | 40 | A | {Q0, Q1} | Q0: ( ) | Q0: ( ) | Q0: ( ) |  |  |
|  |  |  |  | Q1: (A = 1) | Q1: (A = 1) | Q1: (A = 1) |  |  |
| 2 | 20 | A | {Q0, | Q0: ( ) | Q0: ( ) | Q0: ( ) |  |  |
|  |  | B | Q1, | Q1: (A = 2) | Q1: (A = 2) | Q1: (A = 2) |  |  |
|  |  |  | Q2} | Q2: (A = 1, B = 2) | Q2: (A = 1, B = 2) | Q2: (A = 1, B = 2) |  |  |
| 3 | 10 | A | {Q0, | Q0: ( ) | Q0: ( ) | Q0: ( ) | Q3: (A = 1, |  |
|  |  | B | *Q1*, | Q1: (A = 3) | ~~Q1: (A = 3)~~ | ~~Q1: (A = 3)~~ | B = 2, |  |
|  |  | C | Q2, | Q2: (A = 2, B = 3) | ~~Q2: (A = 2, B = 3)~~ | ~~Q2: (A = 2, B = 3)~~ | C = 3) |  |
|  |  |  | Q3} | Q2: (A = 1, B = 2, B = 3) | Q2: (A = 1, B = 2, B = 3) | Q2: (A = 1, B = 2, B = 3) |  |  |
|  |  |  |  | *Q3: (A = 2, C = 3)* | ~~Q3: (A = 2, C = 3)~~ | ~~Q3: (A = 2, C = 3)~~ |  |  |
|  |  |  |  | *Q3: (A = 1, B = 2, C = 3)* | Q3: (A = 1, B = 2, C = 3) |  |  |  |
| 4 | 10 | A | {Q0, | Q0: ( ) | Q0: ( ) | Q0: ( ) | Q3: |  |
|  |  | B | *Q1*, | Q1: (A = 4) | ~~Q1: (A = 4)~~ | ~~Q1: (A = 4)~~ | (A = 1, B = 2, |  |
|  |  | C | Q2, | Q2: (A = 1, B = 2, B = 3, B = 4) | Q2: | Q2: | B = 3, C = 4) |  |
|  |  |  | Q3} | Q3: (A = 1, B = 2, B = 3, C = 4) | (A = 1, B = 2, B = 3, B = 4) | (A = 1, B = 2, B = 3, B = 4) |  |  |
|  |  |  |  |  | Q3: |  |  |  |
|  |  |  |  |  | (A = 1, B = 2, B = 3, C = 4) |  |  |  |
| 5 | 40 | A | {Q0, | Q0: ( ) | Q0: ( ) | Q0: ( ) |  | (A = 1, B = 2, B = 3, |
|  |  |  | Q1} | Q1: (A = 5) | Q1: (A = 5) | Q1: (A = 5) |  | C = 4) |

In Table I, the first column shows the sequence in which events are received. The price attribute of each event is depicted in the second column. The third column shows the symbol matches after processing an event. The fourth column "State(S(i))" depicts the possible states of the finite automaton after processing each received event. The fifth column "Update Bindings" identifies the updated bindings corresponding to the states after processing an event. It should be noted that in the fifth column, a state may have multiple bindings associated with it. The sixth column "Apply Preferment" identifies bindings selected after applying preferment rules and/or deleting bindings as per steps 610 and 612 from FIG. 6 to the states and associated bindings depicted in the fifth column. As previously described, preferment rules are used to select a binding for a state from a set of bindings. Preferment rules are used in conjunction with the SKIP clause. It is sufficient to maintain only one binding per state. At times, after processing an input there may be states with more than one binding (as in this example). For each such state, the most "preferred" binding is retained and others are discarded. This is because, as mentioned earlier, it can be shown that (right equivalence) the retained binding will always yield a match that would be preferred compared to equivalent matches resulting from the same suffix applied on the other competing bindings that are discarded (for the same state). In Table I, the bindings that are deleted as a result of applying preferment rules are shown with a strikethrough.

The seventh column "Partial Bindings" identifies partial bindings after processing an event after applying the preferment rules. The eight column "Matched but unsure" identifies the matched but unsure bindings after processing an event after applying the preferment rules. The ninth column "Output" identifies a binding that results in a pattern match that is output.

As indicated above, for Class A patterns, a state after processing an event can have multiple bindings associated with. After applying preferment rules, one or more of the bindings associated with a state may be deleted. In situations where you do not want overlapping matches (e.g., if the SKIP PAST LAST ROW clause is used), then some bindings may be deleted even if the deleted binding is a single binding for a state. For example, in Table I, after S3, it is known for sure that the first 3 events will participate in a full but unsure match, and since overlapping matches are not needed (SKIP PAST LAST ROW), there is no point in keeping A=3 in Q1 since it intersects with a previous match. Accordingly, after applying preferment rules, the binding A=3 in Q1 is deleted. In this manner, those bindings that can yield full matches that will be lower in preferment than an already determined full match can be deleted. If a state does not have any bindings associated with it, it is referred to as an inactive state and is also deleted. For example, in Table I, state Q1 is deleted after S3 and S4.

The following example illustrates how bindings are stored after receiving each event according to an embodiment of the present invention. For this example, let S(c1 integer) be an input event stream. A query Q may be received specifying a pattern to be detected in event stream S as follows:

```
SELECT
    *
FROM
    S MATCH_RECOGNIZE (
    MEASURES
        A.c1 as c1,
        B.c1 as c2,
        C.c1 as c3,
        D.c1 as c4
    PATTERN(A B+ C D*)
    DEFINE
        A as A.c1 % 2 == 0,
        B as B.c1 % 3 == 0,
        C as C.c1 % 5 == 0,
        D as D.c1 % 7 == 0,
    ) as T
```

In the above example, the (X.c1% Y==0) predicates test whether X.c1 is divisible by Y. The pattern specified in the query is a Class A pattern. Table J shows a sequence of events received in event stream S and the matched symbols for the pattern (AB+CD*)

TABLE J

|  | Seq No. | | | | | |
| --- | --- | --- | --- | --- | --- | --- |
|  | 0 | 1 | 2 | 3 | 4 | 5 |
| c1 | 2 | 3 | 30 | 14 | 77 | 4 |
| Matching Symbols | A | B | A B C | A D | D | A |

The FSA for the above query will have the following states:
Q0—initial state
Q1—corresponding to A
Q2—corresponding to AB+
Q3—corresponding to AB+C
Q4—corresponding to AB+CD*
Among these, Q3 and Q4 are the final states. It should also be noted that both the final states have an out transition, from Q3 to Q4 on D, and from Q4 to itself on D.

Processing of the input events, per the flowchart depicted in FIG. 6 and described above, occurs as shown below. In the description below, "d" refers to the value of the symbol after processing event $e_{(i-1)}$ and "F1" refers to the set after processing event $e_i$. B refers to the set of partial bindings after processing event $e_i$.

Sequence #1
Current Input=2
Matching symbols=A
F1={ }—empty
d={ }—empty
This is the case where d is empty and F1 is also empty.
S(1)={Q0, Q1}
B={<(A=2), Q1>} where < . . . > represents a single binding and (A=2) is the symbol to input mapping and Q represents the state associated with this binding.

Sequence #2
Current Input=3
Matching symbols=B
F1={ }—empty
d={ }—empty
This is the case where d is empty and F1 is also empty.
S(2)={Q0, Q2}
B={<(A=2, B=3), Q2>}

Sequence #3
Current Input=30
Matching symbols=A, B, C
F1={Q3}
This is the case where d is empty and F1 is not empty.
S(3)={Q0, Q1, Q2, Q3}
B={<(A=2, B=3, B=30), Q2>, <(A=30), Q1>}
b is the unique binding in the final state namely-<(A=2, B=3, C=30), Q3>
left(b)=seq#1=min(B)=seq#1
Thus, d=b=<(A=2, B=3, C=30), Q3>
Also, the binding <(A=30), Q1> with seq#4 >left(b) is deleted and its associated state Q1 is removed from S(3).
So,
S(3)={Q0, Q2, Q3}
B={<(A=2, B=3, B=30), Q2>}

Sequence #4
Current Input=14
Matching symbols=A, D
F1={Q4}
This is the case where d is not empty and F1 is also not empty.
S(4)={Q0, Q1, Q4}
B={<(A=14), Q1>}
b is the unique binding in the final state namely-<(A=2, B=3, C=30, D=14), Q4>
left(b)=seq#1<min(B)=seq#4. However, there is a transition out of state Q4.
Thus, old d=<(A=2, B=3, C=30), Q3> is discarded and now d=<(A=2, B=3, C=30, D=14), Q4>
Also, S(1) is reset to {Q0, Q4} since the binding <(A=14), Q1> is deleted and its associated state Q1 is removed from S(4). Thus B={ }

Sequence #5
Current Input=77
Matching symbols=D
F1={Q4}
This is the case where d is not empty and F1 is also not empty.

S(5)={Q0, Q4}
B={ }
b is the unique binding in the final state namely-<(A=2, B=3, C=30, D=14, D=77), Q4>
left(b)=seq#1=min(B) is not defined, also there is a transition out of state Q4.
Thus, old d=<(A=2, B=3, C=30, D=14), Q4> is discarded and now d=<(A=2, B=3, C=30, D=14, D=77), Q4>
Sequence #6
Current Input=4
Matching symbols=A
F1={Q0}
This is the case where d is not empty and F1 is empty.
S(6)={Q0, Q1}
B={<(A=4), Q1>}
left(d)=seq#1<min(B)=seq#6
Thus, d=<(A=2, B=3, C=30, D=14, D=77), Q4> is output and d reset back to empty.
Note that S(6) and B={<(A=4), Q1>} remain as they are and nothing is deleted in this case.

Figure 7:
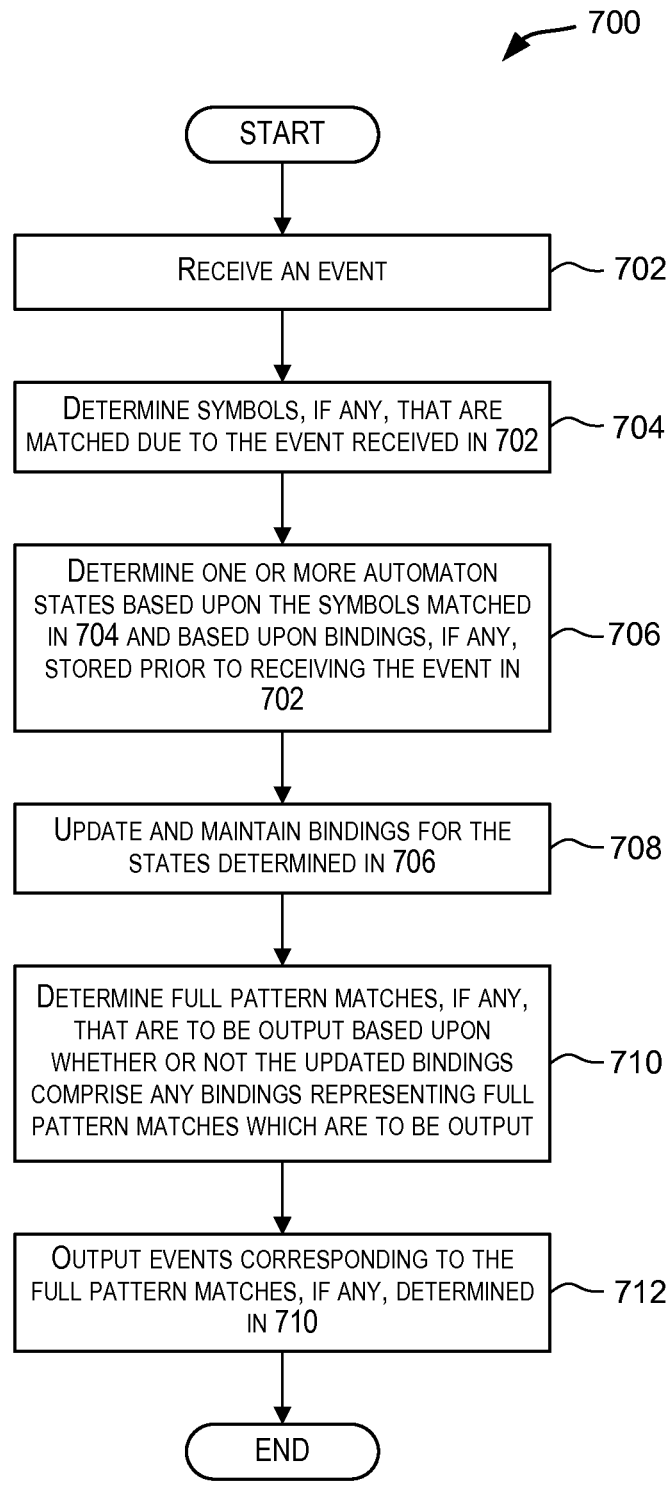
FIG. 7 is a simplified flowchart depicting a method for performing pattern matching for Class A patterns after receiving each event in an event stream according to an embodiment of the present invention.

FIG. 7 is a simplified flowchart 700 depicting a method for performing pattern matching for Class A patterns after receiving each event in an event stream according to an embodiment of the present invention. The method may be performed by software (program, code, instructions executed by a processor), in hardware, or combinations thereof. The software may be stored on a computer-readable storage medium. In one embodiment, the processing is performed by matcher 116 depicted in FIG. 1.

The processing is initiated upon receiving an event (step 702). Symbols, if any, that are matched due to the event received in 702 are determined (step 704). One or more states for the automaton are determined based upon the symbols determined to be matched in 704 and based upon bindings, if any, stored prior to receiving the event received in 702 (step 706). For example, the bindings stored upon receiving and processing the event received prior to the event received in 702 may be used to determine the state(s) of the automaton.

Updated bindings are then determined and maintained for the states determined in 706 (step 708). In one embodiment, the processing depicted in FIG. 6 may be performed in step 708 as part of determining which bindings to update and maintain. The processing in step 708 may comprise updating the previously stored bindings, applying preferment rules to select bindings from among bindings associated with the same state, determining matched but unsure bindings, and determining matched bindings that are to be output. Full pattern matches, if any, that are to be output are then determined based upon whether or not the updated bindings comprise any bindings representing full pattern matches which are to be output (step 710). Events corresponding to the full pattern matches, if any, determined in 710 are then output (step 712). Other actions, triggered by a full pattern match, may also be performed in 712. The processing depicted in FIG. 7 is performed upon receiving each event in the event stream. The bindings determined and maintained in 708 are then used during processing of the next received event.

In one embodiment, the processing depicted in FIG. 6 and described above is performed in steps 708, 710, and 712 of FIG. 7.

The technique described above is capable of detecting Class A patterns, including recurring and non-recurring patterns, in input event streams without performing any backtracking of the input events. Further, due to application of preferment rules, only one binding associated with a given state of the FSA is maintained at any point in time. As a result, the number of bindings to be maintained at any time point after processing an event is bounded by the number of states, which in turn is proportional to the length of the pattern to be matched. This enables pattern matching of Class A patterns to be performed efficiently in polynomial space and time over the number of symbols making up the pattern to be matched. The technique is thus very scalable and pattern matching can be performed at reduced costs.

Further, since the predicates defining symbols for Class A patterns are defined independent of other symbols, it follows that the set of symbols that an input event can be bound to is independent of the current bindings. Further, since an FSA is a right-invariant equivalence relation over S* (that is if xRMy then xzRMyz for strings x,y and any string z), and the preferment rules are prefix based, only one of these bindings is maintained per state. Accordingly, the number of active bindings at any point in time is bound by the number of states and is equal to one plus the length of the pattern to be matched.

In the manner described above, embodiments of the present invention are capable of automatically identifying Class A pattern based upon the input pattern to be matched and based upon the predicates associated with the pattern symbols. Upon identifying a pattern as a Class A pattern, embodiments of the present invention are configured to select and apply a pattern matching technique that is appropriate for processing Class A patterns. The application of the selected technique enables processing of event streams for detecting Class A patterns to be performed efficiently (e.g., in terms of memory and processing resources used) and in a manner that is scalable.

Class A patterns represent a class of patterns which can be used to model a large number of use cases. Since the number of patterns that can be generally specified can be quite large and may require a significant amount of computing resources, it becomes beneficial to identify a subclass (e.g., Class A patterns) of the global universe of patterns that is widely used and for which an efficient customized pattern matching solution is applied as described above.

As described above, Class A patterns represent a subset of patterns that may be specified for pattern matching. The following section describes a more generalized technique for performing pattern matching in input event streams for patterns that may not fall under the umbrella of Class A patterns.

Class B Patterns (General Patterns)

The above section described a technique for identifying Class A patterns and performing pattern matching for this specific subclass of patterns in polynomial space and polynomial time. However, there are several patterns that do not qualify as Class A patterns. This section describes a technique for performing pattern matching for general patterns, which will be referred to as Class B patterns to differentiate them from Class A patterns. A Class B pattern may include a Class A pattern.

Class B patterns are general patterns that are not restricted by the limitations imposed on Class A patterns. One of the differences between processing of Class A patterns and the Class B patterns is that there may be multiple bindings in the Class B patterns scenario that are associated with a given state of the FSA at any point in time and that need to be maintained for processing of the next event while in the Class A pattern case at most one binding associated with a given state of the FSA may be maintained at any point in time. As a result, for Class A patterns that the number of bindings that is maintained after processing an event is bounded by the number of states, which itself is proportional to the number of symbols in the pattern to be matched, thus yielding a solution that is polynomial in space and time over the number of symbols making up that pattern.

Further, unlike Class A patterns, a predicate associated with a symbol in a Class B pattern may contain references to other symbols (e.g. a predicate associated with a symbol A be defined as (A.price<B.price), where B is another symbol having its own associated predicate). Accordingly, a predicate for a symbol in Class B patterns may be dependent on other symbols.

The framework for performing Class B pattern matching may be divided into two stages: (1) a compile or design time stage during which an automaton is constructed for the query; and (2) a runtime stage during which the automaton generated in (1) is used to guide the pattern matching process. Bindings representing partial and/or full matches are maintained during the runtime stage processing. In the first stage, if the pattern is included in a query, the query is compiled into an execution plan that comprises the automaton for the query. The plan is then executed at runtime.

FIG. 8 is an example of a query 800 specifying a Class B pattern 802 according to an embodiment of the present invention. The pattern tkpattern_q10 depicted in FIG. 8 is a Class B pattern but not a class A pattern (e.g., the aggregate "avg (B.c1)" in the predicate defining C is not allowed in a Class A pattern; also the predicate for B is dependent on A, which is not allowed in a Class A pattern). The predicates for the symbols in the pattern are defined by DEFINE clause 804. As can be seen from DEFINE clause 804, the predicate for one symbol may be dependent upon another symbol. For example, the predicate for symbol B is dependent upon symbol A, and the predicate for symbol C is dependent on symbol B. At compile time processing, query 800 may be compiled into an execution plan that is used for runtime processing. A Finite State Automaton (FSA) is constructed corresponding to regular expression and the predicates specified in query 800. As an example, the following sequence matches the pattern depicted in FIG. 8

| 10 | 11 | 12 | 13 | 2 |
|---|---|---|---|---|
| A | B | B | B | C |

Figure 9:
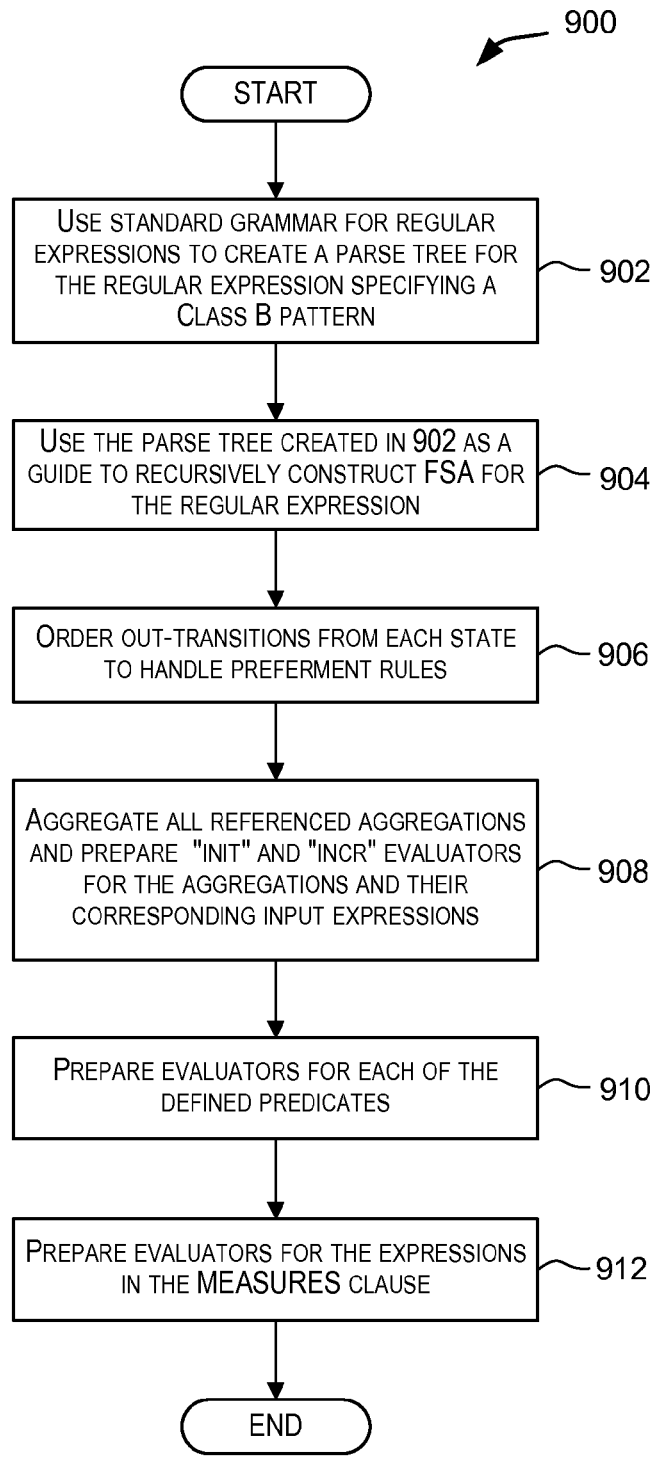
FIG. 9 is a simplified flowchart depicting a method for performing operations at compile time including constructing an automaton for a general Class B pattern according to an embodiment of the present invention.

FIG. 9 is a simplified flowchart 900 depicting a method for performing operations at compile time including constructing an automaton for a general Class B pattern according to an embodiment of the present invention. The method may be performed by software (program, code, instructions executed by a processor), in hardware, or combinations thereof. In one embodiment, the processing is performed by automaton generator 114 depicted in FIG. 1. Flowchart 900 assumes that the input regular expression has been already been determined to specify a Class B pattern.

As depicted in FIG. 9, a standard grammar for regular expressions is used to create a parse tree for the specified regular expression specifying the pattern (step 902). The parse tree obtained in 902 is then used as a guide to recursively construct the FSA (step 904). The base case for recursion is a simple symbol (e.g., A) or symbol followed by a quantifier (e.g.,: A*).

The out-transitions from each state are ordered to handle the preferment rules (step 906). In order to identify the most preferred match, while applying transitions to a binding in state S, the transitions are applied in a specific order. This order (among the set of transitions from a state) is determined at compile time and stored as part of the automaton. Included in this order, is a rank for the "finality" of the state (applicable only for final states). This is done to accommodate the preferment rules. In the presence of reluctant quantifiers (such as *?) sometimes "shorter" matches are preferred. However, for greedy quantifiers (such as "longer" matches are preferred. Using this technique of introducing a rank amongst the set of out transitions for an "imaginary" transition corresponding to the finality of a state (applies only to a final state), such decisions can be made in a manner consistent with the overall framework (and without having to special case the final state during runtime processing) that handles the preferment rules. The following is an invariant there will be only one start state and the start state does not have any incoming edges.

Several operators such as CONCATENATION, ALTERNATION, and various QUANTIFIERS (e.g., *, ?, +) may be used for one or a group of symbols. Examples of operators and quantifiers that may be used are described in "Pattern matching in sequences of rows (12)" document. These operators and quantifiers are handled in the recursion step in 904. For example, the CONCATENATION operator may be handled in the recursive step in the following manner. Consider an example R.S where R is the left regular expression and S is the right regular expression. Let F be the FSA corresponding to R and G be the FSA corresponding to S. Let Y be the set of final states in F. Let J be the start state of G. The FSA corresponding to the union of F and G may be called as H. Accordingly, all the out-transitions from state J in FSA G are copied to each state Y in FSA H. These new transitions are introduced to each state in Y at the position of its "finality" rank in the same order as they appeared in state J of FSA G (note that all states in Y were final in F and hence would have a "finality" rank in the order of their out transitions). Note that each state in Y remains final if and only if J was a final state in G. State J is then removed from H. Other operators such as ALTERNATION, GROUPING, and Quantifiers across groups may also handled individually in a similar manner.

Referring back to FIG. 9, all referenced aggregations are aggregated and "init" and "incr" evaluators for the aggregations and their corresponding input expressions are prepared (step 908). As part of processing every input and updating the bindings, the specified aggregations are also incrementally maintained. These aggregations are stored along with the bindings. For example, suppose there is a reference to sum (B.c1) (where this could be referenced in one of the DEFINE predicates or the MEASURES clause), then this would be dependent on the binding. For a binding with (A=1, B=2, B=3), sum(B.c1) would be 2+3=5 while for another binding (A=1, B=2) sum(B.c1)=2. Init and Incr evaluators are mechanisms used to initialize the aggregations when a binding is newly created and to incrementally maintain the aggregation as the binding is "grown".

Evaluators are then prepared for each of the defined predicates (e.g., predicates specified by the DEFINE clause in a query) (step 910). Evaluators are also prepared for the expressions in the MEASURES clause (step 912). These evaluators are the mechanism used to evaluate a DEFINE predicate to determine the set of symbols that an input event corresponds to. For Class B patterns, this is done in the context of the binding, i.e., for a binding b1, the same input may evaluate to a symbol A while for binding b2, it may evaluate to B.

The FSA constructed as described above and depicted in FIG. 9 may then be used to guide detection of Class B patterns in input event streams during runtime processing. In one embodiment, the FSA constructed at compile time is used as a guide to indicate how much of the specified pattern has matched at any point in time. As with Class A patterns, bindings are also used to capture the partial or full match states at any point in time during the runtime processing. As previously indicated, a binding can be thought of as an assignment of contiguous events to symbols that corresponds to a partial or full match that satisfies all the DEFINE predicates.

The runtime pattern matching processing may be explained using the following definitions. Consider a situation where an input tuple or event i has been processed and an input tuple or event (i+1) is to be processed. A binding after processing of e(i) may be in one of following three disjoint states:
(1) Partial Active (PA) state—binding not in a final state. A binding is in this state if it represents a binding that is not in a final state but has to potential of growing into a full match;
(2) Only Matched but unsure (MU) state—binding in a final state with no out-transitions (i.e., no transitions to another state or the same final state); or
(3) Both active and matched but unsure state (AMU)—binding in a final state with out-transitions to another or the same final state.

Further, let AB be the set of active bindings (i.e., bindings in states PA and AMU).
Let FB be the set of final bindings (i.e., bindings in states MU and AMU)
Let AFB=AB union FB
Let AFBL be an ordered list of bindings from set AFB in decreasing order of preferment. (It may be noted that preferment rules may be defined not only for bindings in FB but for all bindings.)

Derived bindings may also be defined. Consider a binding b1 in AB after event i has been processed. Now suppose on processing event (i+1), this binding can be "grown" to bd1, bd2, ... bdk. Then all these bindings are considered to be derived from b1.

Based upon the above definitions, the following observations/invariants may be made.
(1) The "last" event (by event sequence number) in every binding in AB is the same and is event i.
(2) For every pair of bindings fb1, fb2 in FB, INT(fb1) and INT(fb2) do not intersect.
(3) For every binding fb in FB, there exists a binding ab in AB such that ab==fb OR ab !=fb and ab is preferred to fb as per preferment rules.
(4) Consider distinct bindings fb in FB, ab in AB. If fb is preferred to ab as per preferment rules, then INT(ab) does not intersect with INT(fb).
(5) Suppose bd1 is derived from b1 and bd2 is derived from b2. Then bd1 is preferred to bd2 iff b1 is preferred to b2.

Based on the above, the following invariants also hold:
(1) If list AFBL is not empty, then the first binding in the list AFBL is in AB (follows from 3 above); and
(2) If there was a binding that moved into set FB for the first time during processing event i, and if it is still in FB, then this is the last binding in the list AFBL (follows from 1, 2, 4 above).

Figure 10A:
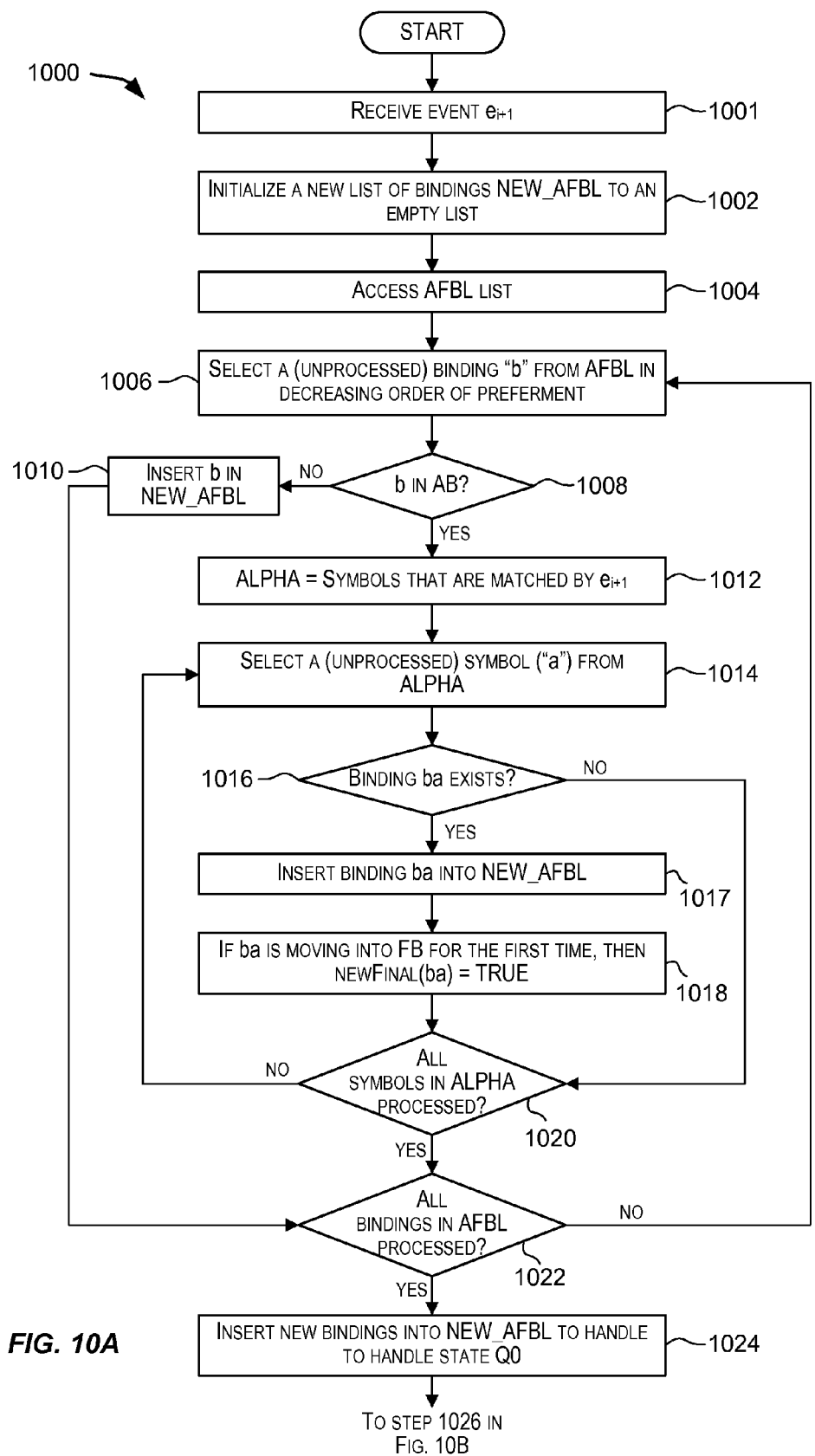
FIGS. 10A and 10B depict a simplified flowchart depicting runtime processing performed for detecting a Class B pattern in an input event stream according to an embodiment of the present invention.
Figure 10B:
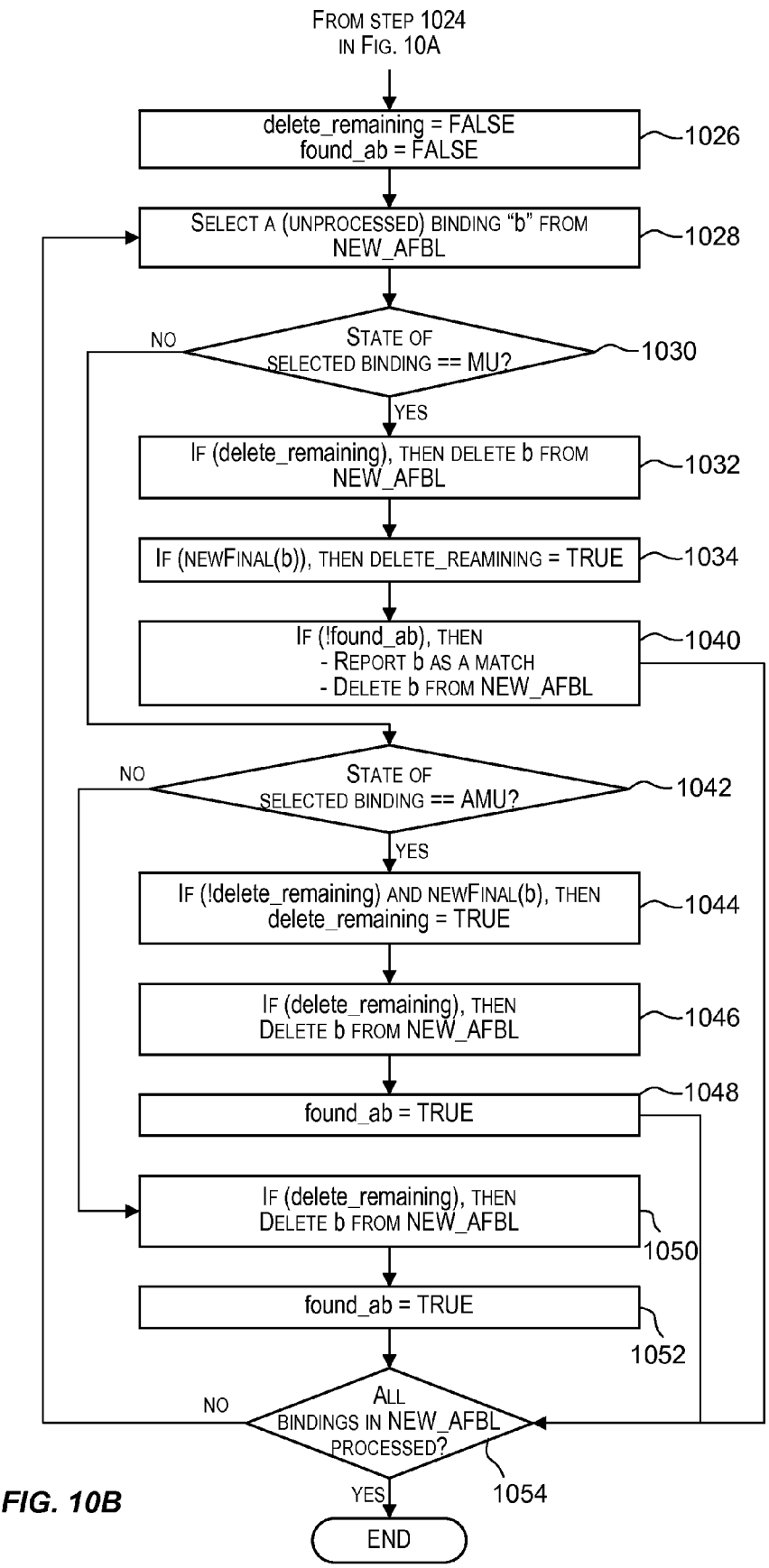

FIGS. 10A and 10B depict a simplified flowchart 1000 depicting runtime processing performed for detecting a Class B pattern in an input event stream according to an embodiment of the present invention. The method may be performed by software (program, code, instructions executed by a processor), in hardware, or combinations thereof. In one embodiment, the processing is performed by matcher 116 depicted in FIG. 1. The method depicted in FIGS. 10A and 10B show processing that is performed upon receiving an event $e_{i+1}$.

As depicted in FIG. 10A, processing is initiated upon receiving an event $e_{i+1}$ (step 1001). A new list of bindings NEW_AFBL is initialized to an empty list (step 1002). The AFBL list is accessed (step 1004). As described above, the AFBL list is an ordered list of bindings from set AFB in decreasing order of preferment, wherein the set AFB is a union of bindings in set AB (the set of active bindings (i.e., bindings in states PA and AMU)) and bindings in set FB (the set of final bindings (i.e., bindings in states MU and AMU)).

Bindings are then iteratively selected from list AFBL in decreasing order of preferment and processing according to steps 1006, 1008, 1010, 1012, 1014, 1016, 1017, 1018, 1020, and 1022. A binding from list AFBL is selected in decreasing order of preferment (step 1006). The binding selected in step 1006 will be referred to as binding "b". A check is then made to see if b is in AB (step 1008). If binding b is determined to not be in AB, then binding b is inserted into list NEW_AFBL (step 1010). Processing then continues with step 1022.

If it is determined in 1008 that b is in AB, then ALPHA is set to the symbols that are matched by event $e_{i+1}$ (step 1012). The symbols in ALPHA are then selected iteratively in order of the out-transitions on the corresponding state of the FSA and processed according to steps 1014, 1016, 1017, 1018, and 1020. A symbol is selected from ALPHA for processing (step 1014). The symbol selected in 1014 will be referred to as symbol "a". A check is then made to see if there is a binding ba gotten by applying symbol a on binding b (step 1016). If such a binding ba exists then the binding ba is inserted into list NEW_AFBL (step 1017). Further, if ba is moving into FB for the first time then newFinal(ba) is set to TRUE (step 1018). This is to identify whether in this iteration there is a binding that has moved into a final state. This means that all bindings that would be created following this need not be considered (hence need not be inserted into NEW_AFBL). Nothing is done if no such binding ba exists. A check is then done to see if all symbols in ALPHA have been processed (step 1020). If all symbols in ALPHA have not been processed, then processing continues with step 1014 wherein the next symbol that has not yet been processed is selected. Else processing continues with step 1022.

A check is then made to see if all bindings in AFBL have been processed (in decreasing order of preferment) (step 1022). If it is determined in 1022 that all bindings in AFBL have not been processed, then processing continues with step 1006 wherein another unprocessed binding is selected. If it is determined in 1022 that all bindings in AFBL have not been processed, then, in order to handle state Q0, new bindings are inserted into NEW_AFBL in appropriate order (step 1024). The order would correspond to iterating through the out-transitions of state Q0 in the order in which they appear in the FSA. The processing would correspond to b is in AB.
  1. Let ALPHA be the alphabets that tuple (i+1) evaluates to for the binding b
  2. Iterate through the alphabets in ALPHA in order of their occurrence in the out transitions of the current state of the binding
    1. Let a be the alphabet for this iteration
    2. Insert binding ba got by applying alphabet a on binding b into NEW_AFBL. Further if ba is moving into FB for this first time then mark newFinal(ba)=true
    3. If there is no such binding by applying alphabet a on binding b then do nothing The bindings in list NEW_AFBL are then processed. In order to facilitate the processing, a variable "delete_remaining" is set to FALSE and another variable "found_ab" is set to FALSE (step 1026). The bindings in list NEW_AFBL are processed according to steps 1028 onwards (1028 to 1054). A binding is selected from NEW_AFBL for processing (step 1028). The binding selected in 1028 will be referred to as b.

Processing is then performed based upon the state of the selected binding, whether it is MU, AMU, or PA. A check is performed to see if the state of the binding selected in 1028 is MU (step 1030). If the state of binding b is not MU, then processing continues with step 1042. If it is determined in 1030 that the state of the binding is MU, then if delete_remaining is TRUE then the binding b is deleted from NEW_AFBL (step 1032). Then, if newFinal(b) is TRUE, delete_remaining is set to TRUE (step 1034). Then, if found_ab is FALSE (i.e., !found_ab), then binding b is reported as a match and binding b is deleted from NEW_AFBL (step 1040).

A check is made to see if the state of binding b selected in 1028 is AMU (step 1042). If the state of binding b is not AMU, then processing continues with step 1050. If it is determined in 1042 that the state of the binding is AMU, then if delete_remaining is FALSE (i.e., !delete_remaining) and newFinal(b) is true, then delete_remaining is set to TRUE (step 1044). Else, if delete_remaining is TRUE then binding b is deleted from NEW_AFBL (step 1046). The variable found_ab is then set to TRUE (step 1048).

If the state of binding b is neither MU nor AMU, then the state of b is PA. In such a case, if delete_remaining is set to TRUE then binding b is deleted from NEW_AFBL (step 1050). The variable found_ab is set to TRUE (step 1052). Processing then continues with step 1054.

A check is then made to see if all bindings in list NEW_AFBL have been processed (step 1054). If all bindings in NEW_AFBL are determined to have been processed then the processing ends, else processing continues with step 1028 wherein a new binding is selected for processing.

At the end of processing of event $e_{i+1}$, it can be verified that the seven invariants listed above hold. It should be noted that the method depicted in FIG. 10 and described above may also be used for detecting Class A, including Class A simple recurring patterns, since these patterns are just a subclass of the general Class B patterns. The method depicted in FIG. 10 and described above may be implemented with two separate lists: i) Partial Active PA and ii) Both active and Matched but unsure list AMU. In one embodiment, rather than have a single AFB list, it is also possible to have two lists—AB and FB.

Output Ordering for Partition by Support for Patterns

In an embodiment of the present invention, an input event stream may be partitioned into multiple different streams based for example upon a symbol. The pattern matching techniques described above may, then, be applied over each sub-stream. In this scenario, a query comprising a regular expression is compiled into a PLAN that is then used at runtime processing for detecting the pattern over the partitioned multiple streams. The compilation process comprises building an FSA for the regular expression. This may involve building a base FSA for each symbol and then combining the FSAs to form a single FSA, which is then used at runtime processing.

The following SQL query provides an example of how an input event stream may be partitioned using a symbol, and pattern matching may then be applied over each sub-stream.

```
create query double_bottom as
select symbol, start_price, end_price
from Ticker MATCH_RECOGNIZE (
    PARTITION BY symbol
    MEASURES
        A.symbol       as symbol,
        A.price        as start_price,
        LAST(Z.price)  as end_price
    PATTERN (A W+ X+ Y+ Z+)
    DEFINE
        W as (W.price < PREV(W.price)),
        X as (X.price > PREV(X.price)),
        Y as (Y.price < PREV(Y.price)),
        Z as (Z.price > PREV(Z.price))
)
```

The complex pattern that this query specifies is what is known as a "double bottom" or "W" shaped pattern. The requirement is to match non-overlapping maximal "W" patterns and from all the events constituting a match, output a single event corresponding to the match that reports the symbol, the price at the beginning of the fall and the price at the end of the last rise.

The following definitions are used to describe the pattern matching processing:

1) ReadyToOutputList—This list contains all the potential output bindings in the increasing order of output timestamp. These bindings are on hold because there exists an unsure binding with lesser output timestamp in some other partition.

The pattern matching process proceeds as follows:

(1) After processing the current input tuple, collect all the bindings in the current partition, which can be output and move them to ReadyToOutputList.

(2) Get minimum matched timestamp (minMatchedTs) of all the unsure bindings of all the partitions.

(3) Emit all the bindings in the ReadyToOutputList whose matched timestamp is less than minMatchedTs.

The processing described above ensures that ready to output bindings are on hold until all the potential output bindings (unsure bindings) whose matched timestamp is less than the ready to output bindings either become ready to output or cannot be developed further.

Responsibility of pattern processor is to output the matched events in order of time. In one partition there may be a match ready for output and in another partition there is a match that is being held back by preferment.

As described above, extensions are provided to SQL that transform SQL into a rich expressive language for performing pattern matching using regular expressions. The extensions enhance the ability of SQL to support pattern matching on events. Extensions to support or model regular expression-based pattern matching on event streams may also be provided for other programming languages.

Pattern matching using regular expressions over continuously arriving events of an event stream, as described above, has wide applicability in various fields and applications. Examples include financial services, RFID based applications such as inventory management, click stream analysis applications, electronic health systems, and the like. For example, in financial services, a trader may use the pattern matching techniques described above to identify trends in the stock market based upon a stream of incoming ticker stock prices. As another example, in RFID-based tracking and monitoring, the pattern matching techniques described above may be used to track valid paths of shipments and detect anomalies.

While embodiments of the present invention have been described above with respect to Class A and Class B patterns, in alternative embodiments various different types of patterns may be recognized and processed accordingly. For a particular class of pattern that is detected, an embodiment of the present invention is configured to select and apply a pattern matching technique that is appropriate for that type of pattern.

In this manner, embodiments of the present invention optimize and increase the efficiency of pattern matching performed over event streams.

Automaton Construction

This section describes techniques for constructing a non-deterministic finite state automata (NFSA) given a regular expression used to express a pattern to be recognized according to an embodiment of the present invention. Description is provided for generating an NFSA for a basic regular expression such as 'A'. Description is then provided for the necessary transformations for each of the regular expression operators such as Concatenation, Alternation, Greedy Quantifiers—'*', '+', '?' and Lazy Quantifiers—'*?', '+?', '??'.

In one embodiment, a regular expression is maintained in a tree representation (which is actually a unique parse tree for that regular expression) constructed by taking into account the precedence and associativity of regular expression operators. Like most algorithms operating on tree data structure, the process of construction of NFSA given a regular expression in tree form is also recursive in nature. A standard NFSA is constructed for basic regular expression that is nothing but a single correlation variable and then gradually the entire NFSA is built by applying the transformations for different operators involved.

(a) Machine for a Basic Regular Expression

A basic regular expression is simply a single correlation variable e.g. A. The machine for this basic regular expression consists of two states: 0 and 1.

State 0: This is the start state and it has a transition going to state 1 on encountering the alphabet A in the input.

State 1: This is the final state and has one transition going to "undefined" state (state number −1) on the alphabet "Final" (indicated by F in FIGS. 11A-11I).

Figure 11A:
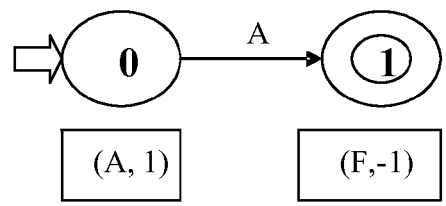
FIGS. 11A-11I depict various state machines for generating an automata for a regular expression according to an embodiment of the present invention.
Figure 11B:
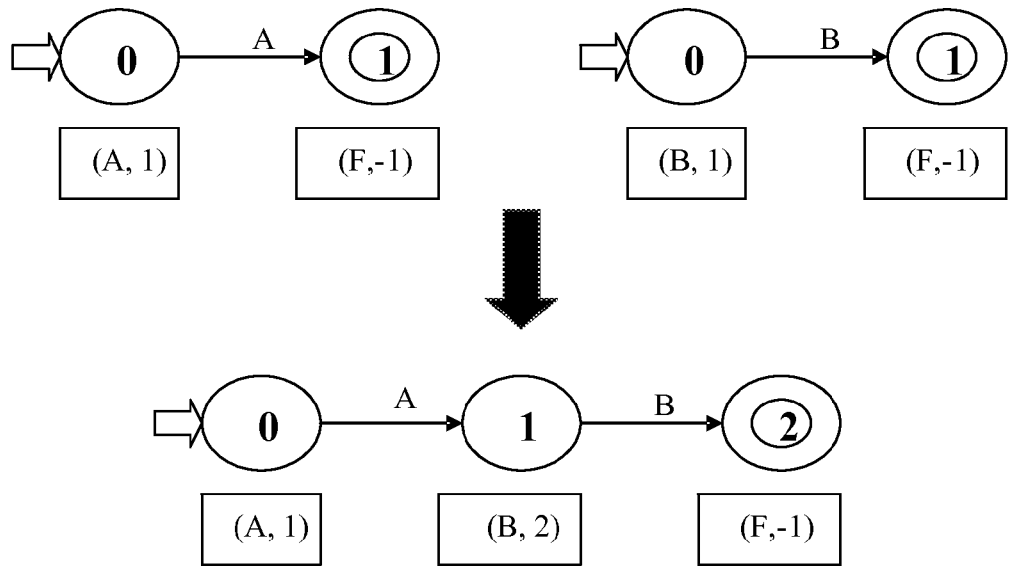

A state diagram for a single correlation variable e.g. 'A' is shown in FIG. 11A. In FIGS. 11A-11I, a rectangular box below the state shows the <alphabet, dest state> pairs (transitions) of that state in the decreasing order of preference.

(b) Concatenation Operator (.)

The concatenation operator is a binary operator. First, the NFSA for the left and right operands are obtained and then merged to get the NFSA for the concatenated regular expression.

Let 'L'—number of states in left operand NFSA
'R'—number of states in right operand NFSA The start state of right NFSA is not considered and so the number of states in the merged NFSA is L+R−1. Also the states are numbered 0 through L+R−2.

The steps for merging the two NFSAs are as follows:
(1) For every state 'S' in the left NFSA
    Copy all the transitions (<alphabet, destination state> pairs) of 'S' to the corresponding state of merged NFSA.
(2) For every final state of left NFSA
    In the corresponding state of merged NFSA, add all the start state transitions of right NFSA, in the order in which they appear, at a position, where 'Final' transition appears for that state. In the process that 'Final' transition is removed.
    If the start state of right NFSA is final (i.e. the language of the right regular expression accepts 'ϵ') then make this state of merged NFSA a final state.
(3) For every state 'S' of right NFSA except the start state
    Copy the transitions of state 'S' to the state 'S+L−1' of the merged NFSA incrementing the destination state field by L−1.
    Make the state 'S+L−1' of merged NFSA final, if the state 'S' of right NFSA is final.

Figure 11C:
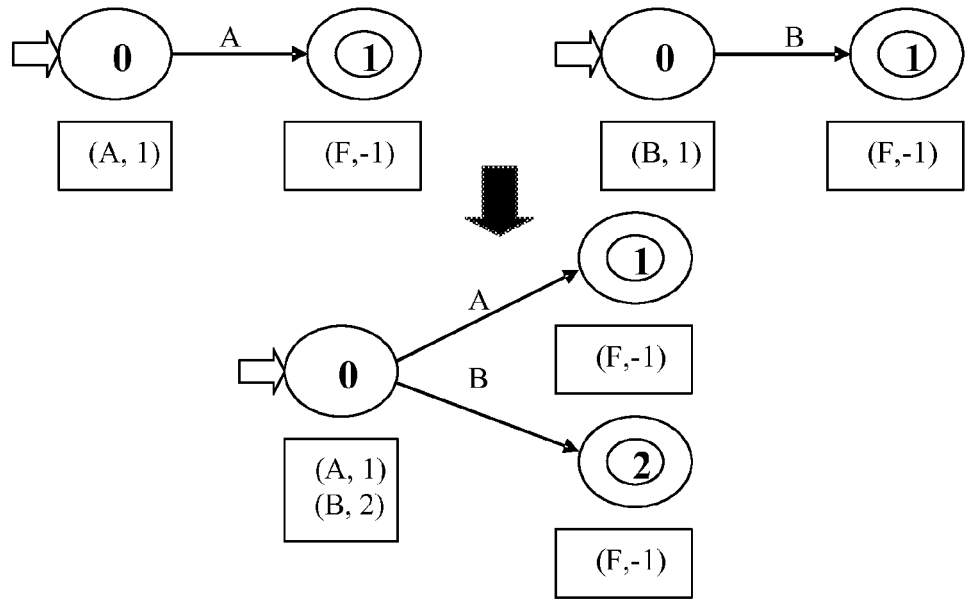

FIG. 11C depicts how the state diagram of 'AB' is obtained from the state diagrams of 'A' and 'B' by following the above technique.

(c) Alternation Operator (|)

The alternation operator is a binary operator. First, the NFSA for the left and right regular expressions are obtained and then join them together to get the NFSA for the complete regular expression.

Let 'L'—number of states in left operand NFSA and
'R'—number of states in right operand NFSA In the joined NFSA, a new state is created for start state that has all the transitions of start states of left as well as right NFSA. We do away with the start states of left and right NFSA. So the number of states in the joined NFSA is L+R−1. Also the states are numbered 0 through L+R−2.

The two NFSAs are joined as follows:
(1) For every state 'S' in the left NFSA
    Copy all the transitions (<alphabet, destination state> pairs) of 'S' to the corresponding state of joined NFSA.
    Also mark the state 'S' of joined NFSA as final if state 'S' of left NFSA is final.
(2) If start states of both left and right NFSA are final then
    Append all the start state transitions of right NFSA excluding the 'Final' transition, in the order in which they appear, to the transitions of the start state of the joined NFSA.
    While appending increment the destination state field by L−1.
    Else
    Append all the start state transitions of right NFSA, in the order in which they appear, to the transitions of the start state of the joined NFSA. While appending increment the destination state field by L−1.
    Make the start state of joined NFSA final, if the start state of right NFSA is final.
3. For every state 'S' of right NFSA except the start state
    Copy the transitions of state 'S' to the state 'S+L−1' of the joined NFSA incrementing the destination state field by L−1.
    Make the state 'S+L−1' of joined NFSA final, if the state 'S' of right NFSA is final.

FIG. 11C depicts an example of how to get state diagram for (AB) from state diagrams of alternation components.

(d) Quantifiers

Quantifiers that may be supported in a regular expression include greedy quantifiers (*, +, ?) and lazy (*?, +?, ??) quantifiers. These quantifiers can be applied over simple regular expressions like A, B, etc. or over complex regular expressions formed by applying 'concatenation' and/or 'alternation' over simple regular expressions e.g., (AB)*, (A|B)*, etc. Repeated applications of these quantifiers in any order is also allowed yielding regular expressions like (A*)?, (A*?B+C?)+, etc. In the techniques described below for handling quantifiers, a machine constructed for the unary operand (whether simple/complex) of the quantifier is first obtained and then the constructed NFSA is appropriately modified depending on the quantifier, as per the rules stated below.

(1) '*' Quantifier (Greedy)
Let P=R*
Case 1—L(R) Does Not Contain Epsilon

---

Start state of R   Cannot be the case (since L(R) does not contain epsilon) is final -continued

| | |
|---|---|
| Start state of R is not final | Make start state final and the rank of "final" is the lowest (do this start state processing last) |
| Non-start final states | For each such state, copy over all start-state transitions between current "final" and its predecessor. Then, for each duplicate transition, remove the lower ranked duplicate. (Here duplicate transition is one where alphabet and destination state are identical) |

Case 2—L(R) Contains Epsilon

| | |
|---|---|
| Start state of R is final | No change, leave it as is |
| Start state of R is not final | Cannot be the case (since L(R) contains epsilon) |
| Non-start final states | For each such state, copy over all start-state transitions between current "final" and its predecessor. This includes the "final transition" from the start state. Remove the original "final transition" of this final state. Then, for each duplicate transition, remove the lower ranked duplicate. (Here duplicate transition is one where alphabet and destination state are identical) |

Figure 11D:
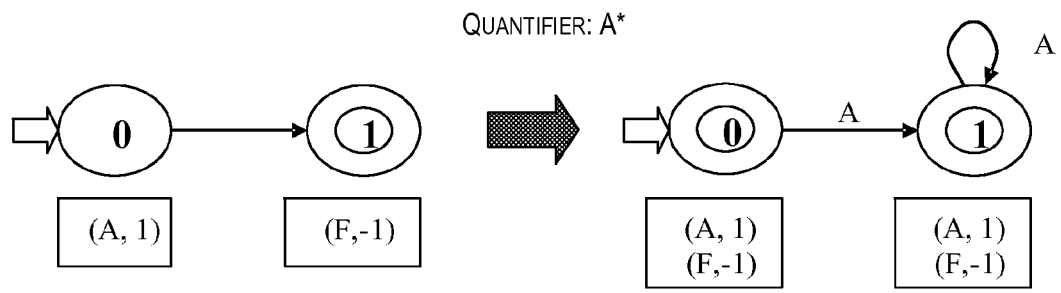

FIG. 11D depicts an example of the state machine for 'A*' obtained by applying rules for '*' over state machine for 'A'.

(2) '+' Quantifier (Greedy)

Let P=R+

Case 1—L(R) Does Not Contain Epsilon

| | |
|---|---|
| Start state of R is final | Cannot be the case (since L(R) does not contain epsilon) |
| Start state of R is not final | No change, leave it as is. |
| Non-start final states | For each such state, copy over all start-state transitions between current "final" and its predecessor. Then, for each duplicate transition, remove the lower ranked duplicate. (Here duplicate transition is one where alphabet and destination state are identical) |

Case 2—L(R) Contains Epsilon

| | |
|---|---|
| Start state of R is final | No change, leave it as is |
| Start state of R is not final | Cannot be the case (since L(R) contains epsilon) |
| Non-start final states | For each such state, copy over all start-state transitions between current "final" and its predecessor. This includes the "final transition" from the start state. Remove the original "final transition" of this final state. Then, for each duplicate transition, remove the lower ranked duplicate. (Here duplicate transition is one where alphabet and destination state are identical) |

Figure 11E:
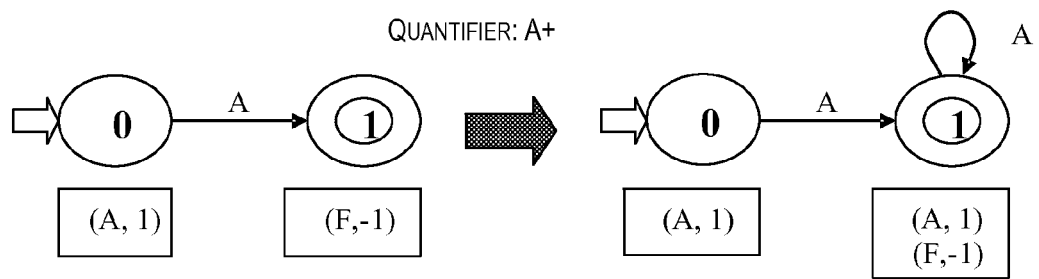

FIG. 11E depicts an example of the state machine for 'A+' obtained by applying rules for '+' over the state machine for 'A'.

(3) '?' Quantifier (Greedy)

Let P=R?

Case 1—L(R) Does Not Contain Epsilon

| | |
|---|---|
| Start state of R is final | Cannot be the case (since L(R) does not contain epsilon) |
| Start state of R is not final | Make the start state final and the rank of "final" is the lowest. |
| Non-start final states | Nothing needs to be done |

Case 2—L(R) Contains Epsilon

| | |
|---|---|
| Start state of R is final | No change, leave it as is |
| Start state of R is not final | Cannot be the case (since L(R) contains epsilon) |
| Non-start final states | Nothing needs to be done. |

Figure 11F:
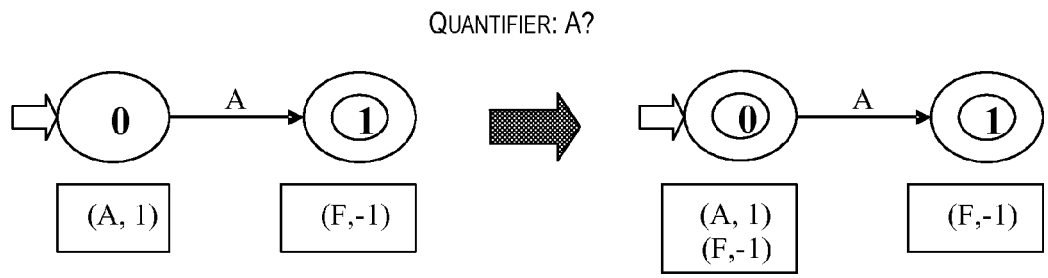

FIG. 11F depicts an example of the state machine for 'A?' obtained by applying rules for '?' over state machine for 'A'.

(4) '*?' quantifier (Lazy)

Let P=R*?

Case 1—L(R) Does Not Contain Epsilon

| | |
|---|---|
| Start state of R is final | Cannot be the case (since L(R) does not contain epsilon) |
| Start state of R is not final | Make the start state final and the rank of "final" is first (do this processing last) (Since epsilon is to be given more preference over any non-empty string, rank of final is first). |
| Non-start final states | For each such state, copy all start state transitions between current 'final' and its immediate successor. Then for each duplicate transition, remove the lower ranked duplicate |

Case 2—L(R) Contains Epsilon

| | |
|---|---|
| Start state of R is final | Remove the original 'final' transition and put it in the first place. (Since epsilon is to be given more preference over any non-empty string, rank of final is first) |
| Start state of R is not final | Cannot be the case (since L(R) contains epsilon) |
| Non-start final states | For each such state, copy all start state transitions between current "final" and its immediate successor. No need to include the "final transition" from the start state. Then, for each duplicate transition, remove the lower ranked duplicate. |

Figure 11G:
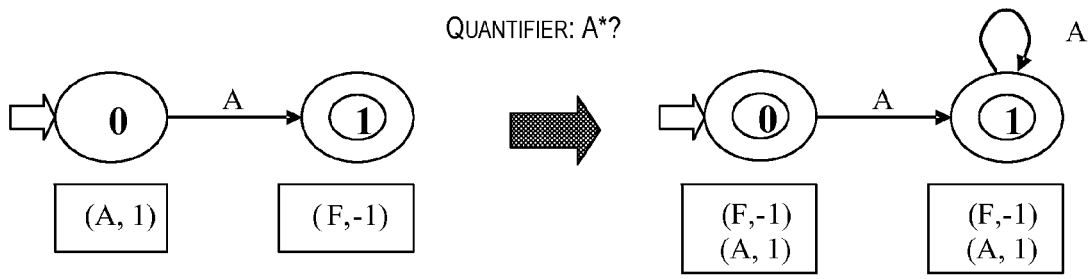

FIG. 11G depicts an example of the state machine for 'A*?' obtained by applying the rules for '*?' over state machine for 'A'.

(5) '+?' Quantifier (Lazy)

P=R+?

Case 1—L(R) Does Not Contain Epsilon

| | |
|---|---|
| Start state of R is final | Cannot be the case (since L(R) does not contain epsilon) |
| Start state of R is not final | No change, leave it as is. |
| Non-start final states | For each such state, copy all start state transitions between current 'final' and its immediate successor. Then for each duplicate transition, remove the lower ranked duplicate. |

Case 2—L(R) Contains Epsilon

| | |
|---|---|
| Start state of R is final | No change, leave it as is. (No change in preference of epsilon needed here) |
| Start state of R is not final | Cannot be the case (since L(R) contains epsilon) |
| Non-start final states | For each such state, copy all start state transitions between current "final" and its immediate successor. No need to include the "final transition" from the start state. Then, for each duplicate transition, remove the lower ranked duplicate. |

Figure 11H:
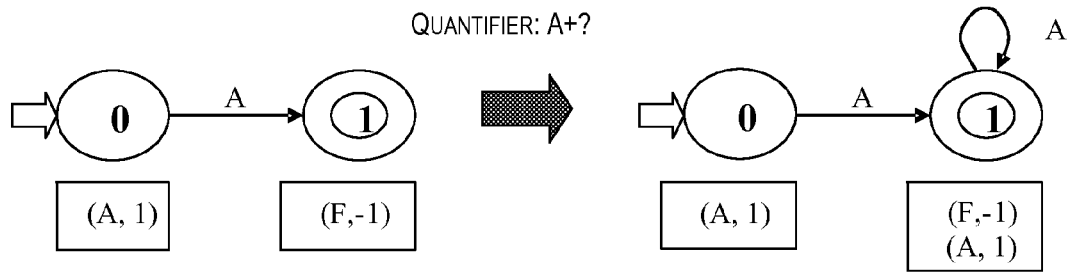

FIG. 11H depicts an example of a state machine for 'A+?' obtained by applying the rules for '+?' over state machine for 'A'.

(6) '??' Quantifier (Lazy)
Let P=R??
Case 1—L(R) Does Not Contain Epsilon

| | |
|---|---|
| Start state of R is final | Cannot be the case (since L(R) does not contain epsilon) |
| Start state of R is not final | Make the start state 'final' and rank of 'final' is first. (Since epsilon is to be given more preference over any non-empty string rank of final is first) |
| Non-start final states | Nothing needs to be done |

Case 2—L(R) Contains Epsilon

| | |
|---|---|
| Start state of R is final | Remove the original final transition and put it in the first place. (Since epsilon is to be given more preference over any non-empty string, rank of final is first) |
| Start state of R is not final | Cannot be the case (since L(R) contains epsilon) |
| Non-start final states | Nothing needs to be done |

Figure 11I:
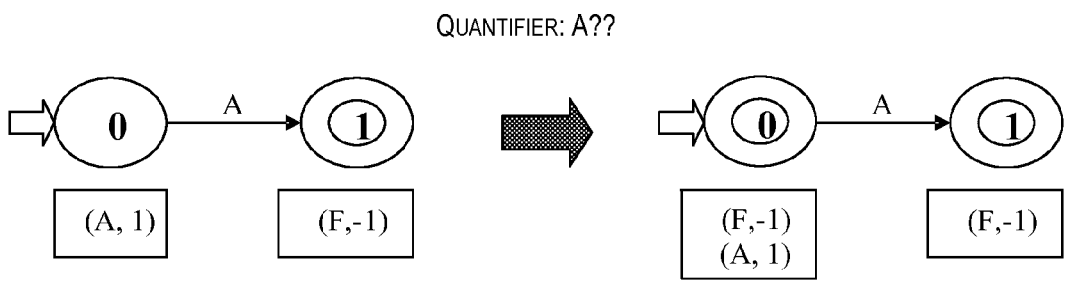

FIG. 11I depicts an example of a state machine for 'A??' obtained by applying rules for '??' over state machine for 'A'.

EXAMPLE

Figure 12A:
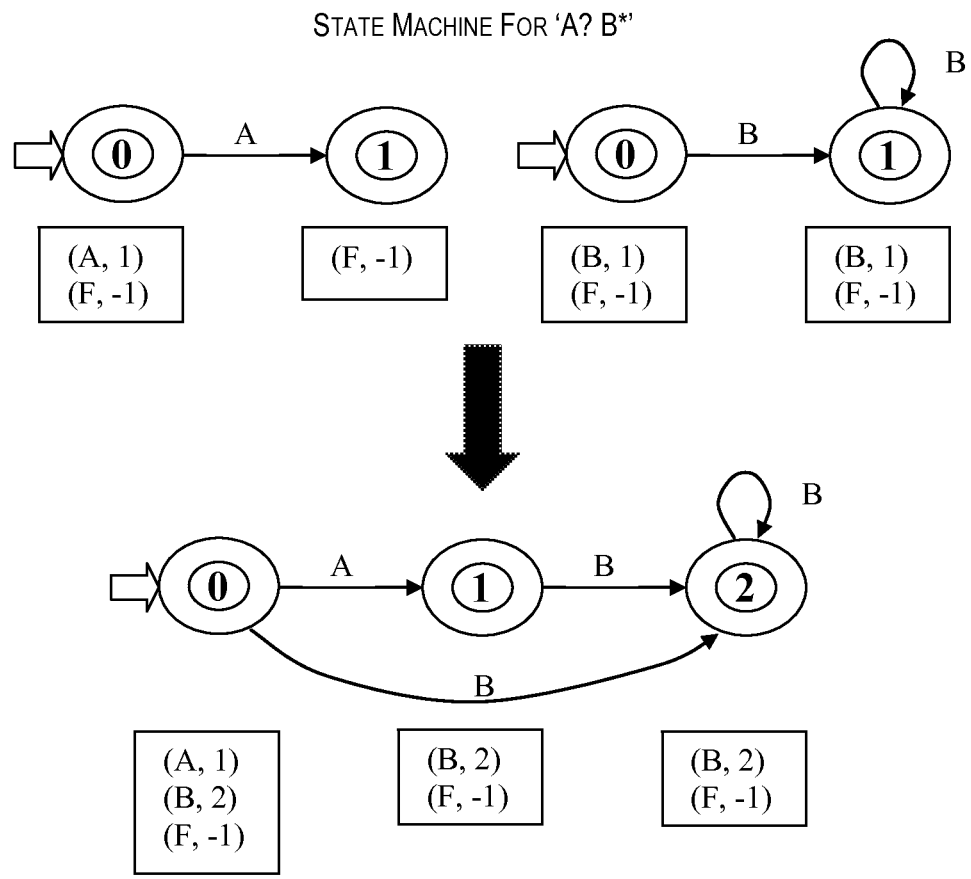
FIGS. 12A-12D depict state machines for constructing an automata for an example regular expression according to an embodiment of the present invention.
Figure 12B:
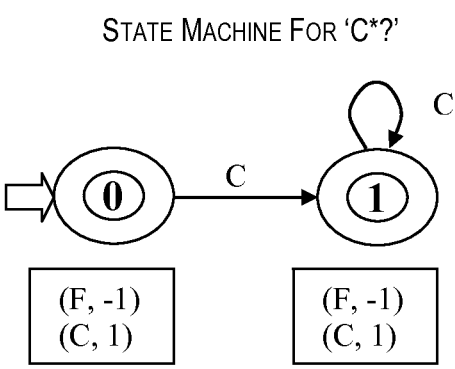
Figure 12C:
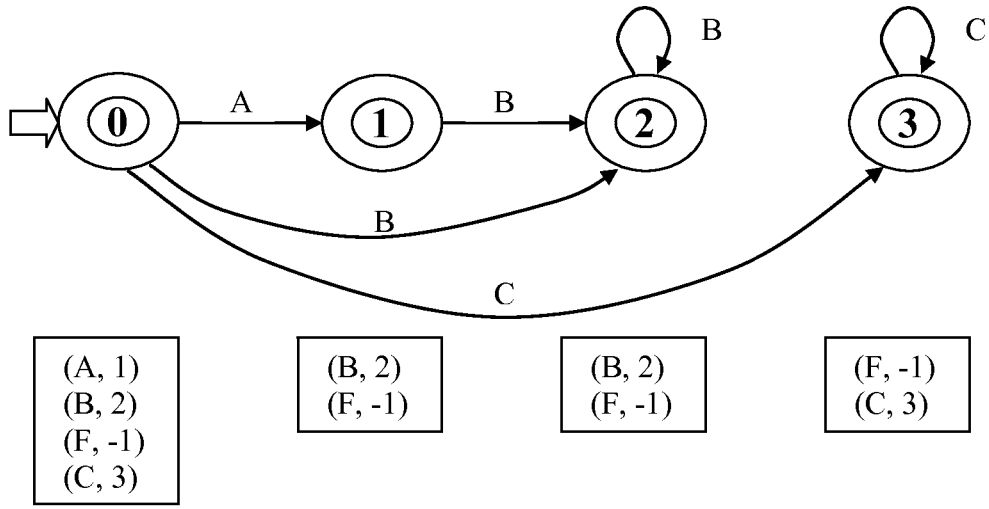
Figure 12D:
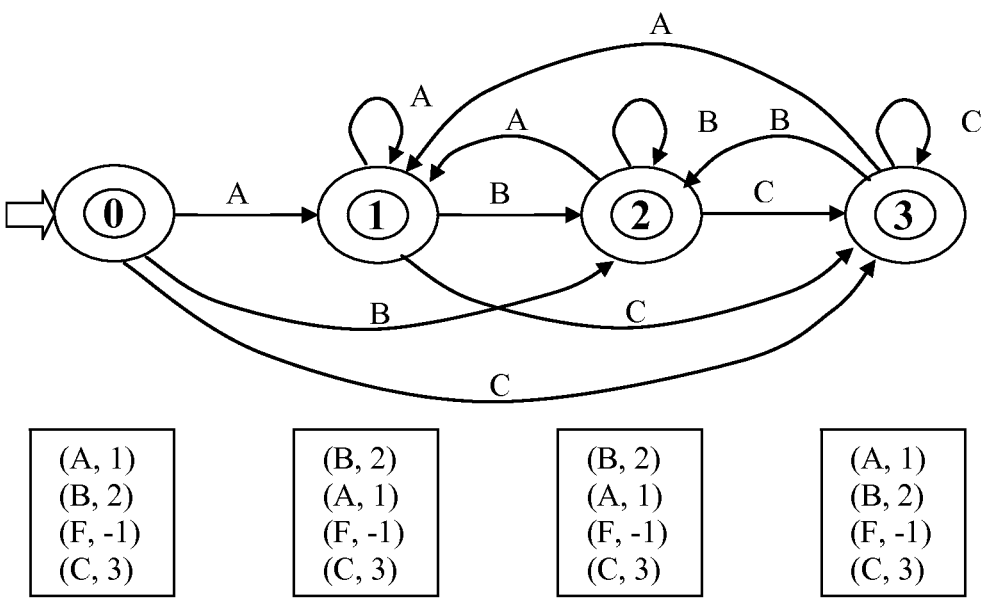

This section provides an example of constructing an NFSA based upon the rules described above. Consider a regular expression "(A? B*|C*?)+". Here '+' is applied over the expression in brackets. The expression inside brackets has two alternation components: 'A? B*' and 'C*?'. The first one of these components is concatenation of 'A?' and 'B*'. The process of constructing a state machine for this regular expression is as follows:
(1) The state machine for first alternation component 'A? B*' is obtained by applying rules of concatenation operator on the state machines for 'A?' and 'B*'. This is shown in FIG. 12A.
(2) The state diagram for second alternation component 'C*?' is shown in FIG. 12B.
(3) The rules of alternation operator are applied on state machines of the two components to get the state machine for '(A?B*|C*?)', as shown in FIG. 12C.
(4) Finally, the rules for '+' quantifier on the state machine obtained in last step are applied to get the state machine for complete regular expression, as shown in FIG. 12D.

Analysis of Technique for Constructing NFSA

Let 'N' be the number of alphabets in the regular expression and 'S' be the number of states in the state diagram of that regular expression constructed by using the algorithms described in this document. Then S=N+1 always, which means S is linear in 'N'. This can be proven using the principle of induction as follows:
(1) Basic case: When N=1, (single correlation variable case) the number of states is two. So S=N+1 holds.
(2) Assumption: Let S=N+1 holds for all N<=K.
(3) Induction Step: To Prove for N=K+1, we have the following cases:
Concatenation: State diagram of regular expression with 'n1' variables is joined by using concatenation to another state diagram of regular expression with 'n2' variables where n1 and n2 both <=K, then the number of states in resultant state diagram is:
S=S1+S2−1 (since the initial state of second NFSA is removed in the process)
Where S1—number of states in first NFSA=n1+1 (follows from step 2)
S2—number of states in the second NFSA=n2+1 (follows from step 2)
Therefore, S=n1+1+n2+1−1=n1+n2+1=N+1 since N=n1+n2.
Alternation: State diagram of regular expression with 'n1' variables is joined by using alternation to another state diagram of regular expression with 'n2' variables where n1 and n2 both <=K, then the number of states in resultant state diagram is:
S=S1+S2−1 (since the initial states of both NFSA are removed in the process and a new initial state is added)
Where S1—number of states in first NFSA=n1+1 (follows from step 2)
S2—number of states in the second NFSA=n2+1 (follows from step 2).
Therefore, S=n1+1+n2+1−1=n1+n2+1=N+1 since N=n1+n2.
Quantifiers: Algorithms for quantifiers don't change the number of states.
So in all cases S=N+1 is proved. Hence the number of states is linear in N.
The worst case bound on the number of transitions (M) is $$M = \text{number of alphabets}(N) * \text{number of states}(S).$$

This follows easily from the following invariant, there can be at most one transition for a given <state, alphabet> pair.
So in the worst case, every state will have one transition on every alphabet.

$$M = N*S = N*(N+1) = O(N^2).$$

So in the worst case, M is quadratic in N.

Figure 13:
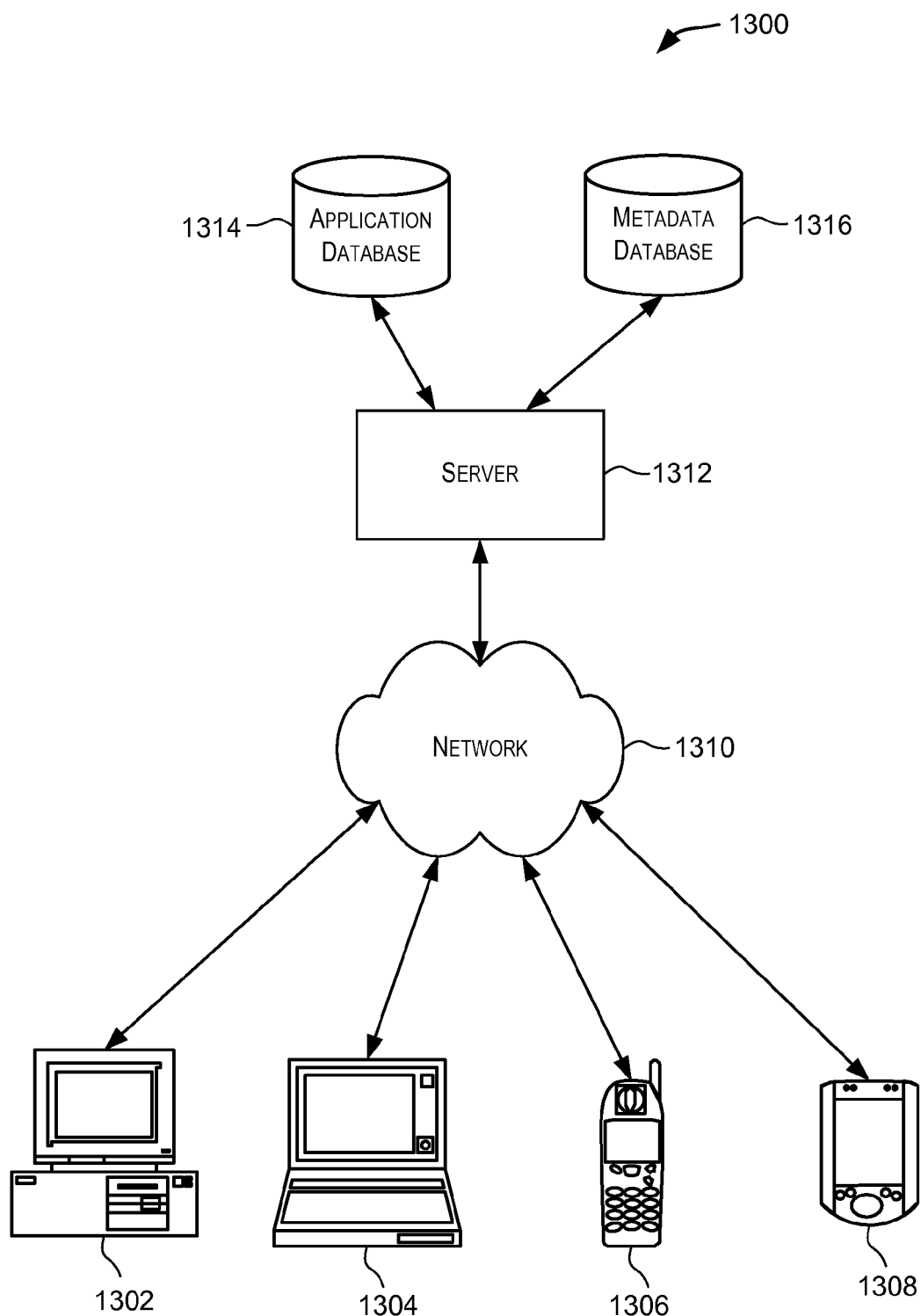
FIG. 13 is a simplified block diagram illustrating components of a system environment that may be used in accordance with an embodiment of the present invention.

FIG. 13 is a simplified block diagram illustrating components of a system environment 1300 that may be used in accordance with an embodiment of the present invention. As shown, system environment 1300 includes one or more client computing devices 1302, 1304, 1306, 1308, which are configured to operate a client application such as a web browser, proprietary client (e.g., Oracle Forms), or the like. In various embodiments, client computing devices 1302, 1304, 1306, and 1308 may interact with a server 1312.

Client computing devices 1302, 1304, 1306, 1308 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1302, 1304, 1306, and 1308 may be any other electronic device, such as a thin-client computer, Internet-enabled gaming system, and/or personal messaging device, capable of communicating over a network (e.g., network 1310 described below). Although exemplary system environment 1300 is shown with four client computing devices, any number of client computing devices may be supported. Other devices such as devices with sensors, etc. may interact with server 1312.

System environment 1300 may include a network 1310. Network 1310 may be any type of network familiar to those skilled in the art that can support data communications using any of a variety of commercially-available protocols, including without limitation TCP/IP, SNA, IPX, AppleTalk, and the like. Merely by way of example, network 1310 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1300 also includes one or more server computers 1312 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1312 may be adapted to run one or more services or software applications described in the foregoing disclosure. For example, server 1312 may correspond to an events processing server as depicted in FIG. 1 that includes a pattern matching module as depicted in FIG. 1.

Server 1312 may run an operating system including any of those discussed above, as well as any commercially available server operating system. Server 1312 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 1300 may also include one or more databases 1314 and 1316. Databases 1314 and 1316 may reside in a variety of locations. By way of example, one or more of databases 1314 and 1316 may reside on a storage medium local to (and/or resident in) server 1312. Alternatively, databases 1314 and 1316 may be remote from server 1312, and in communication with server 1312 via a network-based or dedicated connection. In one set of embodiments, databases 1314 and 1316 may reside in a storage-area network (SAN) familiar to those skilled in the art. Similarly, any necessary files for performing the functions attributed to server 1312 may be stored locally on server 1312 and/or remotely, as appropriate. In one set of embodiments, databases 1314 and 1316 may include relational databases, such as Oracle 10g, that are adapted to store, update, and retrieve data in response to SQL-formatted commands.

Figure 14:
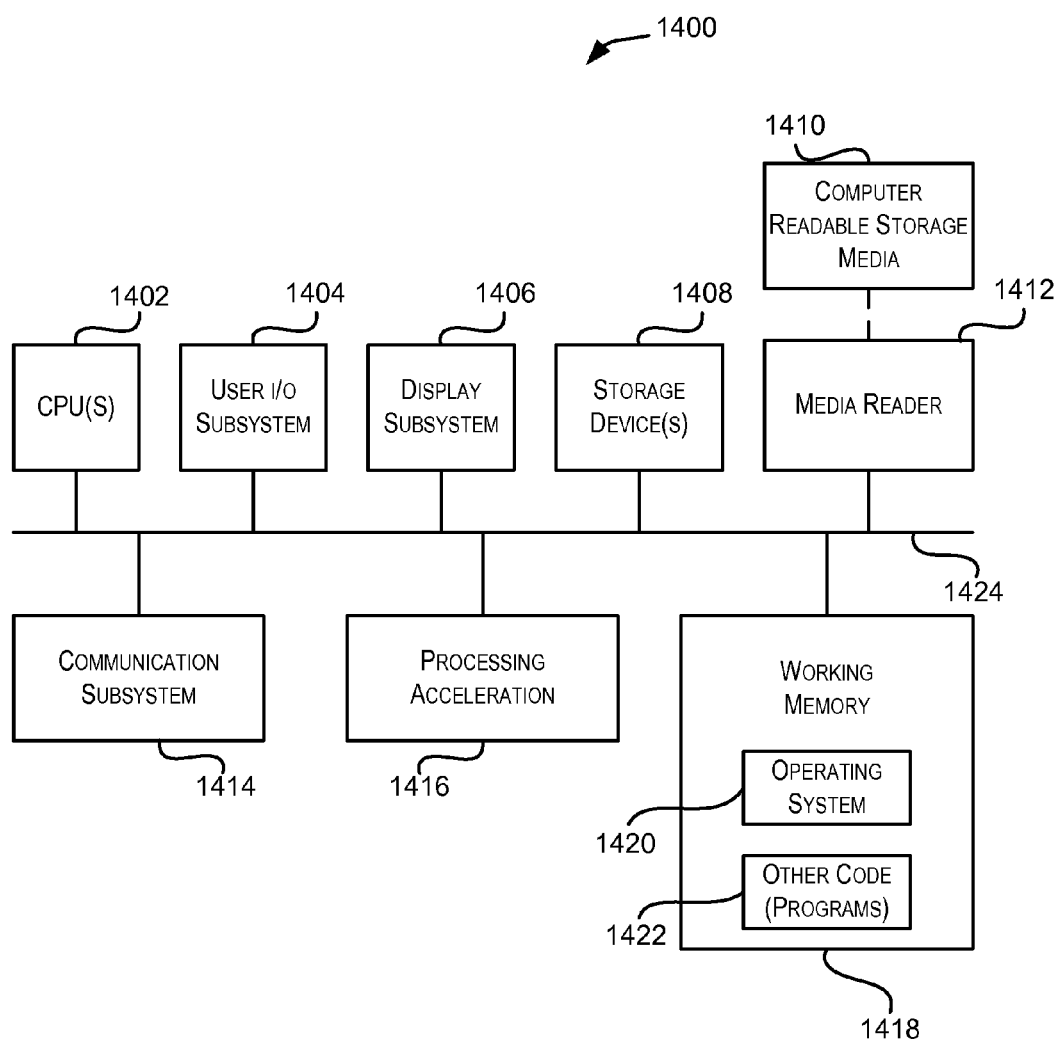
FIG. 14 is a simplified block diagram of a computer system that may be used in accordance with embodiments of the present invention.

FIG. 14 is a simplified block diagram of a computer system 1400 that may be used in accordance with embodiments of the present invention. For example server 102 may be implemented using a system such as system 1400. Computer system 1400 is shown comprising hardware elements that may be electrically coupled via a bus 1424. The hardware elements may include one or more central processing units (CPUs) 1402, one or more input devices 1404 (e.g., a mouse, a keyboard, etc.), and one or more output devices 1406 (e.g., a display device, a printer, etc.). Computer system 1400 may also include one or more storage devices 1408. By way of example, the storage device(s) 1408 may include devices such as disk drives, optical storage devices, and solid-state storage devices such as a random access memory (RAM) and/or a read-only memory (ROM), which can be programmable, flash-updateable and/or the like.

Computer system 1400 may additionally include a computer-readable storage media reader 1412, a communications subsystem 1414 (e.g., a modem, a network card (wireless or wired), an infra-red communication device, etc.), and working memory 1418, which may include RAM and ROM devices as described above. In some embodiments, computer system 1400 may also include a processing acceleration unit 1416, which can include a digital signal processor (DSP), a special-purpose processor, and/or the like.

Computer-readable storage media reader 1412 can further be connected to a computer-readable storage medium 1410, together (and, optionally, in combination with storage device(s) 1408) comprehensively representing remote, local, fixed, and/or removable storage devices plus storage media for temporarily and/or more permanently containing computer-readable information. Communications system 1414 may permit data to be exchanged with network 1310 and/or any other computer described above with respect to system environment 1300.

Computer system 1400 may also comprise software elements, shown as being currently located within working memory 1418, including an operating system 1420 and/or other code 1422, such as an application program (which may be a client application, Web browser, mid-tier application, RDBMS, etc.). In an exemplary embodiment, working memory 1418 may include executable code and associated data structures (such as caches) used for the pattern matching method described above. It should be appreciated that alternative embodiments of computer system 1400 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method of detecting a pattern in a data stream comprising events, the method comprising:
   receiving, at a processing system, including a processor, predicate information, the predicate information specifying a predicate associated with each symbol in a set of symbols, the predicate information including a first predicate associated with a first symbol in the set of symbols, and including a second predicate associated with a second symbol in the set of symbols;
   receiving, at the processing system, a regular expression specifying a pattern, the regular expression comprising one or more symbols from the set of symbols;
   constructing an automaton for the pattern;
   upon receiving an event in the data stream:
   determining, based upon the received event, states of the automaton and associated bindings, and
   determining if the pattern is matched due to the received event based upon the states and associated bindings;
   in response to determining that the pattern is matched by a particular sequence of events in the data stream, continuing to determine whether subsequent events following the particular sequence of events in the data stream produce a match that is longer than a match produced by the particular sequence of events; and
   outputting the match produced by the particular sequence of events only after determining that no match longer than the match produced by the particular sequence of events is possible based on the states and associated bindings.

2. The method of claim 1 further comprising:
   upon receiving an event in the data stream, determining one or more symbols from the set of symbols that are matched due to the received event, wherein a symbol is matched if the predicate associated with the symbol is satisfied due to the received event; and
   wherein determining the states upon receiving an event in the data stream comprises determining the states based upon the one or more symbols and set of states and associated bindings stored prior to receiving the input event.

3. The method of claim 1 wherein the predicate information specifies a predicate that is associated with the first symbol in the set of symbols and is dependent upon the second symbol included in the set of symbols.

4. The method of claim 1 wherein the regular expression comprises at least one of an alternation operator, a grouping operator, or an aggregation operator.

5. The method of claim 1 wherein at least one symbol in the regular expression has an associated lazy quantifier.

6. The method of claim 1, wherein constructing the automaton for the pattern comprises:
   determining whether the pattern satisfies specified restrictions;
   selecting, based on whether the pattern satisfies the specified restrictions, and from a plurality of types of automatons, a particular type of automaton; and
   constructing an automaton of the particular type of automaton.

7. A computer-readable non-transitory storage medium storing a plurality of instructions for controlling a processor to detect a pattern in a data stream comprising events, the plurality of instructions comprising:
   instructions that cause the processor to receive predicate information, the predicate information specifying a predicate associated with each symbol in a set of symbols, the predicate information including a first predicate associated with a first symbol in the set of symbols, and including a second predicate associated with a second symbol in the set of symbols;
   instructions that cause the processor to receive a regular expression specifying a pattern, the regular expression comprising one or more symbols from the set of symbols;
   instructions that cause the processor to construct an automaton for the pattern; and
   instructions that cause the processor to, upon receiving an event in the data stream,
   determine, based upon the received event, states of the automaton and associated bindings, and
   determine if the pattern is matched due to the received event based upon the states and associated bindings;
   instructions that cause the processor to continue to determine, in response to determining that the pattern is matched by a particular sequence of events in the data stream, whether subsequent events following the particular sequence of events in the data stream produce a match that is longer than a match produced by the particular sequence of events; and
   instructions that cause the processor to output the match produced by the particular sequence of events only after determining that no match longer than the match produced by the particular sequence of events is possible based on the states and associated bindings.

8. The computer-readable non-transitory storage medium of claim 7 wherein the plurality of instructions further comprises:
   instructions that cause the processor to, upon receiving an event in the data stream, determine one or more symbols from the set of symbols that are matched due to the received event, wherein a symbol is matched if the predicate associated with the symbol is satisfied due to the received event; and
   wherein the instructions that cause the processor to determine the states upon receiving an event in the data stream comprise instructions that cause the processor to determine the states based upon the one or more symbols and set of states and associated bindings stored prior to receiving the input event.

9. The computer-readable non-transitory storage medium of claim 7 wherein the predicate information specifies a predicate that is associated with the first symbol in the set of symbols and is dependent upon the second symbol included in the set of symbols.

10. The computer-readable non-transitory storage medium of claim 7 wherein the regular expression comprises at least one of an alternation operator, a grouping operator, or an aggregation operator.

11. The computer-readable non-transitory storage medium of claim 7 wherein at least one symbol in the regular expression has an associated lazy quantifier.

12. A system for detecting a pattern in a data stream comprising events, the system comprising:
a memory storing a plurality of instructions; and
a processor coupled to the memory, the processor configured to execute the plurality of instructions to:
receive predicate information, the predicate information specifying a predicate associated with each symbol in a set of symbols, the predicate information including a first predicate associated with a first symbol in the set of symbols, and including a second predicate associated with a second symbol in the set of symbols;
receive a regular expression specifying a pattern, the regular expression comprising one or more symbols from the set of symbols;
construct an automaton for the pattern;
upon receiving an event in the data stream,
determine, based upon the received event, states of the automaton and associated bindings, and
determine if the pattern is matched due to the received event based upon the states and associated bindings;
continue to determine, in response to determining that the pattern is matched by a particular sequence of events in the data stream, whether subsequent events following the particular sequence of events in the data stream produce a match that is longer than a match produced by the particular sequence of events; and
output the match produced by the particular sequence of events only after determining that no match longer than the match produced by the particular sequence of events is possible based on the states and associated bindings.

13. The system of claim 12 wherein the processor is configured to:
upon receiving an event in the data stream, determine one or more symbols from the set of symbols that are matched due to the received event, wherein a symbol is matched if the predicate associated with the symbol is satisfied due to the received event; and
upon receiving an event in the data stream, determine the states based upon the one or more symbols and set of states and associated bindings stored prior to receiving the input event.

14. The system of claim 12 wherein the predicate information specifies a predicate that is associated with the first symbol in the set of symbols and is dependent upon the second symbol included in the set of symbols.

15. The system of claim 12 wherein the regular expression comprises at least one of an alternation operator, a grouping operator, or an aggregation operator.

16. The system of claim 12 wherein at least one symbol in the regular expression has an associated lazy quantifier.

* * * * *

UNITED STATES PATENT AND TRADEMARK OFFICE
CERTIFICATE OF CORRECTION

PATENT NO. : 8,589,436 B2
APPLICATION NO. : 12/548222
DATED : November 19, 2013
INVENTOR(S) : Srinivasan et al.

Page 1 of 2

It is certified that error appears in the above-identified patent and that said Letters Patent is hereby corrected as shown below:

On Title page, column 1, item (75), under "Inventors", line 2, delete "Hyderbad (IN);" and insert -- Hyderabad (IN); --, therefor.

On Title page 3, column 2, item (56), under "Other Publications", line 12, delete "1Oth" and insert -- 10th --, therefor.

On Title page 4, column 2, item (56), under "Other Publications", line 52, before "database" delete "f" and insert -- of --, therefor.

On Title page 6, column 2, item (56), under "Other Publications", line 67, delete "schoo1" and insert -- school --, therefor.

In the Drawings:

On sheet 11 of 18, in figure 10B, under Reference Numeral 1034, line 1, delete "REAMINING" and insert -- REMAINING --, therefor.

In the Specification:

In column 1, line 19, delete "2009 ; and" and insert -- 2009; and --, therefor.

In column 6, line 29, after "equal" insert -- to --.

In column 10, line 57, before "automaton" delete "an".

In column 12, line 8, after "matches" delete "a".

Signed and Sealed this
Tenth Day of June, 2014

Michelle K. Lee
*Deputy Director of the United States Patent and Trademark Office*

CERTIFICATE OF CORRECTION (continued)
U.S. Pat. No. 8,589,436 B2

In column 12, line 66, after "at" delete "se" and insert -- seq --, therefor.

In column 13, line 59, delete "(*,*,***,*)" and insert -- (*,*,*,*,*,*) --, therefor.

In column 23, line 40, delete "ei,," and insert -- ei, --, therefor.

In column 29, line 35, after "FIG. 8" insert -- . --.

In column 30, line 3, after "as" insert -- *) --.

In column 31, line 45, delete "iff" and insert -- if --, therefor.

In column 36, line 44, delete "(AB)" and insert -- (A|B) --, therefor.

In column 38, line 43, before "P=R+?" insert -- Let --.